(12) United States Patent
Poirier et al.

(10) Patent No.: US 8,898,071 B2
(45) Date of Patent: Nov. 25, 2014

(54) SYSTEM AND METHOD FOR MANAGING AND OPTIMIZING ADVERTISING NETWORKS

(75) Inventors: Marc Poirier, Saint-Lambert (CA); Richard Couture, Saint-Lambert (CA)

(73) Assignee: Acquisio Inc., Saint-Lambert (CA)

( * ) Notice: Subject to any disclaimer, the term of this patent is extended or adjusted under 35 U.S.C. 154(b) by 445 days.

(21) Appl. No.: 12/628,492

(22) Filed: Dec. 1, 2009

(65) Prior Publication Data

US 2011/0191182 A1 Aug. 4, 2011

(51) Int. Cl.
*G06Q 30/00* (2012.01)
*G06Q 90/00* (2006.01)

(52) U.S. Cl.
CPC ..................................... *G06Q 90/00* (2013.01)
USPC ....................................................... 705/14.1

(58) Field of Classification Search
CPC ...................................................... G06Q 90/00
USPC ....................................................... 705/14.1
See application file for complete search history.

(56) References Cited

U.S. PATENT DOCUMENTS

| | | | |
|---|---|---|---|
| 6,772,129 B2 | 8/2004 | Alvarez et al. | |
| 6,954,731 B1 | 10/2005 | Montague | |
| 7,006,979 B1 | 2/2006 | Samra et al. | |
| 7,010,497 B1 | 3/2006 | Nyhan et al. | |
| 2002/0116313 A1* | 8/2002 | Detering | 705/37 |
| 2007/0073722 A1 | 3/2007 | Ramer et al. | |
| 2007/0162379 A1 | 7/2007 | Skinner | |

* cited by examiner

*Primary Examiner* — Daniel Lastra
(74) *Attorney, Agent, or Firm* — Brouillette & Partners; Francois Cartier; Robert Brouillette

(57) ABSTRACT

The system of the present invention is used to execute data consolidation to combine data from Google, MSN and Yahoo, at least. The user does not need anymore to combine by himself data in spreadsheets. The system allows creating consolidated campaigns that span across search providers, letting the user effortlessly build reports that previously took hours to create each month. The system of the present invention is particularly suited for agencies. A tool designed for agencies needs to allow for management at the client level as well as the agency level. The system client center gives each member of the team a summary view of the client accounts that they're responsible for, along with emerging trend indicators for every major metric.

16 Claims, 68 Drawing Sheets

GetProviderAccountItemsInfoAndSize
Description:
- Return a tree containing the list of ppc campaigns and their associated adgroups.

Input:
- accountId
- providerAccountId

Output:
- List of ppc campaigns with number of keywords, number of sites, number of text ads.
  [ppcCampaignId, name, status, nbrOfKeywords, nbrOfSites, nbrOfAds]
  - For each ppc campaign, list of adgroups with number of keywords, number of sites, number of text ads.
    [adGroupId, name, status, nbrOfKeywords, nbrOfSites, nbrOfAds]

GetUserPreferencesSelectedItemsFromProviderAccount
Description:
- Return a tree containing the list of selected ppc campaign ids and adgroup ids.

Input:
- user
- accountId
- providerAccountId

Output:
- List of selected ppc campaign ids and adgroup ids.
  [ppcCampaignId]
  - For each ppc campaign, list of adgroup ids.
    [adGroupId]

FIG 2.E

- Bid rule edtion
  - public BidRuleTO[] createBidRules(Credential credential, BidRuleTO[] rules)
  - public BidRuleTO[] createBidRule(Credential credential, BidRuleTO rule)
  - public void updateBidRule(Credential credential, BidRuleTO rule)
  - public void deleteBidRule(Credential credential, int ruleId)
  - public BidRuleTO[] getBidRulesByAccount(Credential credential, int accountId)
  - public String getBidRulesStatus(Credential credential, int bidRule)
  - public int interruptBidRule(Credential credential, int bidRule)

- Agency Bid rule manipulation
  - 
    - public BidRuleParam createAgencyBidRule(Credentials credentials, BidRuleParam bidRuleTemplate)
    - public BidRuleParam updateAgencyBidRule(Credentials credentials, BidRuleParam bidRuleTemplate)
    - public void deleteAgencyBidRule(Credentials credentials, int bidRuleTemplateID)
    - public List<BidRuleParam> getAgencyBidRules(Credentials credentials)
    - public List<BidRuleParam> getAgencyBidRulesForAccount(Credentials credentials, int accountId)
    - public List<BidRuleAccountAssociationTO> addBidRuleAccountAssociations(Credentials credentials, int bidRuleTemplateId, List<BidRuleAccountAssociationTO> associations)
    - public List<BidRuleAccountAssociationTO> updateBidRuleAccountAssociations(Credentials credentials, int bidRuleTemplateId, List<BidRuleAccountAssociationTO> associations)
    - public void deleteBidRuleAccountAssociations(Credentials credentials, int bidRuleTemplateId, int[] accountIds)
    - public List<BidRuleAccountAssociationTO> getBidRuleAccountAssociationsForAgencyRule(Credentials credentials, int bidRuleTemplateId)
    - public List<BidRuleAccountAssociationTO> getBidRuleAccountAssociationsForAccount(Credentials credentials, int accounId)
    - public int getAccountRuleIdFromTemplateId(Credentials credentials, int bidRuleTemplateId, int accountId)
  - public int interruptAgencyBidRule(Credential credential, int templateBidRuleId) PAS ENCORE INTÉGRÉ !!!

FIG. 61

- *Logging*
  - public List<ActionLogUnitDetail> getLogInfoForBidRule(Credential credential, int ruleId, statDate, endDate)
  - public List<ActionLogUnitDetail> getLogInfoForAgencyBidRule(Credential credential, int templateBidRuleId, statDate, endDate)

- public List<ActionLogUnitDetail> getCountLogByAccount(Credential credential)
  - public List<ActionLogUnitDetail> getCountLogByAccount(Credential credential)

- public int countActionLogByRule(Credential credential, int ruleId, Date startDate, Date endDate)
  - ArrayList<ExtendedActionLogUnitDetail> getBidRuleLog(Credentials credentials, int ruleId, Date startDate, Date endDate, int firstIndex, int limit, ActionLogUnitDetailSortingParams[] sortingParam, SearchConstants.ActionLogUnitDetailCodeMessage filterParam, OrderBy.EnumAscendingDescending orderBy)
  - public ArrayList<RuleLogView> getRulesLogViewCountForAccount(InvocationContext ctx, int accountId, Date startDate, Date endDate) throws Exception

- *Actions*
  - public void executePendingActions(Credential credential, int[] actionUnitDetailIds)
  - public void executeAllPendingActions(Credential credential, int ruleId)
  - public void executeAllActionSetPendingActions(Credential credential,int actionSetId)

- public void deletePendingActions(Credential credential, int[] pendingActionIds)
  - public void deleteAllBidRulePendingActions(Credential credential, int ruleId)
  - public void deleteAllActionSetPendingActions(Credential credential, int actionSetId)

- public int getCountPendingActionForAgency(Credential credential)
  - public ArrayList<PendingActionCount> getCountPendingActionByAccount(Credential credential)
  - public ArrayList<PendingActionCount> getCountPendingActionByRule(Credential credential, int accountId)
  - public ArrayList<PendingActionCount> getCountPendingActionByActionSet(Credential credential, int ruleId)
  - public ArrayList<ExtendedActionUnitDetail> getPendingActionLog(Credential credential, int actionSetId, int firstIndex, int limit, ActionLogSortingParams[] sortParam, , OrderBy.EnumAscendingDescending orderBy)

FIG. 6J

*Alert*

- public BidRuleAlert[] getBidRuleAlertsByActionSet(Credential credential, int ruleId, Date startDate, Date endDate)
- public BidRuleAlert[] getBidRuleAlertsByBidRule(Credential credential, int rul, Date startDate, Date endDate)
- public BidRuleAlert[] getBidRuleAlertsByAccount(Credential credential, int accountId, Date startDate, Date endDate)
- public BidRuleAlert[] getBidRuleAlertsByAgency(Credential credential, int agencyId, Date startDate, Date endDate)
- public BidRuleAlertDetail getBidRuleAlertDetail(Credential credential, int bidRuleAlertDetail)

*Stats:*

- public ArrayList<BidRuleStats> getGoupFiltersStatsForRule(Credentials credentials, int ruleId, Date startDate, Date endDate)

FIG. 6K

Targeted Cost/Conv = $10

ActionSet #1: Reduce the Max CPC of keywords with a cost/conv between $12.50 and $20.00

| Condition | Action |
|---|---|
| If Group.Cost/Conv > 10 AND<br>If Indivual.Cost/Conv / 10 > 12.50 AND<br>If Indivual.Cost/Conv / 10 < 20.00 | 1) Decrease Individual.MaxCPC by 10%<br>Or<br>2) Set Individual.MaxCPC to (10 * Individual.ConvRate)<br><br>*long jeans - $0.78 to 1) $0.70 2) $0.42*<br>*(should add the gap between the MaxCPC and AvgCPC)* |
| If Indivual.Conv >= 3 (Threshold) | |
| Filter by a minimum number of conversions | |

ActionSet #2: Try to improve performance of good keywords (with improvement capacity)

| Condition | Action |
|---|---|
| If Indivual.Conv >= 3 (Threshold) AND<br>If Indivual.Cost/Conv / 10 < 7.50 AND<br>If Indivual.AvgPos >= 2 | 1) Increase Individual.MaxCPC by 10%<br>Or<br>2) Set Individual.MaxCPC to (10 * Individual.ConvRate)<br><br>*extra long jeans – $0.78 to 1) $1.03 2) $0.42*<br>*« extra long jeans » - $0.78 to 1) $1.14 2) $1.03*<br>*Long inseam jeans - $0.78 to 1) $1.14 2) $1.03 $0.78 à $1.08*<br>*Long leg jeans - $0.65 à $0.86*<br>*« Long inseam jeans » - $0.78 à $2.14* |

ActionSet #3: Try to improve performance of remaining keywords (with improvement capacity)

| Condition | Action |
|---|---|
| If Indivual.Conv < 3 (Threshold) AND<br>If Indivual.Conv > 0 AND<br>If Indivual.Cost/Conv / 10 < 7.50 AND<br>If Indivual.AvgPos > 2 | Set Individual.MaxCPC to ?? |
| If Indivual.QualityScore >= 5 (Threshold) | |
| Filter by QualityScore to evaluate improvement capacity | |
| If (Indivual.firstPageCpc / Individual.AvgCPC) > .5 AND<br>If (Indivual.firstPageCpc / Individual.AvgCPC) =< 1 AND | |
| Filter by distance between the recommended firstPageCpc and the average CPC observed | |

ActionSet #4: Pause bad performing keywords (and send an email notification)

| Condition | Action |
|---|---|
| If Group.Cost/Conv > 10 AND<br>If Indivual.Cost/Conv / 10 >= 20 | Pause keyword<br>Send me a message notification |

Targeted Cost/Conv [ ] 10

| Adwords Keywords | Match Type | Max CPC | Clicks | Impr. | CTR | Avg. CPC | Cost | Avg. Pos. | Conv. | Conv. Rate | Cost/ |
|---|---|---|---|---|---|---|---|---|---|---|---|
| long jeans | Broad | $0.78 | 200 | 3,208 | 6.23% | $0.71 | $142.93 | 3.56 | 14 | 7.00% | |
| extra long jeans | Broad | $0.78 | 107 | 1,396 | 7.66% | $0.69 | $73.44 | 3.38 | 11 | 10.28% | |
| long jeans | Exact | $0.78 | 95 | 1,242 | 7.65% | $0.69 | $65.54 | 3.1 | 6 | 6.32% | |
| extra long jeans | Phrase | $0.78 | 79 | 744 | 10.62% | $0.70 | $55.13 | 2.84 | 9 | 11.39% | |
| long inseam jeans | Broad | $0.78 | 65 | 1,111 | 5.85% | $0.64 | $41.75 | 3.47 | 7 | 10.77% | |
| long legs jeans | Broad | $0.65 | 35 | 502 | 6.97% | $0.55 | $19.39 | 3.26 | 3 | 8.57% | |
| long leg jeans | Broad | $0.65 | 16 | 409 | 3.91% | $0.60 | $9.63 | 3.83 | 1 | 6.25% | |
| long inseam jeans | Phrase | $0.78 | 14 | 321 | 4.36% | $0.74 | $10.34 | 3.77 | 3 | 21.43% | |
| extra long jeans | Exact | $0.39 | 13 | 351 | 3.70% | $0.47 | $6.13 | 6.98 | 1 | 7.69% | |
| long inseam jeans | Exact | $0.78 | 12 | 200 | 6.00% | $0.68 | $8.15 | 4.57 | 0 | 0.00% | |
| long leg jeans | Exact | $0.65 | 7 | 58 | 12.07% | $0.58 | $4.08 | 2.67 | 1 | 14.29% | |
| long legs jeans | Exact | $0.65 | 6 | 63 | 9.52% | $0.45 | $2.69 | 2.92 | 0 | 0.00% | |
| long leg jeans | Phrase | $0.65 | 3 | 53 | 5.66% | $0.55 | $1.65 | 2.57 | 0 | 0.00% | |
| long legs jean | Broad | $0.65 | 2 | 154 | 1.30% | $0.51 | $1.01 | 1.34 | 0 | 0.00% | |
| long leg jean | Broad | $0.65 | 1 | 51 | 1.96% | $0.63 | $0.63 | 2.37 | 0 | 0.00% | |

| Keyword | Match | Bid | | | | | | |
|---|---|---|---|---|---|---|---|---|
| long legs denim | Broad | $0.65 | 1 | 11 | 9.09% | $0.30 | $0.30 | 1.36 | 0 | 0.00% |
| long legs denim | Phrase | $0.65 | 0 | 1 | 0.00% | $0.00 | $0.00 | 1 | 0 | 0.00% |
| long leg jean | Phrase | $0.65 | 0 | 5 | 0.00% | $0.00 | $0.00 | 2.2 | 0 | 0.00% |
| long leg jean | Exact | $0.65 | 0 | 2 | 0.00% | $0.00 | $0.00 | 3 | 0 | 0.00% |
| long legs jean | Exact | $0.65 | 0 | 0 | 0.00% | $0.00 | $0.00 | 0 | 0 | 0.00% |
| long legs jean | Phrase | $0.65 | 0 | 65 | 0.00% | $0.00 | $0.00 | 1.32 | 0 | 0.00% |
| long leg denim | Phrase | $0.65 | 0 | 0 | 0.00% | $0.00 | $0.00 | 0 | 0 | 0.00% |
| extra long jeans clothing | Exact | $0.65 | 0 | 0 | 0.00% | $0.00 | $0.00 | 0 | 0 | 0.00% |
| long leg denim | Broad | $0.65 | 0 | 8 | 0.00% | $0.00 | $0.00 | 3.5 | 0 | 0.00% |
| extra long jeans clothing | Phrase | $0.65 | 0 | 0 | 0.00% | $0.00 | $0.00 | 0 | 0 | 0.00% |
| extra long jeans clothing | Broad | $0.65 | 0 | 0 | 0.00% | $0.00 | $0.00 | 0 | 0 | 0.00% |
| long legs jeans | Phrase | $0.65 | 0 | 1 | 0.00% | $0.00 | $0.00 | 4 | 0 | 0.00% |
| long leg denim | Exact | $0.65 | 0 | 1 | 0.00% | $0.00 | $0.00 | 2 | 0 | 0.00% |
| long legs denim | Exact | $0.65 | 0 | 0 | 0.00% | $0.00 | $0.00 | 0 | 0 | 0.00% |
| | | | 1272 | 24201 | 5.26% | $0.68 | $865.48 | | 82 | 6.45% |

FIG. 60

SYSTEM AND METHOD FOR MANAGING AND OPTIMIZING ADVERTISING NETWORKS

CROSS-REFERENCE TO RELATED APPLICATIONS

The present patent application claims the benefits of priority of commonly assigned Canadian Patent Application no. 2,659,538, entitled "System and Method for Managing and Optimizing Advertising Networks" and filed at the Canadian Patent Office on Mar. 30, 2009.

FIELD OF THE INVENTION

The invention relates generally to systems and methods for managing advertising networks.

BACKGROUND OF THE INVENTION

Pay per click advertising permits advertisers to create online advertisements and to bid on keywords they believe are relevant to their target market. When a search query is received that includes the keywords, the advertisement is displayed along with relevant search results for the keywords. The on-screen position of the advertisement depends upon the maximum bid amount specified by the advertiser. Higher bids typically result in better placement of the advertisement. The advertiser only pays if a user clicks on the advertisement.

While pay per click advertising has become extremely popular, it remains difficult for an individual or small business to set up an advertising campaign. Writing content for an advertisement, selecting keywords, setting a budget, and bidding on terms can be a complicated, time consuming process that must be repeated for each search engine advertising network at which the advertisement is placed.

Once an advertising campaign has been created, an advertiser must often spend a considerable amount of time determining the keywords that are generating the most referrals from each search engine and replacing low performing keywords with new terms. This also can be a difficult and time-consuming process, especially if the advertisement is placed on multiple search engine advertising networks. Because the software tools for performing these functions are advertising network specific, advertisers are generally required to master multiple tools or to limit their advertising to only one search engine.

It is with respect to these considerations and others that the disclosure made herein is provided.

With the advent of the Internet, online advertising has become widely popular and commonly used among various businesses. In addition to being cost effective and far reaching, it allows businesses to get more information to potential users than more traditional forms of advertising such as publications and media campaigns. Generally, online advertising includes search engine, desktop, email advertising as well as various other forms. Web based advertising systems are typically measured using certain metrics at different stages of the advertisement presentment and fulfillment process. For example, the number of times an advertisement is shown in measures and typically denoted impressions. Impressions have been based on keywords or content that appears on a site. A click on an advertisement is typically measured as a click-thrus. The advertisement copy typically drives the number of clickthrus. When a viewer takes a desired action on the web site of the advertiser that is often referred to as a conversion. Desired actions typically include sign-up, completion of a survey, and a sale. The cost associated with ads is tracked as costs, and sales as sales.

A multitude of techniques has been developed for measuring the success of advertising campaigns online based on various metrics. These practices often involve determinations of how often users tend to perform desired actions in comparison to costs and various other factors involved. However, these systems generally lack an effective and user-friendly approach to analyzing, visualizing and improving online advertising systems. Accordingly, a need exists for a more efficient way to measure and improve such systems. Further, a need exists for an effective user-friendly interface for online advertising systems.

SUMMARY OF THE INVENTION

The system and method of the present invention combine data at least from Google Adwords, Yahoo Search Marketing and Microsoft adCenter into a white-label application. It is to be understood that data from other company or system could be combined.

The system of the present invention allow to:
Manage every aspect of unlimited PPC Campaigns and keywords from one central interface, that is preferably web-based.
Build graphic-rich PDF reports easily, and automate the entire reporting process.
Decentralize the companies PPC knowledge, management and reporting abilities.
Increase the productivity of the entire paid search department dramatically, with no steep learning curves.
Create, Manage, edit, Optimize and report easily the data from, at least, Google Adwords, Yahoo Search Marketing and Microsoft adCenter.

The system fills the need for a comprehensive management, optimization and reporting tool for agencies with features like:
A multi-engine editor just like Adwords Editor, but for Google, Yahoo and Microsoft adCenter accounts.
Advanced rules-based bid management that is completely customizable and extremely powerful.
Intuitive optimization tools that let you tailor each campaign on specific metrics such as cost, impressions, clicks or conversions.
The ability to consolidate campaigns from across providers to produce custom data views and reporting.
Advanced metrics like ROAS and the ability to see any cost metric with or without your agency mark-up.
A custom graph, table and chart builder that accommodates any data-view you wish to express, including quick cross-provider comparisons.
A flexible reporting center that allows you to add your graphs, tables and charts to a drag-and-drop report builder, and output client-ready, white-label PDF documents, then automate them each month.

The system of the present invention is particularly suited for agencies. A tool designed for agencies needs to allow for management at the client level as well as the agency level. The system client center gives each member of the team a summary view of the client accounts that they're responsible for, along with emerging trend indicators for every major metric.

The system provides at a glance monitoring of trends at the agency, account, campaign, ad-group and keyword level, offers an invaluable birds-eye view to every level of the team, from account managers to executives.

With the system, the SEM department only needs to learn one simple interface in order to effectively manage and report on multiple campaigns at many different providers, dramatically increasing productivity, and letting your team concentrate on strategy and optimization.

The system of the present invention is used to execute data consolidation to combine data from Google, MSN and Yahoo, at least. The user does not need anymore to combine by himself data in spreadsheets. The system allows creating consolidated campaigns that span across search providers, letting the user effortlessly build reports that previously took hours to create each month.

The system is designed for interactive advertising agencies; it is built from the ground up exclusively for interactive advertising agencies. The data are integrated from Google Adwords, Yahoo Search Marketing and Microsoft Adcenter, at least, into one easy to use management and reporting tool designed specifically to save money, while improving the firm's performance.

Features of the system:
White Label web-based interface;
Automated reporting center;
Campaign optimization tools;
Intelligent data-views for your staff, and your clients;
Manage multiple campaigns;
Manage multiple search providers;
Built in FLEX for cross-browser & cross-platform compatibility;
No contracts to sign, no keyword or usage limitations.
Benefits of the system:
Save time on month-end reporting tasks with the powerful report builder;
Save time on day-to-day management tasks with the easy to use web-based interface;
Do not have to Log-in to Google Adwords, YSM or MSN AdCenter;
Lower the client's CPA with intelligent historical data analysis;
Manage more accounts with less effort.
Benefit for Users
Log in to one interface to manage accounts across Google, MSN, and Yahoo;
Launch new campaigns directly from within the system, and quickly copy new and existing campaigns to other providers;
See a top level view of each account, campaign and ad-group showing trends on every major variable to let the user catch small problems before they balloon into big ones;
Optimize each campaign individually to directly save money for the accounts the user manage without having to pick up a calculator;
Get the user client's CPA under control without having to hunt through entire campaigns for errant keywords and bids—the system does the grunt work for you;
Perform advanced bulk bid, creative, URL and keyword management with the multi-engine editor;
Create consolidated data views of the campaigns across different paid search providers to group and report on the client's data in the ways that they see it. Running a spring sale on more than one provider? Now it's a cinch to create a report for that campaign without having to aggregate any data or even open excel;
Build extremely sophisticated reports using combined data across PPC providers with graphs and charts that would otherwise take hours to put together;
With the click of the mouse save the template and automate the reporting for every month moving forwards. Reports can be exported to client-ready PDF files simply.

Benefits for Manager or Agency Management
Gain a competitive advantage and boost profit margins with software that lets the user manage more accounts and more spend with more efficiency and effectiveness, all with less man-power;
See the progress and managed spend of the entire agency from a simple, elegant dashboard view that is constantly up to date;
Take the company's most vital asset, the effective monitoring and optimization of every paid search account you manage, out of the hands of individuals, and into software that will never take a vacation, never take a leave of absence, never take a job in Hawaii, and never demand a raise;
Provide tools for the employees that are straightforward, elegant and impactful, allowing to reduce your reliance on expensive high-salaried experts;
Present the company as a the sophisticated cutting edge marketing firm that it is with white-labeled, web based software that the clients think is your own;
Streamline the reporting process and regain countless hours of work from the employees every month-end and quarter;
Ensure the work you're getting from your employees is of the highest caliber with top level trend views of every client account, campaign and ad-group.

Bid Management

The system is the first software of its kind to offer comprehensive PPC campaign, account and even agency level management. The concept of what bid management software is and should be has evolved tremendously over the past few years. The main cause of change stem from two facts:
Major PPC providers such as Google and Yahoo implemented Quality Score and similar keyword-level scoring systems that, in combination with your bid price, influence your ad position;
Every major PPC provider decided it would be in their best interests to no longer show advertisers what their competition was bidding for each key-phrase.

It used to be as simple as viewing the bids around you and finding the gap which allowed you to be in the most desirable position for the least amount of money. Identifying and shifting bids to constantly take advantage of these gaps was the primary purpose of PPC bid management software up until 2003.

PPC Software has had to evolve along with search provider changes. What you bid is no longer the only variable which determines your positioning, but simply one of a handful of important aspects. Effective campaign management requires having an eagle eye on your metrics over time and being able to make changes across ad-copy, bids, landing page copy and other pertinent variables quickly and efficiently.

It is this evolution in mind that drives the development of the system. In addition to powerful tools to help identify weak spots in your campaigns by examining your performance history, we provide an editor much like Google Adwords editor which allows you to manage all of your Google, Yahoo Search Marketing and Microsoft AdCenter accounts from the same place.

Our trends bar helps you keep track of your metrics with ease, giving continuous feedback on how every variable compares with a previous time-frame. If your spend is 7% higher this week than last, this information will be pushed to you as soon as you view your account, no calculators or time consuming work needed.

The system SEARCH is much more than bid management software, its PPC agency management software.

Campaign Optimization

If you've ever spent hours pouring over pay per click campaign data in order to try and optimize a client account, you know how frustrating it can be not knowing what the potential results of your efforts may be.

Take the stress and worry out of pay per click optimization with the system optimizer, a new module included as part of the system which allows for a number of approaches to PPC campaign optimization.

The system PPC campaign optimizer is designed to help you intuitively craft the style of campaign that you want. With the ability to minimize or maximize one of your campaign metrics, and then choose the maintenance levels of the remaining variables, the system campaign optimizer gives you the opportunity to easily see the predicted effects of your changes. PPC campaign optimization differs for the style of advertiser you're managing—and now campaign specific optimization has been made easy for you, for all of your clients.

We study your historical account data to determine which of your keywords are underperforming. Reallocation of this portion of spend can reduce the campaign CPA, while maintaining your chosen percentage of conversions, clicks, and impressions.

Is your advertising client looking for more brand exposure? Branding campaigns require maximum impressions, and achieving this is as simple as choosing to maximize your impressions within the optimization module—remember that within the Google Adwords system keywords need to maintain a healthy number of clicks, as you don't want your quality score to suffer because of a lower click through rate.

Perhaps your client is very CPA focused. If you choose to minimize your cost while maintaining your conversions, you can reduce CPA without compromising the sales they are currently making from the most effective keywords in the campaign.

If instead your client simply wants the most traffic possible with the least cost, simply choose to maximize clicks, and then drag the cost slider down until you've found the perfect optimization.

Report Automation

PPC Report automation is one of the cornerstone features of the system. When we set out to make a PPC management tool designed to help agencies and those who manage more than a single campaign, we knew that reporting was one of the most time consuming tasks that goes into effective management for clients.

The complexities that arise out of advertising campaigns which are split across multiple search providers can often slow the process of report building to a crawl. Gathering cost, impression, click and conversion data from each provider, importing it into spreadsheets, hammering out formula to combine the data in meaningful ways, creating tables, graphs and charts to represent that meaning—and then finally commenting on each element and producing a flawless PDF—all together it's a lot of work that even the most seasoned PPC veteran can consider overwhelming.

Imagine a PPC reporting tool that eliminates all of the grunt work from the above task list. With the system Report Center all you have to do is add the elements you wish to see in your report, write a few comments, and hit the publish button. In a typical advertising agency month-end reporting situation, we have found time dedicated to producing reports may be cut more than 90%.

The system aggregates data from across all of the major PPC providers in the way that you choose. This in combination with our integrated report building tool allows for quick report production right from within the System interface—producing beautiful client-ready PDF files instantly.

The system built-in What You See is What You Get (WYSIWIG) report builder allows almost any chart, data-grid or graph can be quickly added to the pay per click report you're building, on the fly. Simply add the elements you wish to see in the report, then switch to the WYSIWYG reporting tool, drag and drop elements to find the perfect format, add some comments where you see fit, and you're done.

Within the present document, a platform allowing the bidding and buying of pay-per-click advertisement, such as Google Adwords, Yahoo Search Marketing or Bing Ads, is referred as an advertising provider or advertising platform. Such an advertising provider allows an agency or any user to create one or more advertising campaigns.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIGS. 2E to 2H are screenshots of the campaign selector module of the system.

FIGS. 5A to 5L show a plurality of screenshot of the "bid rules engine" module of the system.

DETAILED DESCRIPTION OF THE PREFERRED EMBODIMENT

A novel system and method for managing and optimizing advertising networks will be described hereinafter. Although the invention is described in terms of specific illustrative embodiment(s), it is to be understood that the embodiment(s)

described herein are by way of example only and that the scope of the invention is not intended to be limited thereby.

Bulk Editor

FIGS. 1A to 1K The System editor interface is styled after Google Adwords Editor, so that it is instantly familiar and easy to use for PPC managers the world over. One of a number of ways to view data in System, the editor area allows for quick and easy cross-provider campaign management. All of the functionality you've come to expect from the Adwords Editor is now also at your fingertips for Yahoo and Microsoft Adcenter.

The system and method in accordance with the present invention allows the management and the optimization of the metrics of one or more pay-per-click advertising campaign where advertisement are bought on one or more advertising provider. As an example, an advertiser may optimize during a single operation the buying of advertisement on a plurality of advertising platforms, such as Google AdWords, Yahoo Search Marketing Bing Ads, in a way to maintain the cost as low as possible or to increase the conversion rate. Thus, in the present example, an advertiser benefits from having access to consolidated reports of the advertising campaign on a plurality of advertising platforms.

It's no secret that PPC managers have been craving a tool to help with mass editing of bids, creative, URLs and other campaign elements for years now. Ever since the release of Google's own tool, and understanding the potential of the management style, the desire has been to see a piece of software which spans multiple providers, more than just Google.

Designed with professional Pay-Per-Click marketing experts in mind, the system EDITOR module allows you to filter, search and edit across multiple campaigns, and more importantly, across multiple providers. Do you need to update the ad-copy now that a promo is over? There is no quicker way than logging into System, searching for a part of the ad-copy text, replacing the copy and posting changes.

In addition to daily management tasks, we wanted to create a tool that simplifies the work involved with launching campaigns and adgroups across multiple providers. We use the Google Adwords API, which has a strict terms and conditions when it comes to sharing Google data with other providers. So while we cannot make copying an ad-group or campaign from Google to Yahoo a drag and drop process, we can simplify things down to a few clicks, and a copy and paste.

Figure 1A:
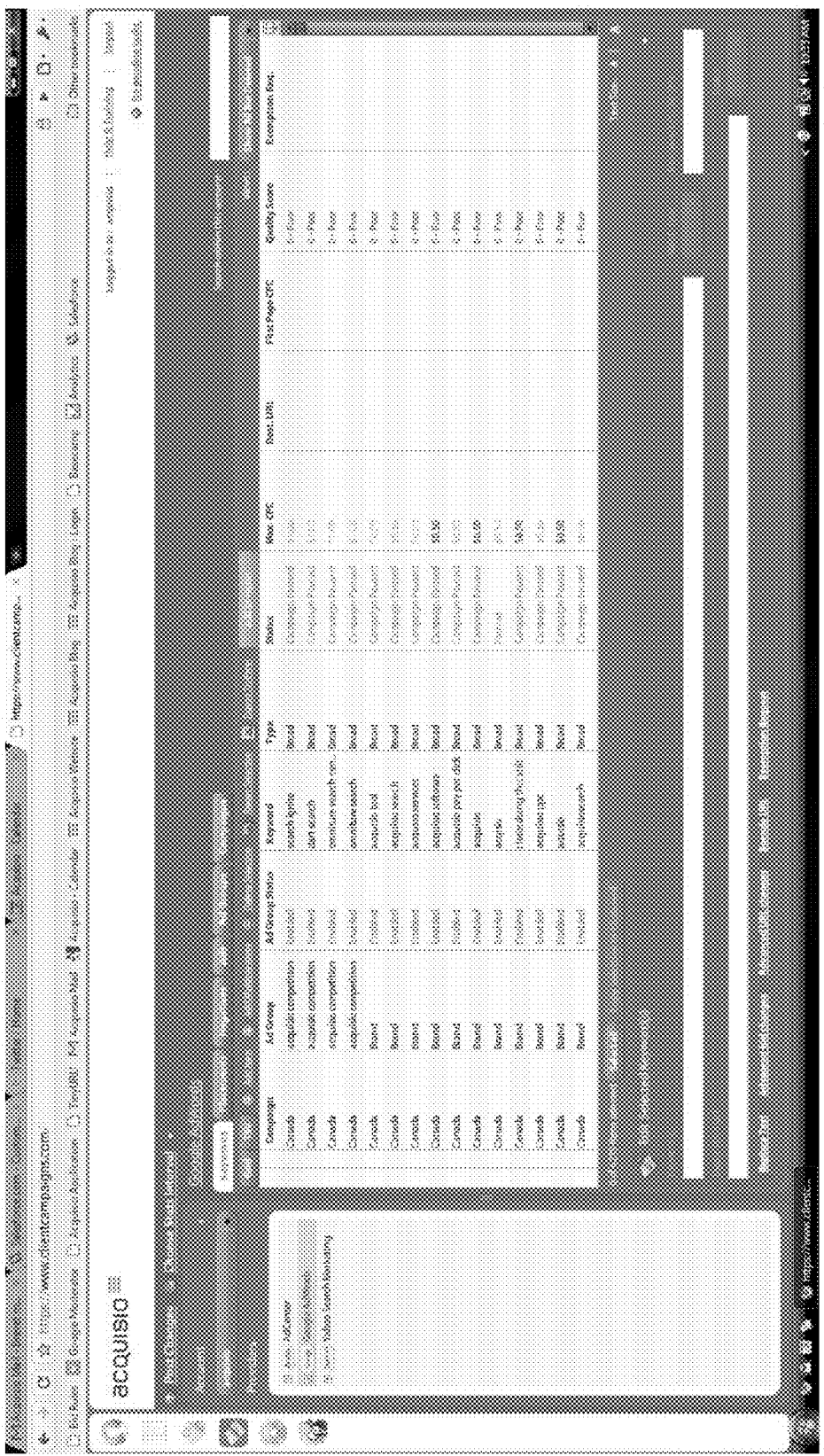
FIGS. 1A to 1K are screenshots of the bulk editor module of the system.
Figure 1B:
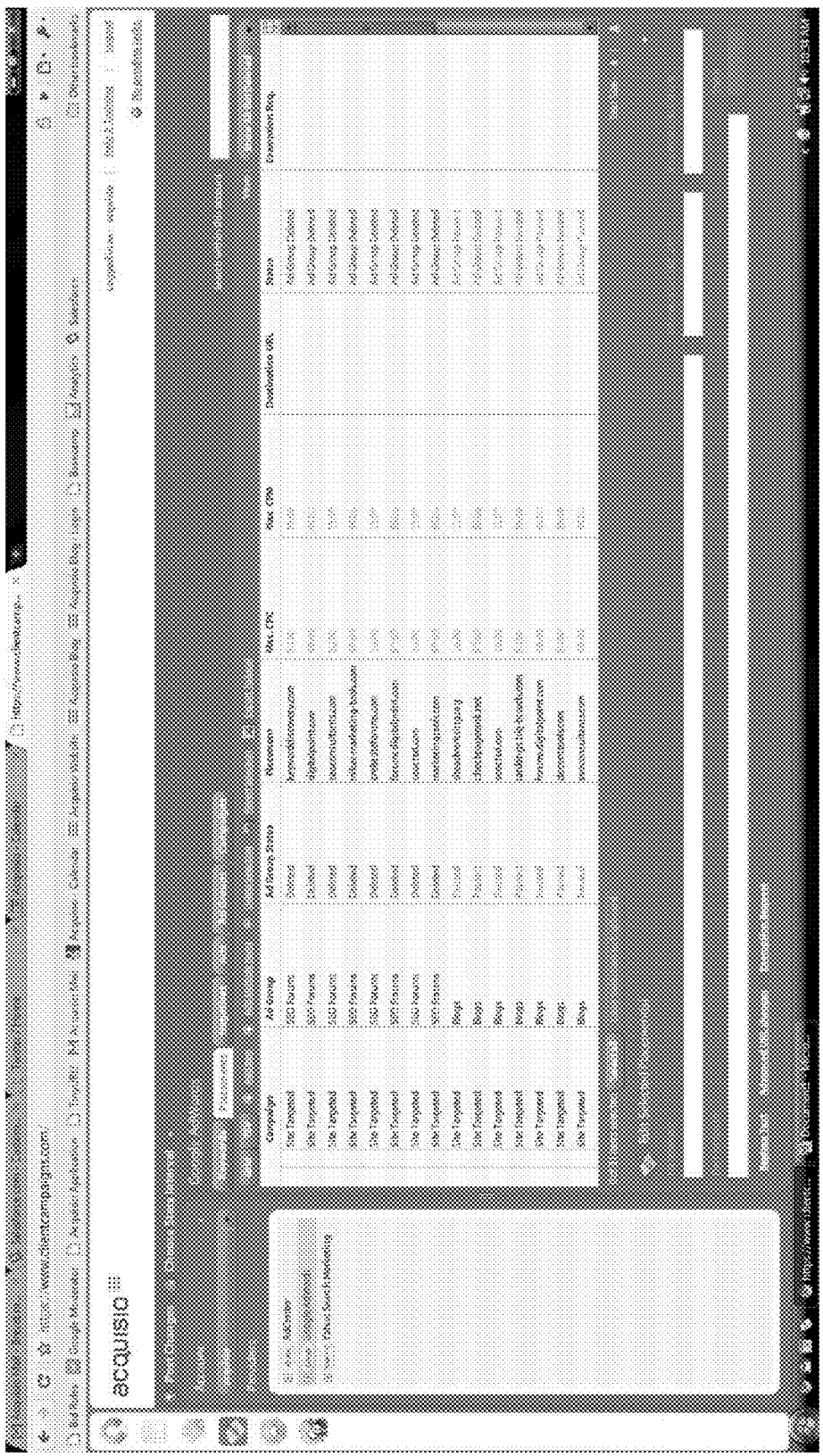

FIG. 1A The system multi-engine bulk editor allows users to work with a flattened account structure, i.e. the hierarchy of account-campaign-adgroup-keywords and ads is flattened so that one can work on all keywords of an account for example, regardless of which campaigns and adgroups the keywords are located in. This screen shows the keyword level:

FIG. 1B This screen shows "site placements"—instead of keywords, users can place ads on specific websites. This is where these sites are listed along with their info, such as campaign, adgroup, status, max cpc or max cpm, destination url, and exemption request if any.

Figure 1C:
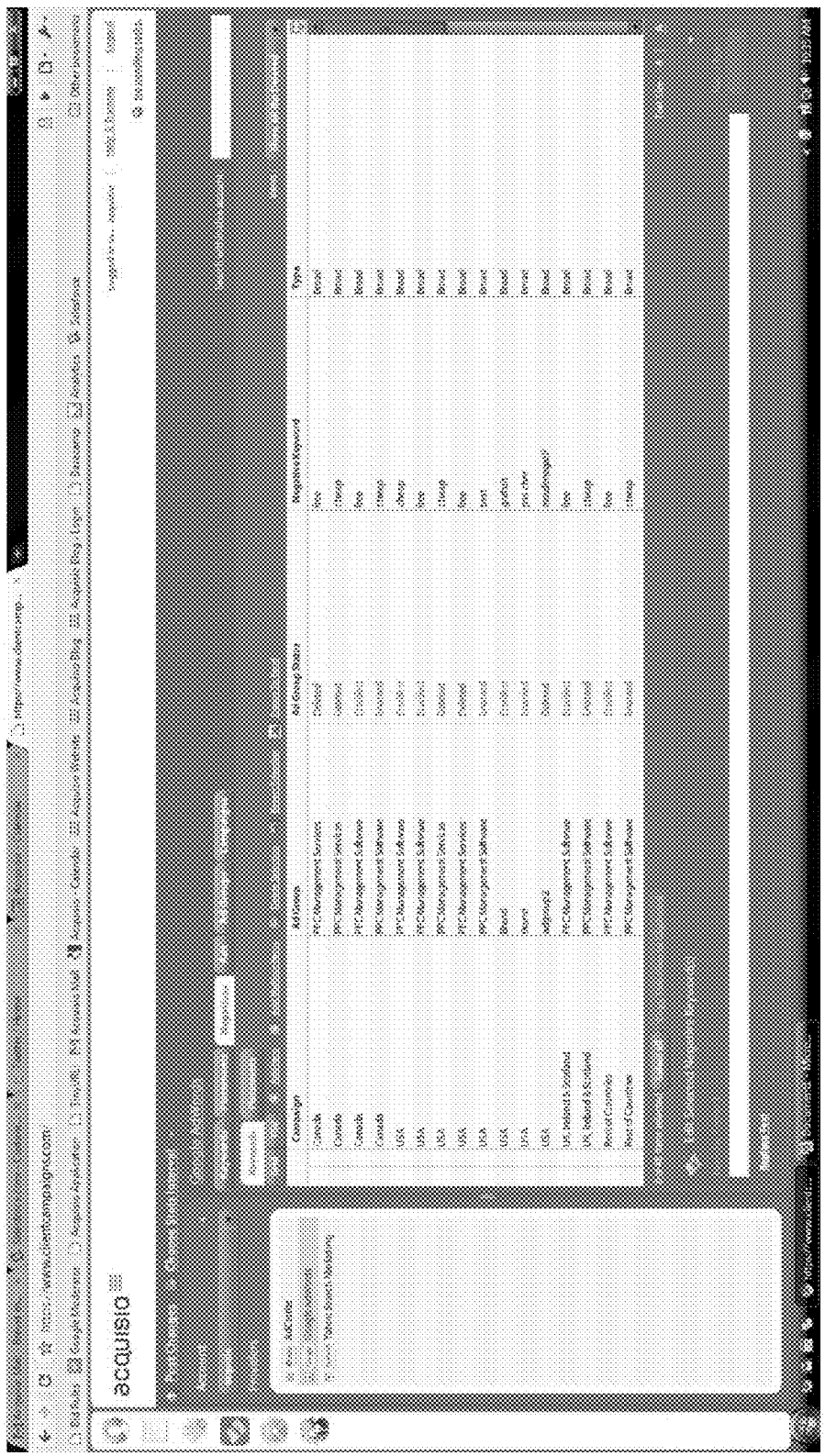

FIG. 1C This is the negative keywords screen, there is also a negative placement screen (see tab)

Figure 1D:
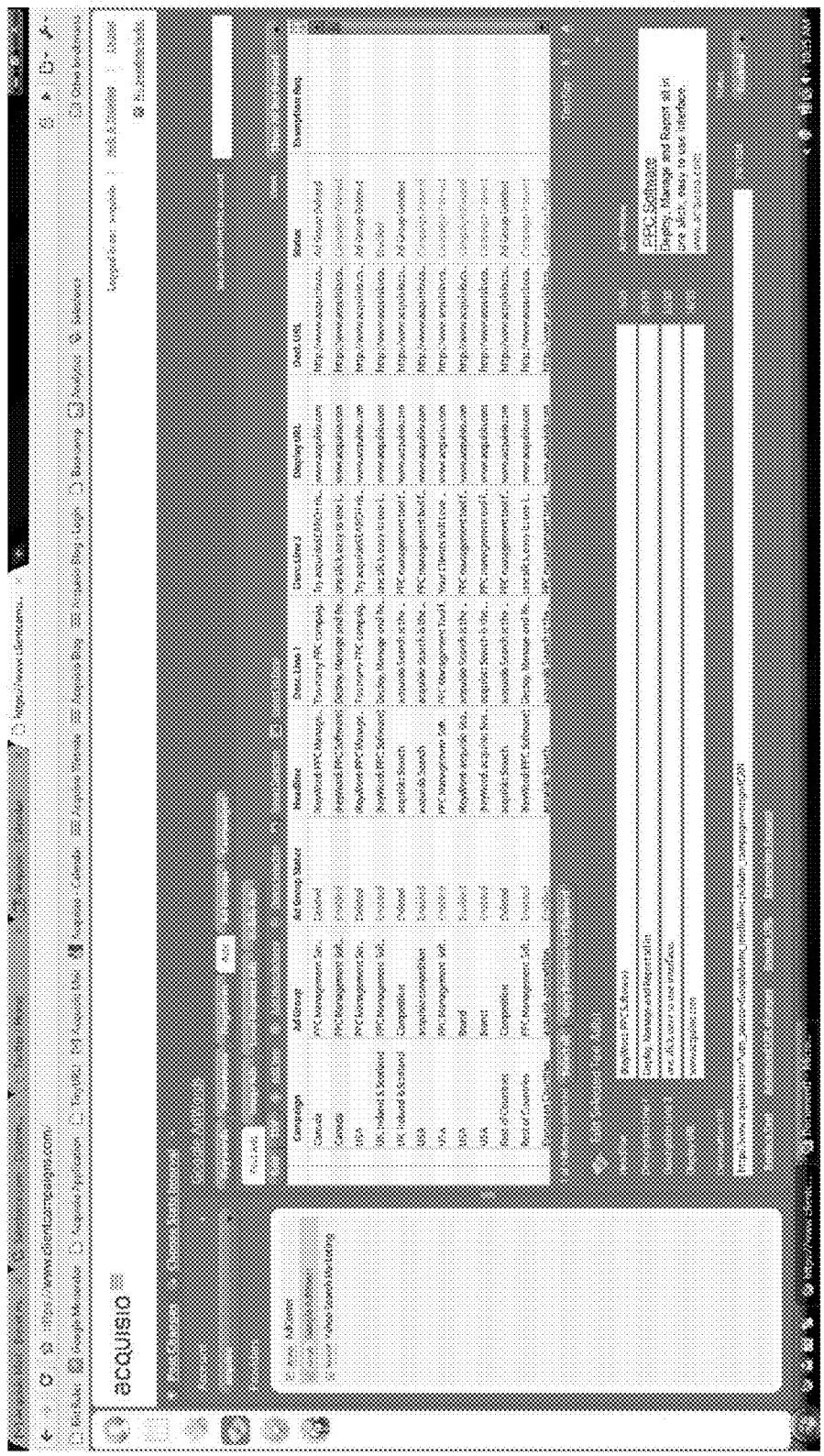

FIG. 1D This screen shows the ads themselves, this allows users to manage all text ads from one screen, they can change any headline, description lines, display urls and destination urls, one by one or in bulk.

Figure 1E:
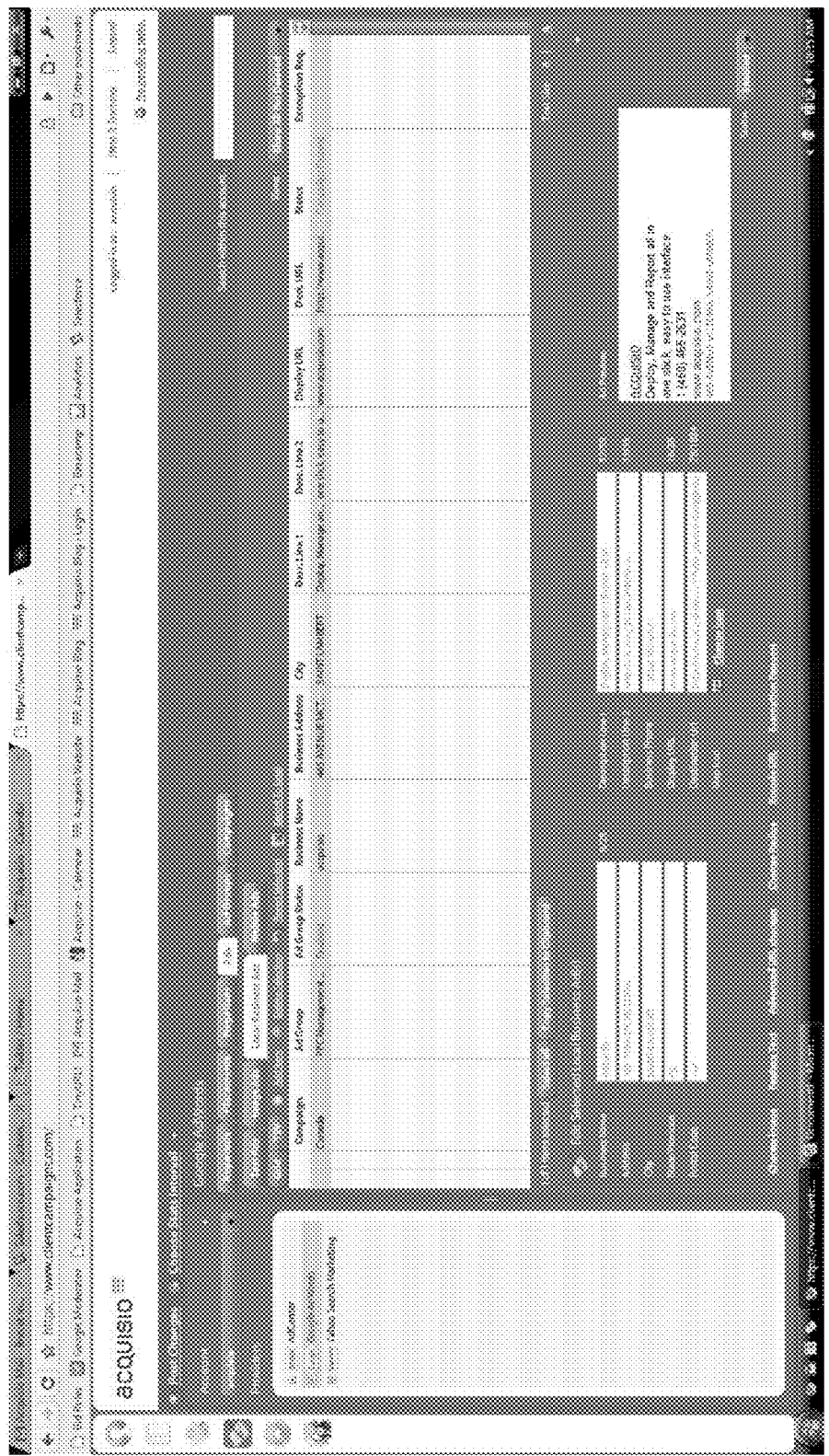
Figure 1F:
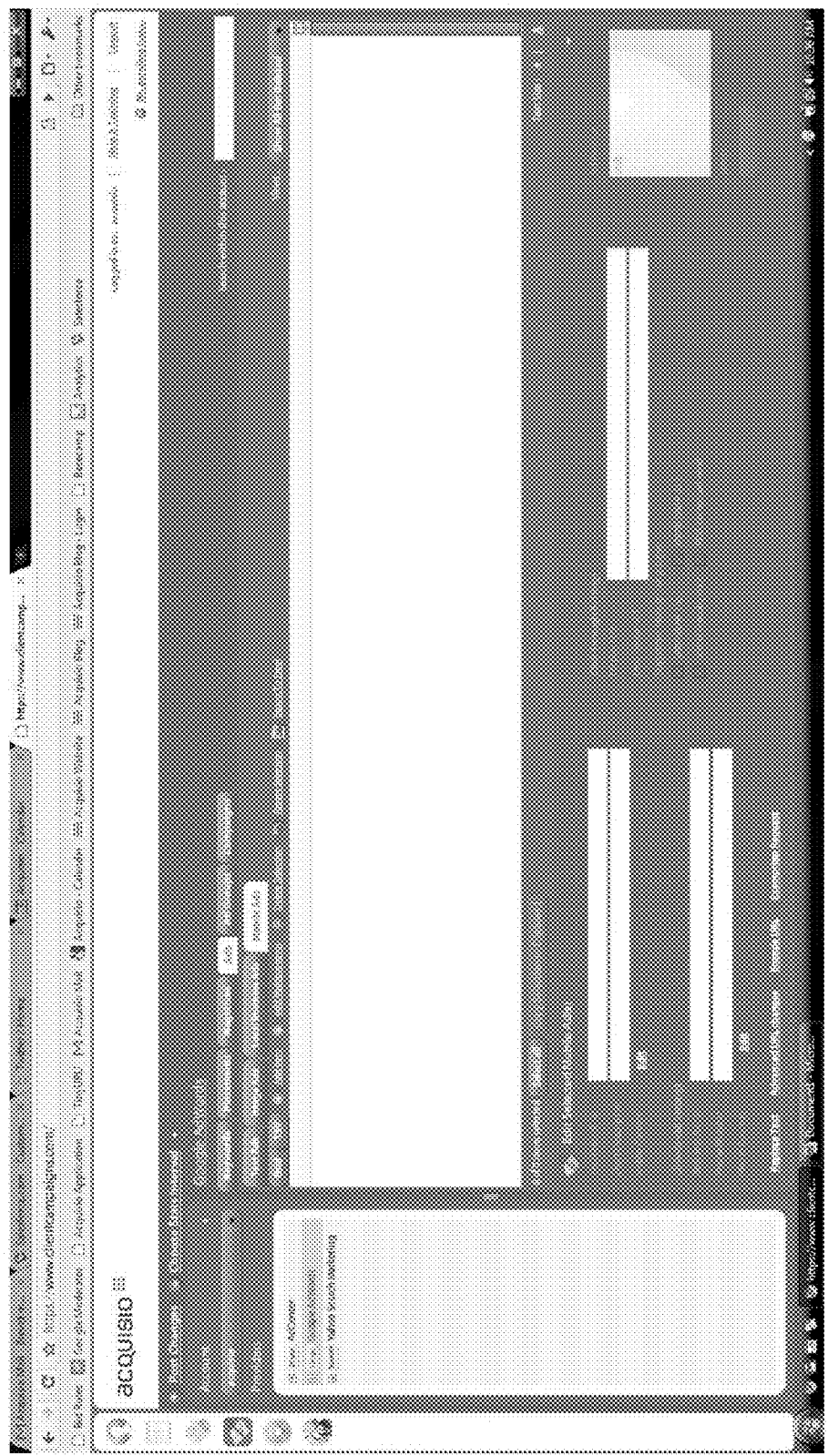
Figure 1G:
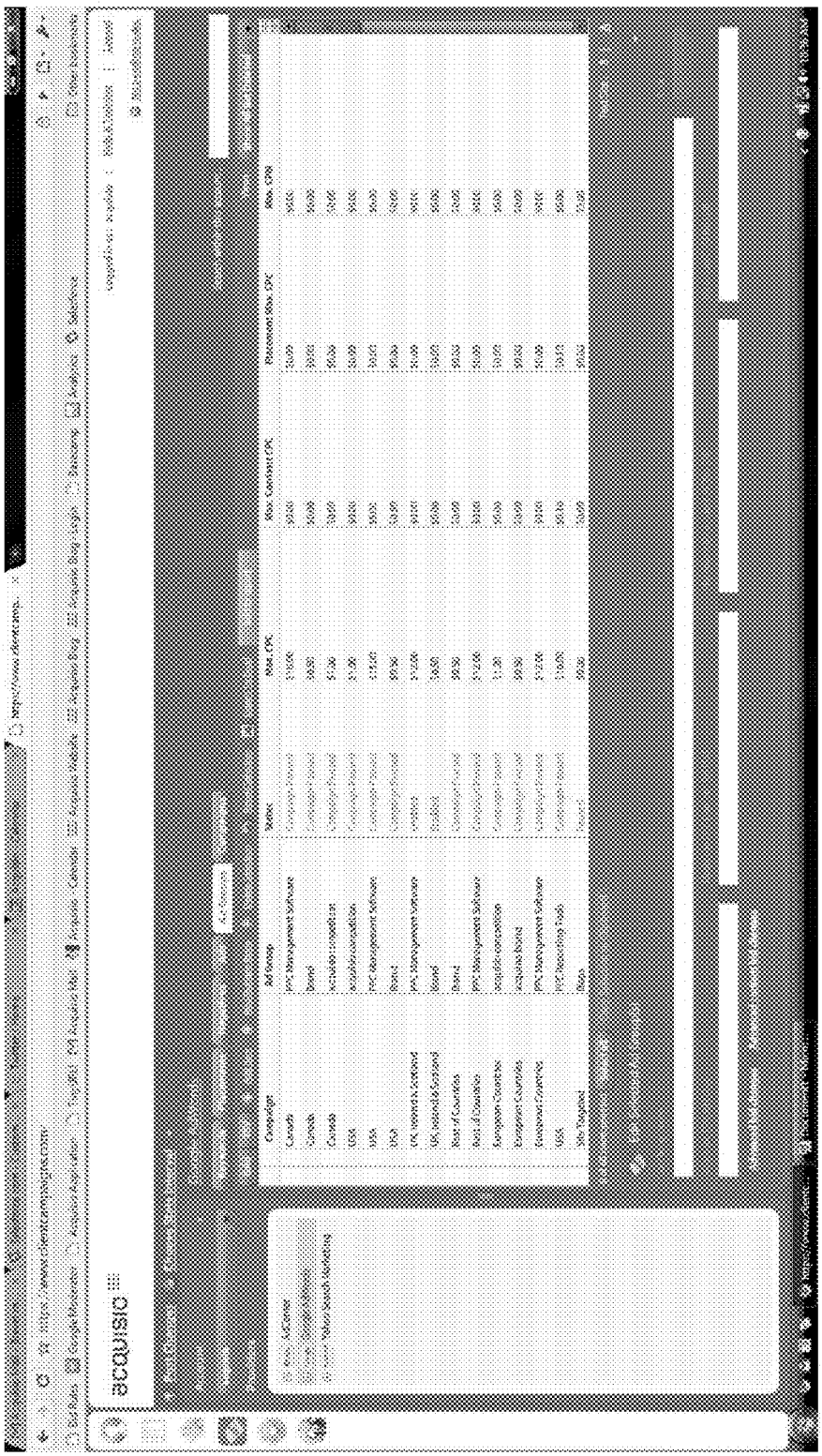
Figure 1H:
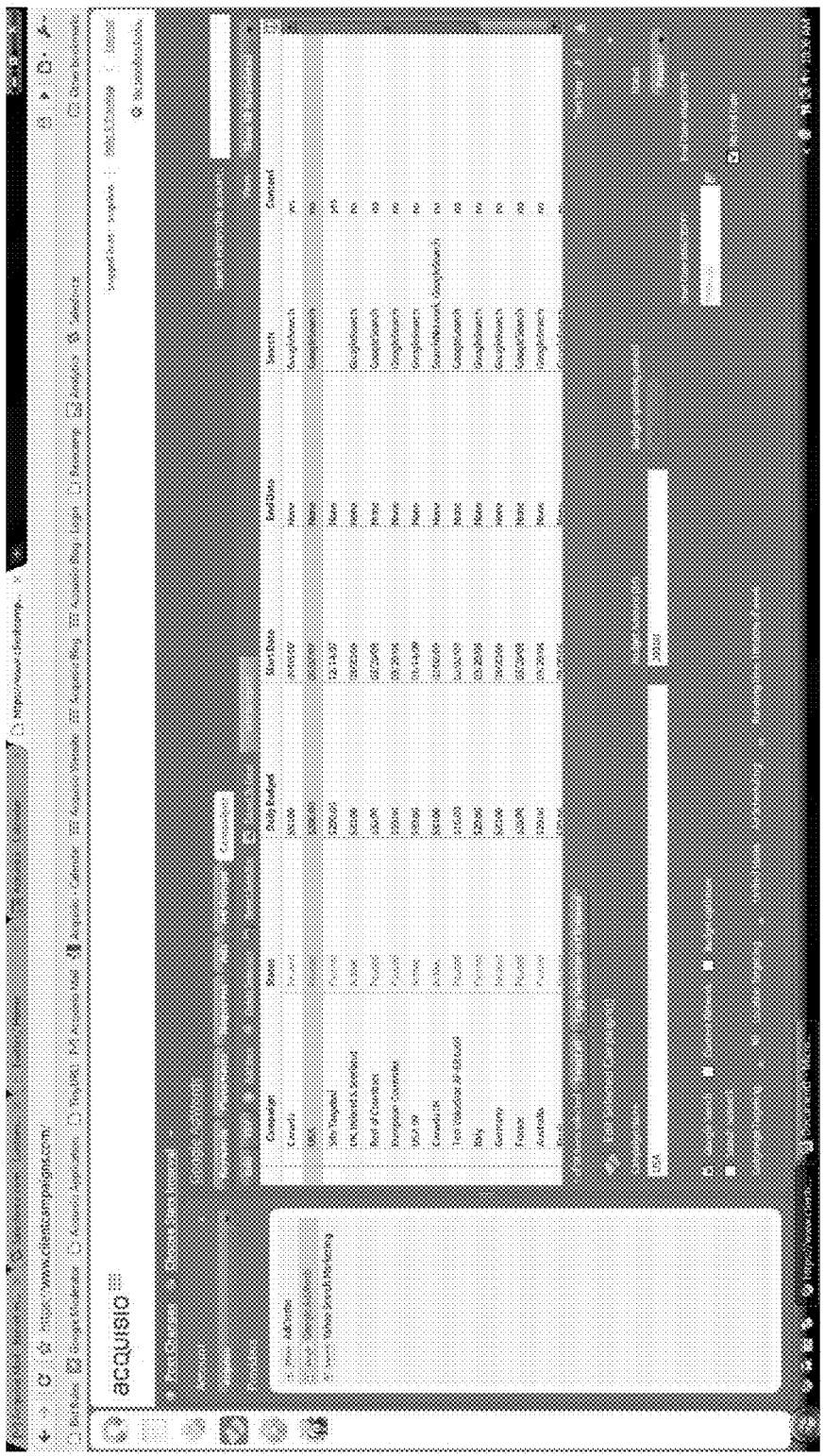

FIG. 1E Other ad formats are supported, for example, Image ads, Local business ads, and Mobile ads are all supported FIG. 1G Adgroup properties can be managed as well, status, and pricing info such as default cpc, max content cpc, placement max cpc, max cpm FIG. 1H Campaign info is available too. Status, Daily Budget, Start and end dates, search vs content network, geo targeting, language targeting, day parting.

Figure 1I:
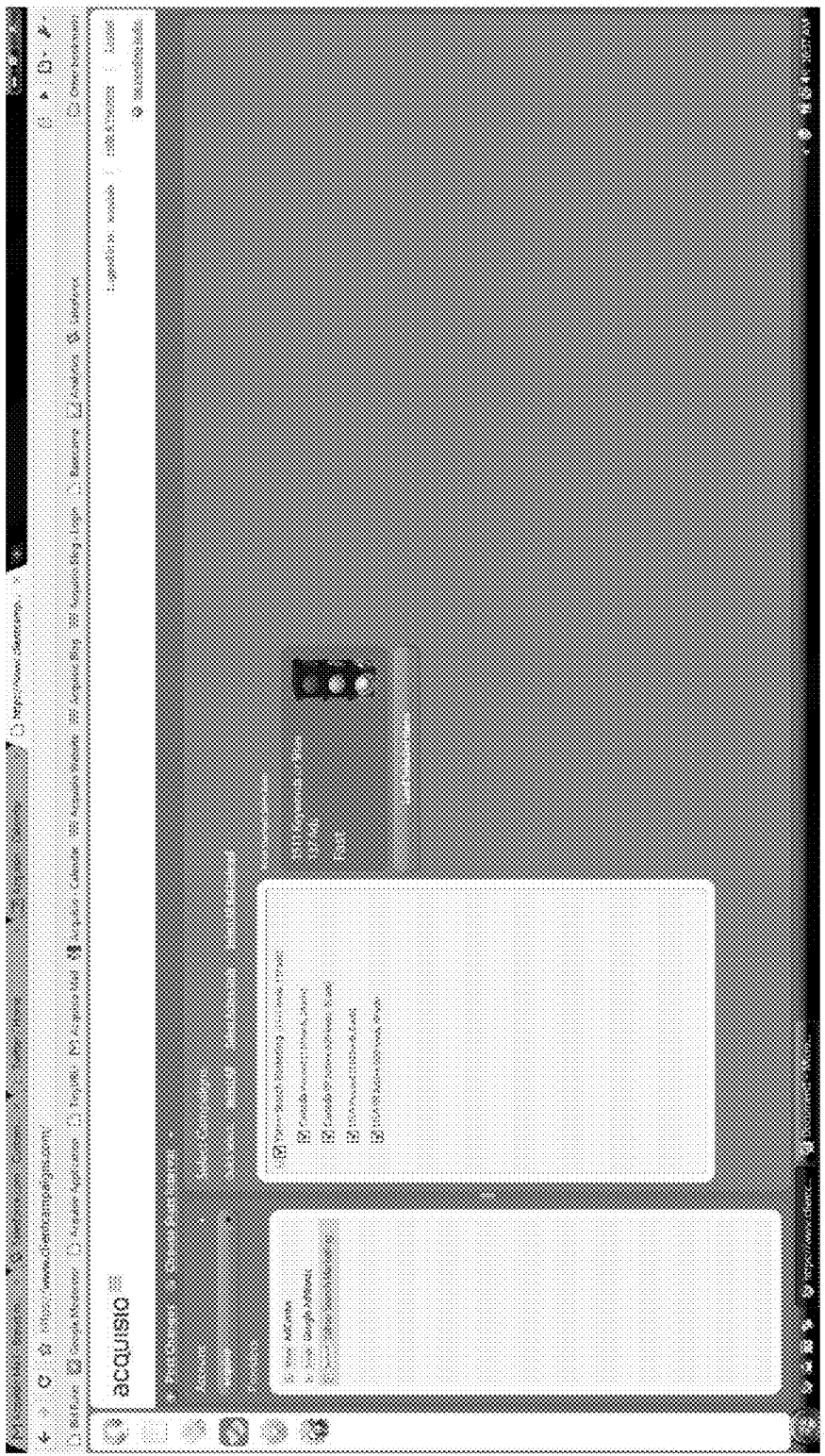

FIG. 1I It is possible to load only specific campaigns—because some campaigns can contain millions of keywords, this allows users to control the performance of the application and to load only what is necessary into the editor.

Figure 1J:
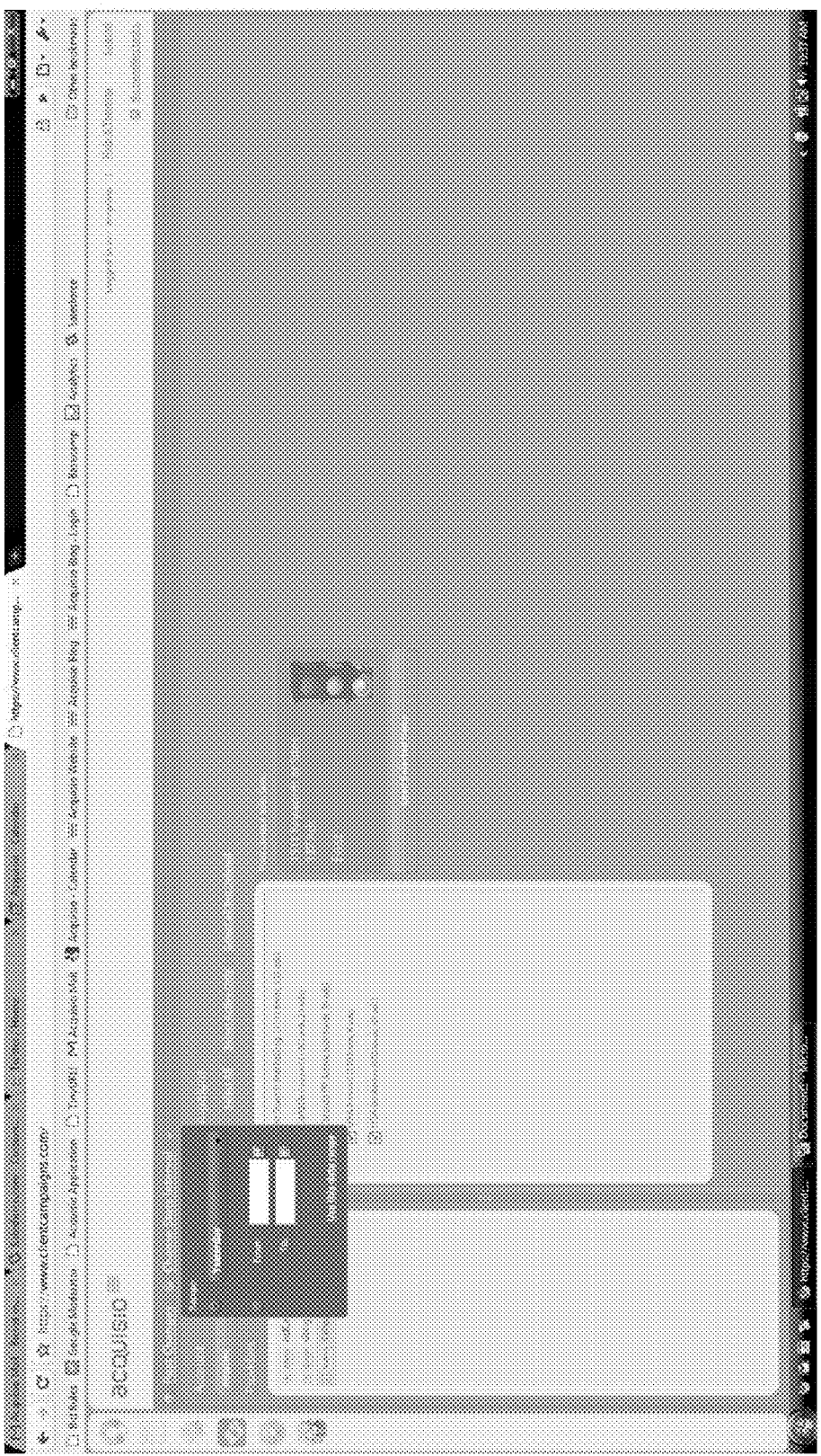
Figure 1K:
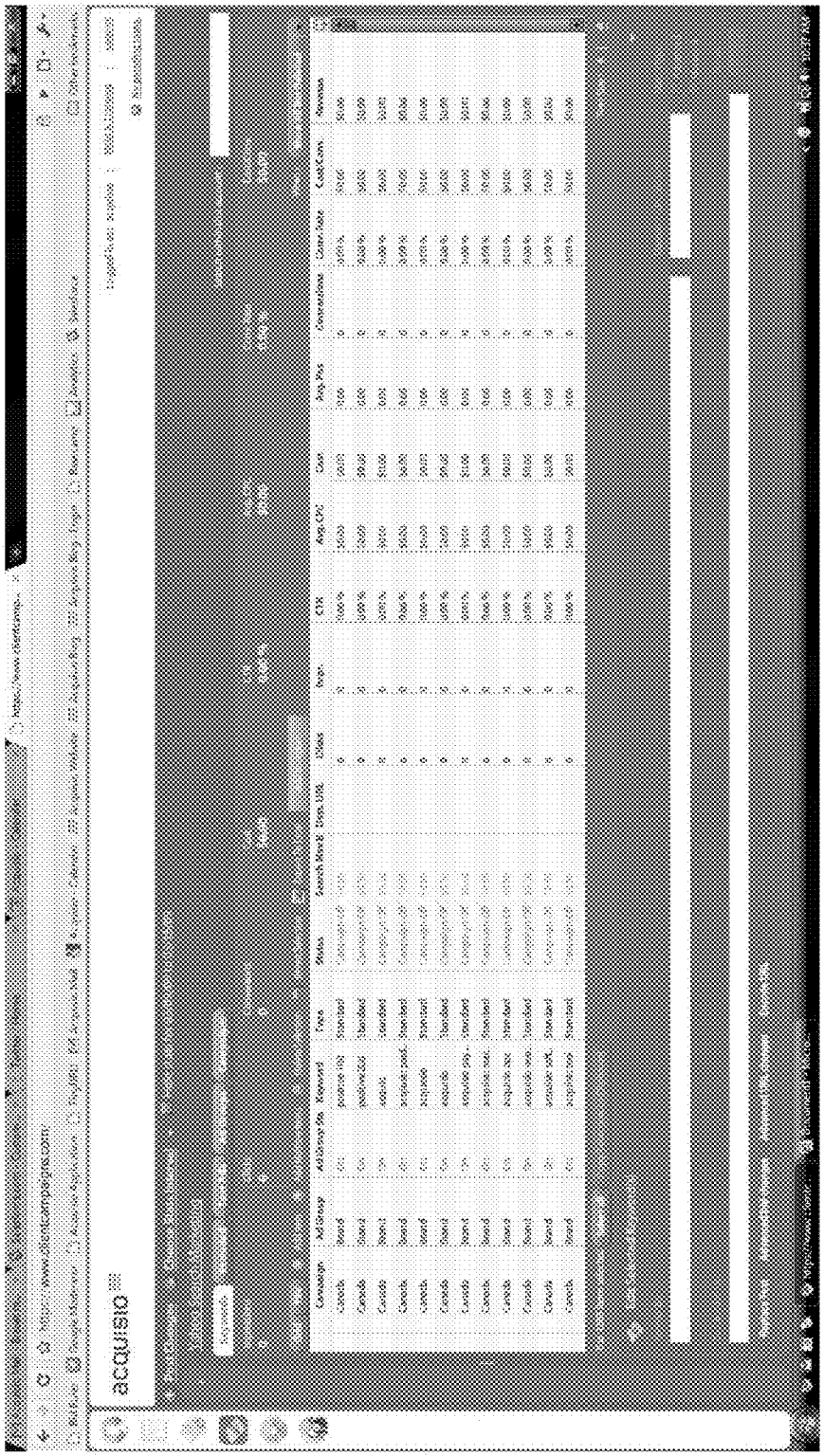

FIG. 1J Users can also load detailed historical stats for each item (keyword, site, ad group, ad of any format, and campaign)

Bulk Editor

Campaign Selector Specs (Module: Mass Editor) In order to support the edition of large search engine account (more than 30k-40k keywords), it is suggested to offer to users the ability to pick the ppc campaigns they want to see in the mass editor instead of loading all campaigns at all time. The campaign selector will give the users this flexibility.

Normal Flow

1. The user clicks on the mass editor icon and gets access to the mass editor for the first time.
2. The user selects an account to mass edit.
3. The user clicks on a provider account (search engine account).
4. The campaign selector opens to the right.
   a. If the user does not have a previous selection saved for this provider account:
   Let the user select which campaigns and, within the selected campaigns, which ad groups to load.
   Save the selection for that specific provider account in the user preferences.
   b. If the user has a previous selection saved for this provider account:
   Pre-select the campaigns and ad groups.
   Let the user select which campaigns and, within the selected campaigns, which ad groups to load.
   If the selection is different from the saved one, save the new selection in the user preferences.
5. Load the mass editor using the selected items.

Sequence Diagrams

Figure 2A:
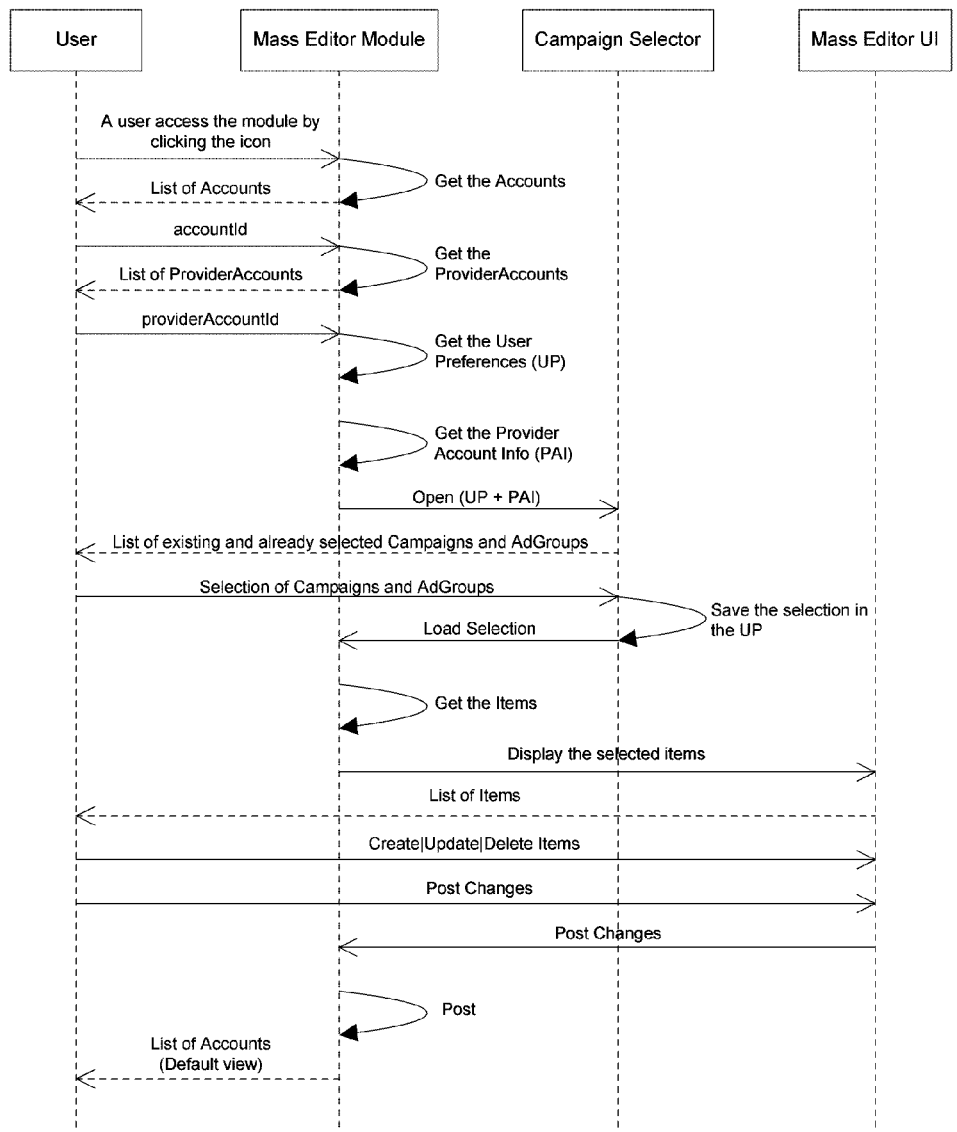
FIG. 2A is a sequence diagram of the mass editor module of the system.
Figure 2B:
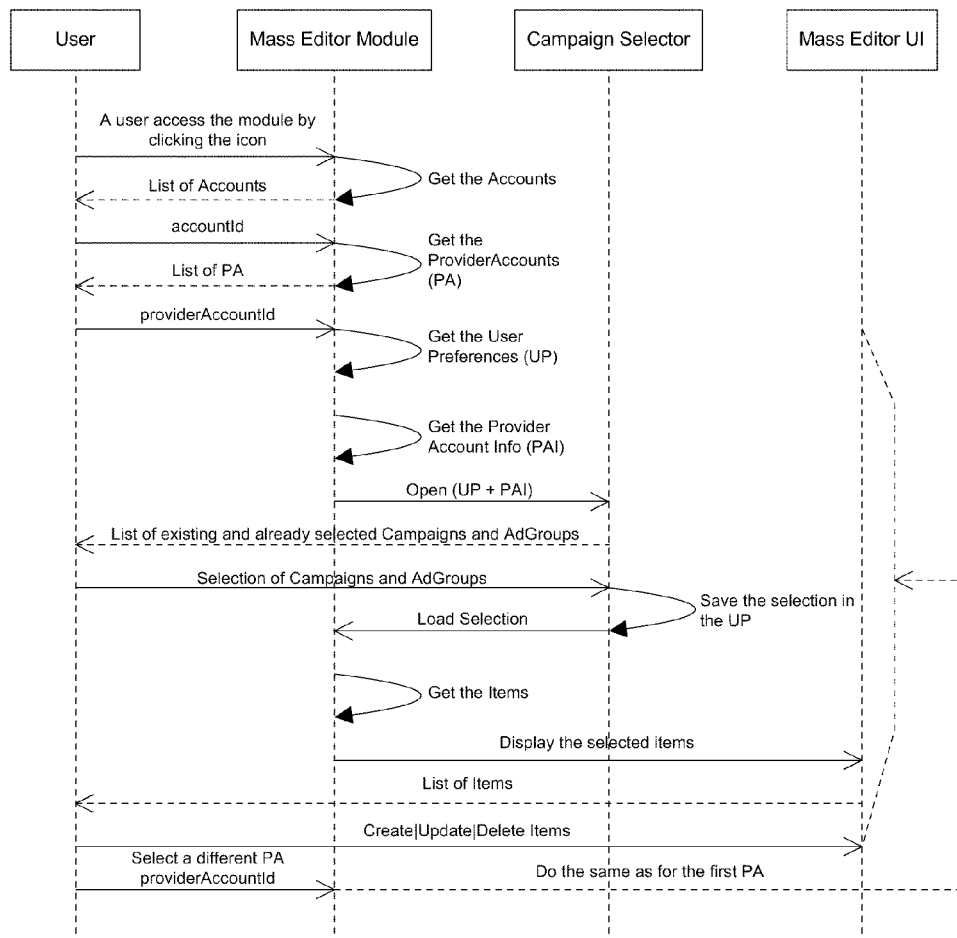
FIG. 2B is another sequence diagram of the mass editor module of the system.

Normal sequence—Case #1: A user goes to the mass editor module, chooses an account, chooses a provider account, does some creates, updates and deletes, posts them, as shown in FIG. 2A Normal sequence—Case #2:

A user goes to the mass editor module, chooses an account, chooses a provider account, does some creates, updates and deletes, selects a different provider account, does some changes and posts them, as shown in FIG. 2B.

Figure 2C:
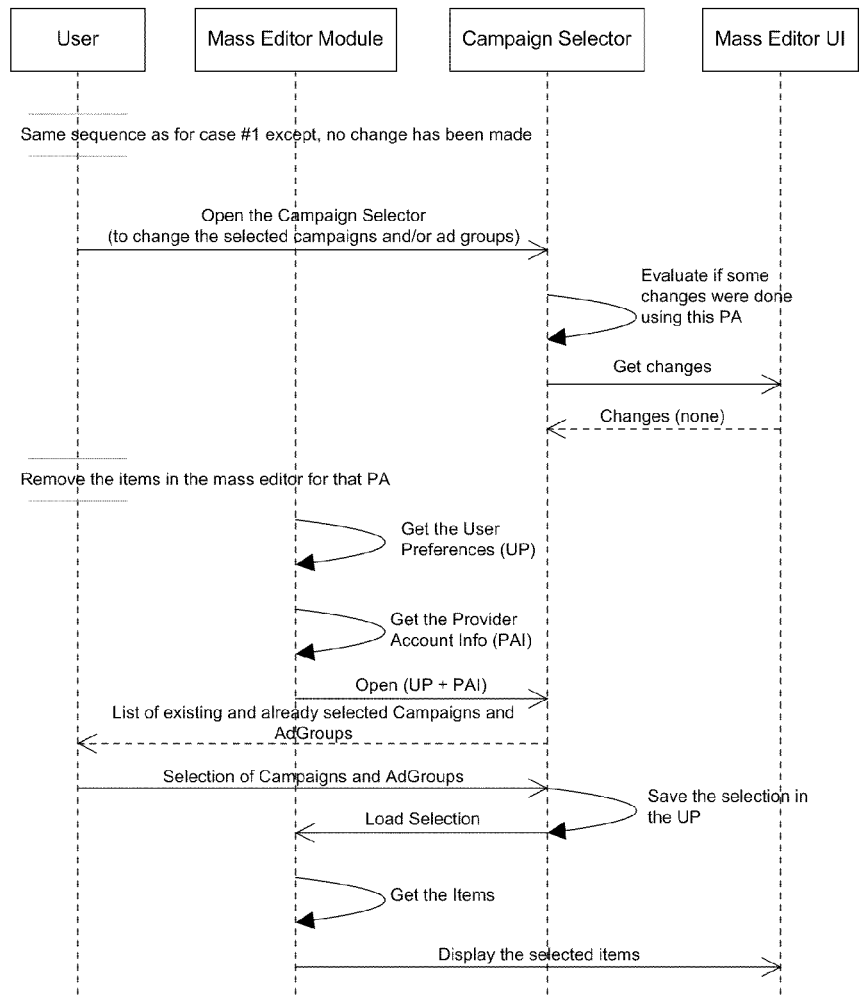
FIG. 2C is another sequence diagram of the mass editor module of the system.

Special sequence—Case #3:

A user goes to the mass editor module, chooses an account, chooses a provider account, does not perform any changes and then decides to change his selection of campaigns and ad groups using the campaign selector, as shown in FIG. 2C.

Figure 2D:
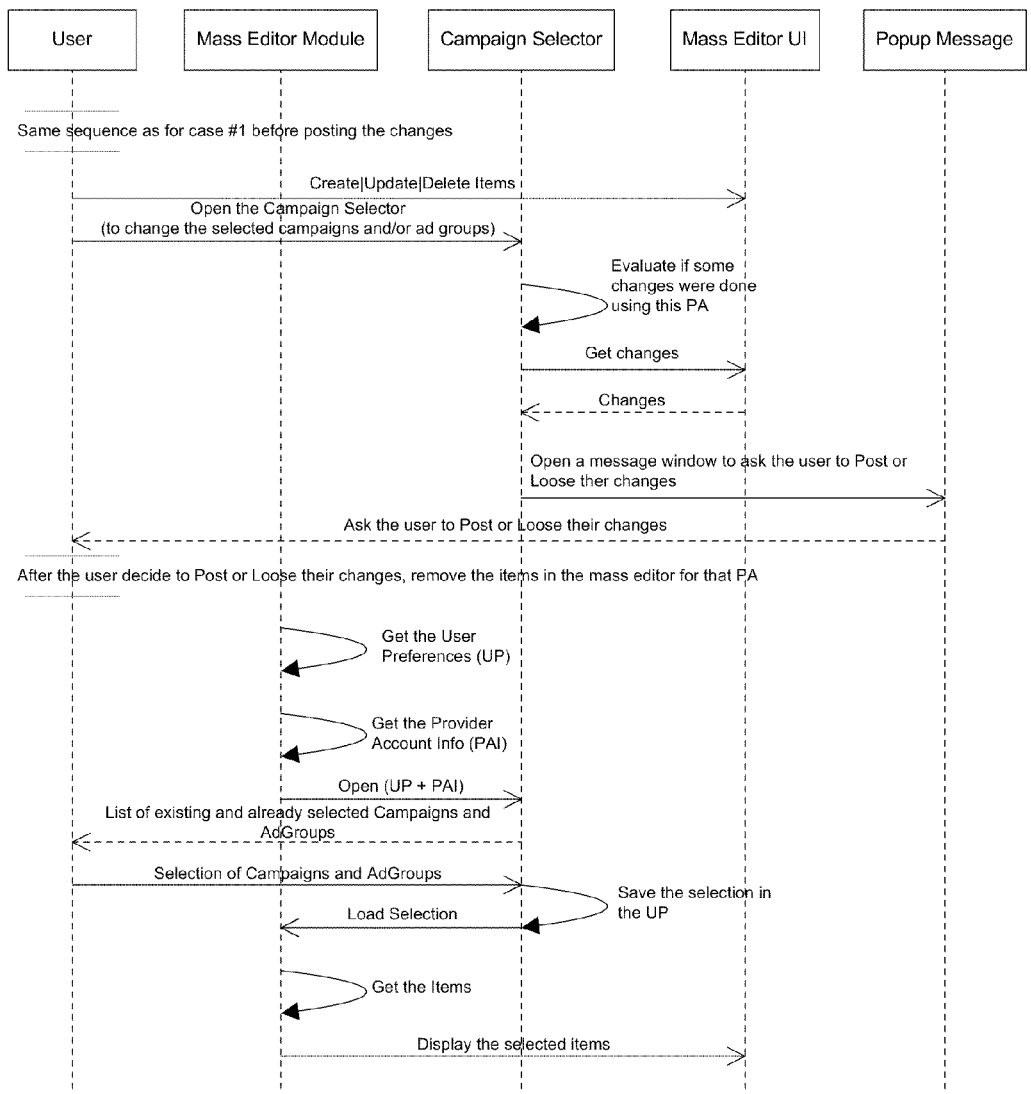
FIG. 2D is another sequence diagram of the mass editor module of the system.

Special sequence—Case #4:

A user goes to the mass editor module, chooses an account, chooses a provider account, does some creates, updates and deletes and then decides to change his selection of campaigns and ad groups using the campaign selector, as shown in FIG. 2D.

Filter

When selecting the campaigns and adgroups

Let the user filter the campaigns and adgroups based on their status (Active, Pending|Draft, Paused, Deleted).

Nice-to-have filter

Let the user filter the campaigns and adgroups based on their name (campaigns that contain "english", adgroups that contain "botox").

Add the option to remember the selection (checked items) when applying a filter, ie. if a user selected all pending campaigns and the user applies a filter on campaigns that contain the word "English", keep the pending items as checked even if not shown at the screen. Add a button to view selected item.

Figure 2F:
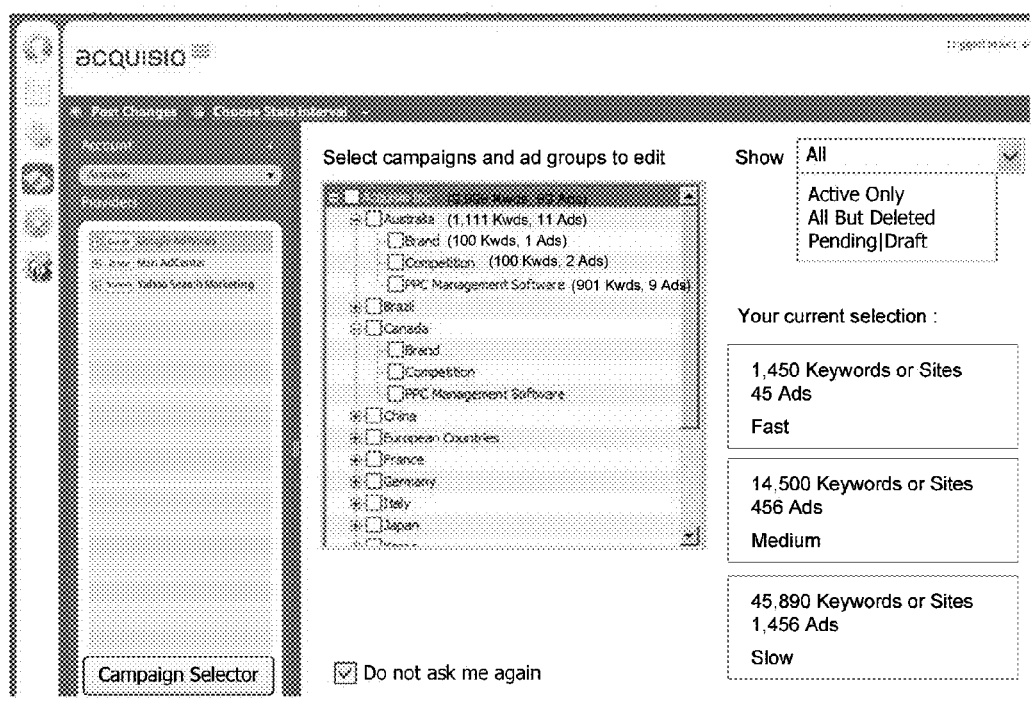
Figure 2G:
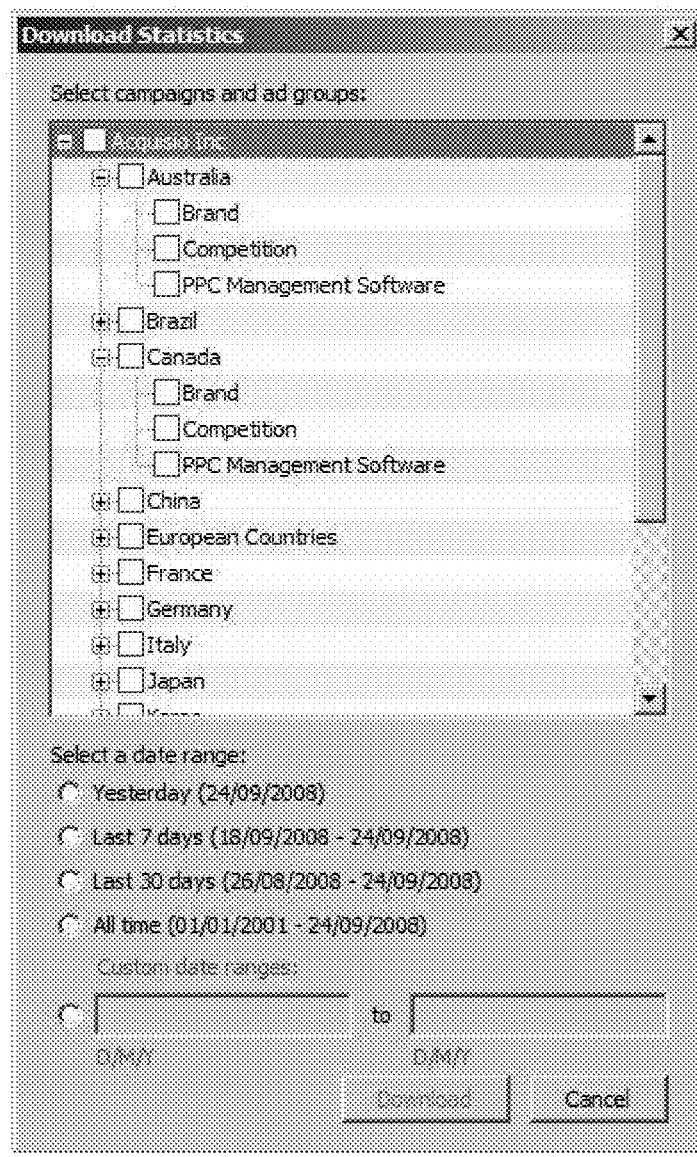
Figure 2H:

FIG. 2E shows some functions of the campaign selector and FIGS. 2F to 2H show a screenshot showing an embodiment of an interface displayed on a user processing device. FIG. 2G shows more particularly the adwords editor download stats campaigns and FIG. 2H the adgroups selector showing the parent check box with child selected.

Figure 3A:
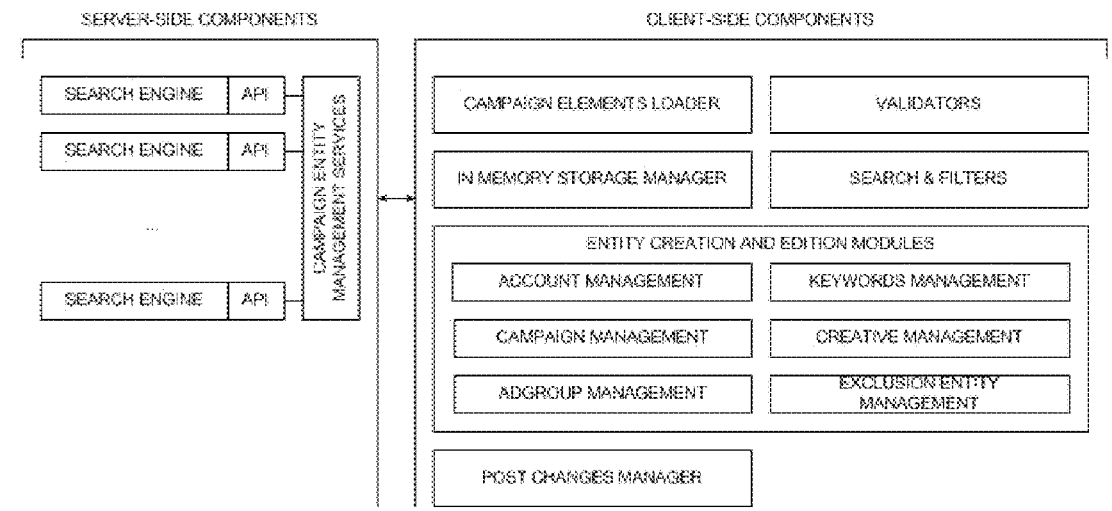
FIGS. 3A and 3B are flowcharts illustrating the steps processed by the bulk editor.
Figure 3B:
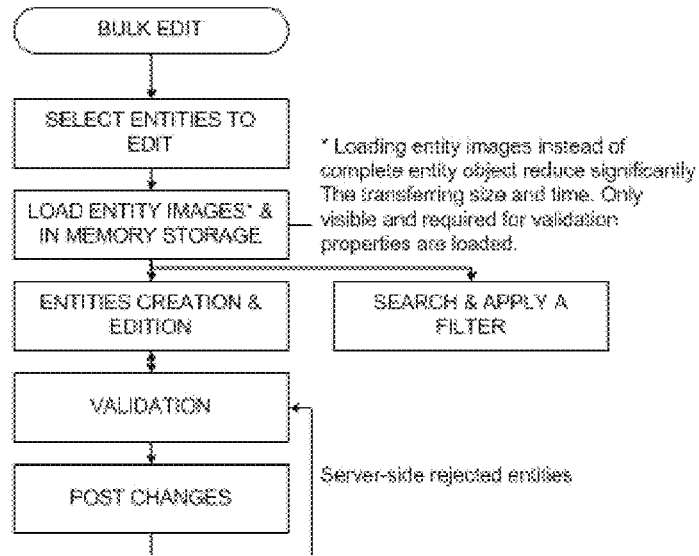

FIGS. 3A and 3B illustrates the steps processed or done by the bulk editor. More particularly detailing the steps done on the server side and on the client side in FIG. 3A. FIG. 3B is a flow chart illustrating the step to edit bulk data.

Figure 4A:
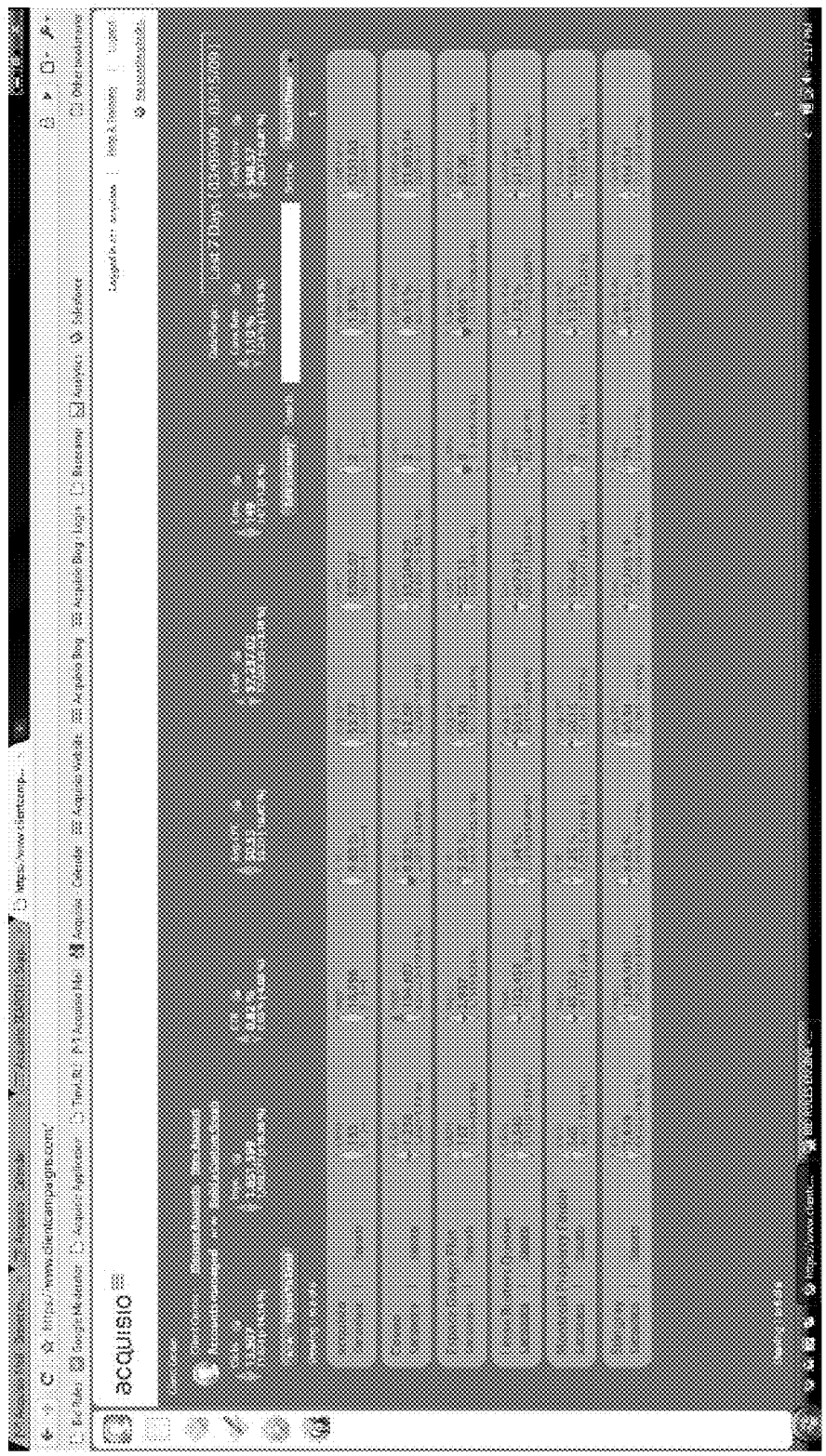
FIGS. 4A to 4M are screenshots of the campaign optimization module.

FIG. 4A shows a screenshot of the client center—this is where the clients login, they can see all their client accounts in a consolidated view that gives them an indication of performance for any metric they wish to monitor, and its trends over time.

Figure 4B:
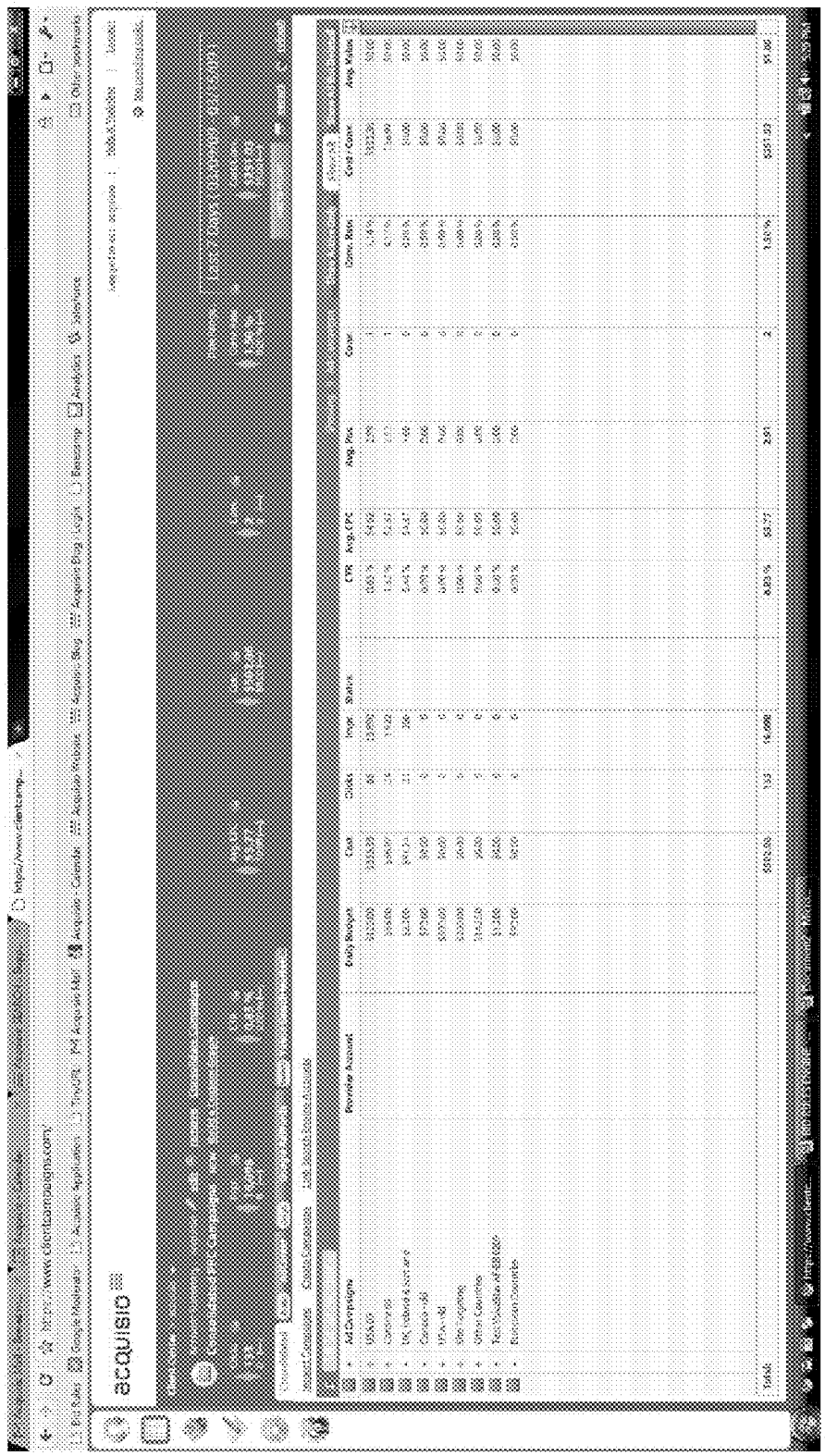

FIG. 4B shows the consolidated campaign view (campaign browser).

Figure 4C:
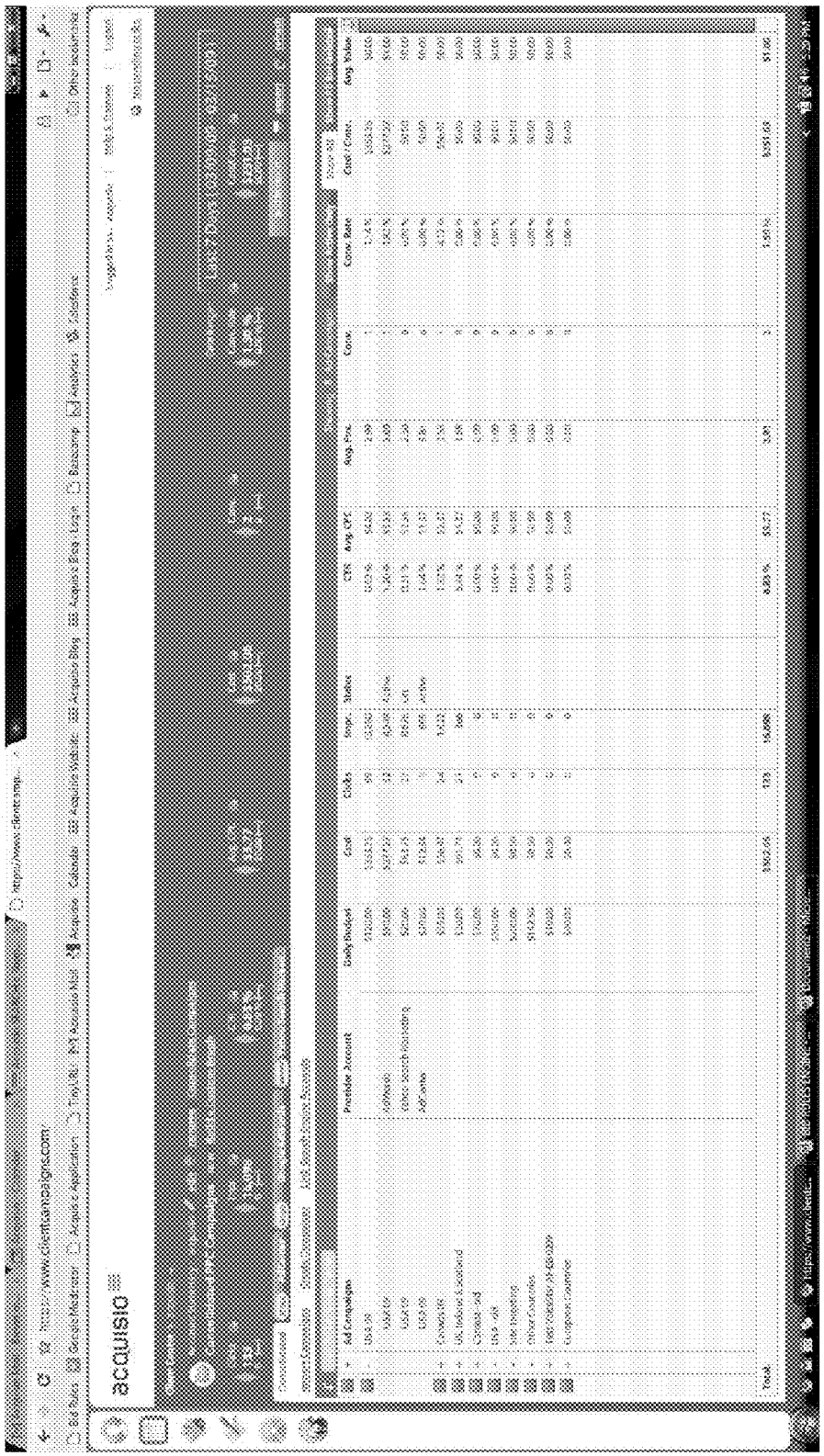

FIG. 4C shows a breakdown by search engine.

Figure 4D:

FIG. 4D shows a search engine view (Google)—AdGroups.

Figure 4E:
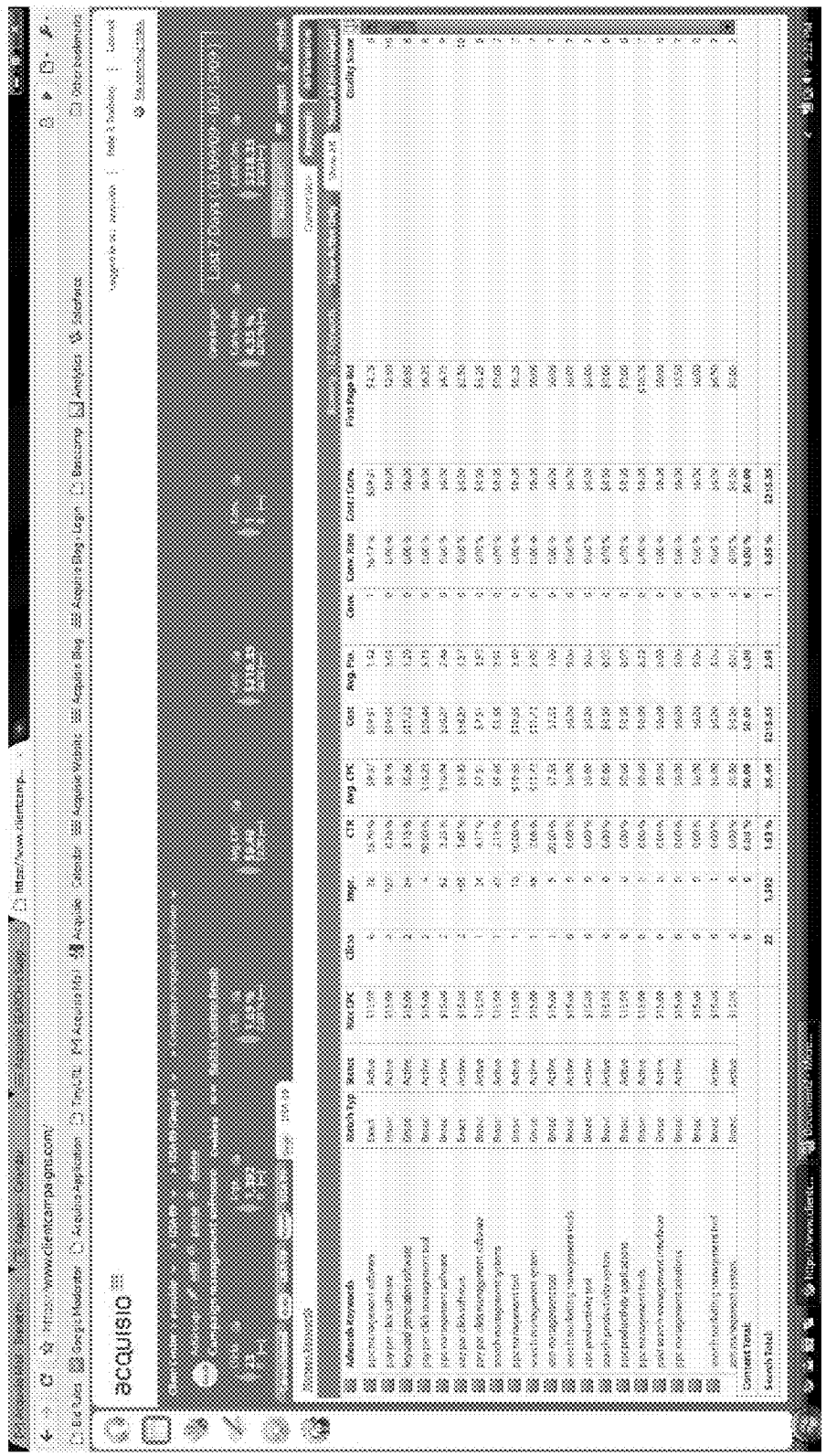

FIG. 4E show keyword details of a campaign.

Figure 4F:
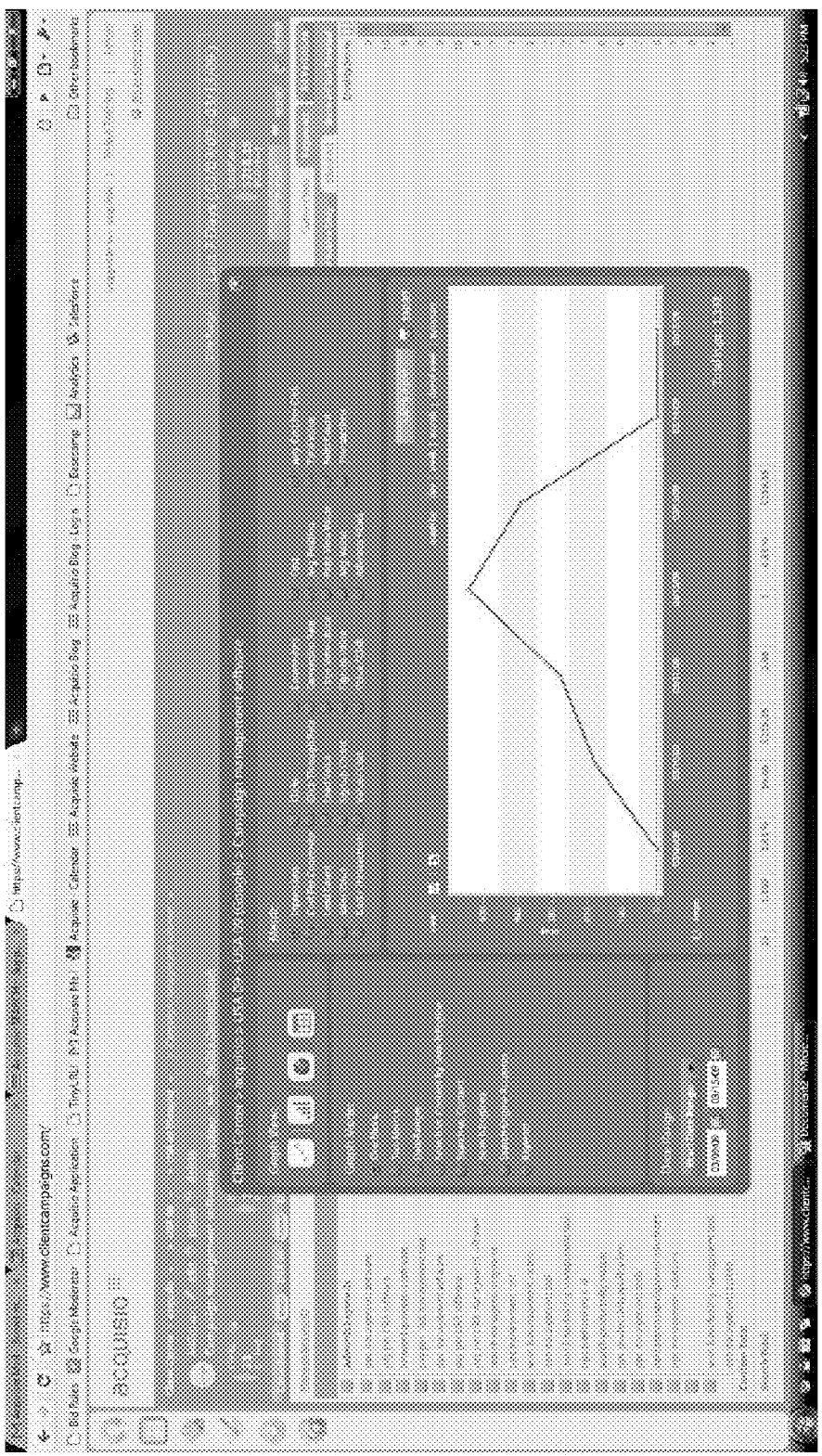

FIG. 4F shows a graph created by the option "Create a custom graph".

Figure 4G:
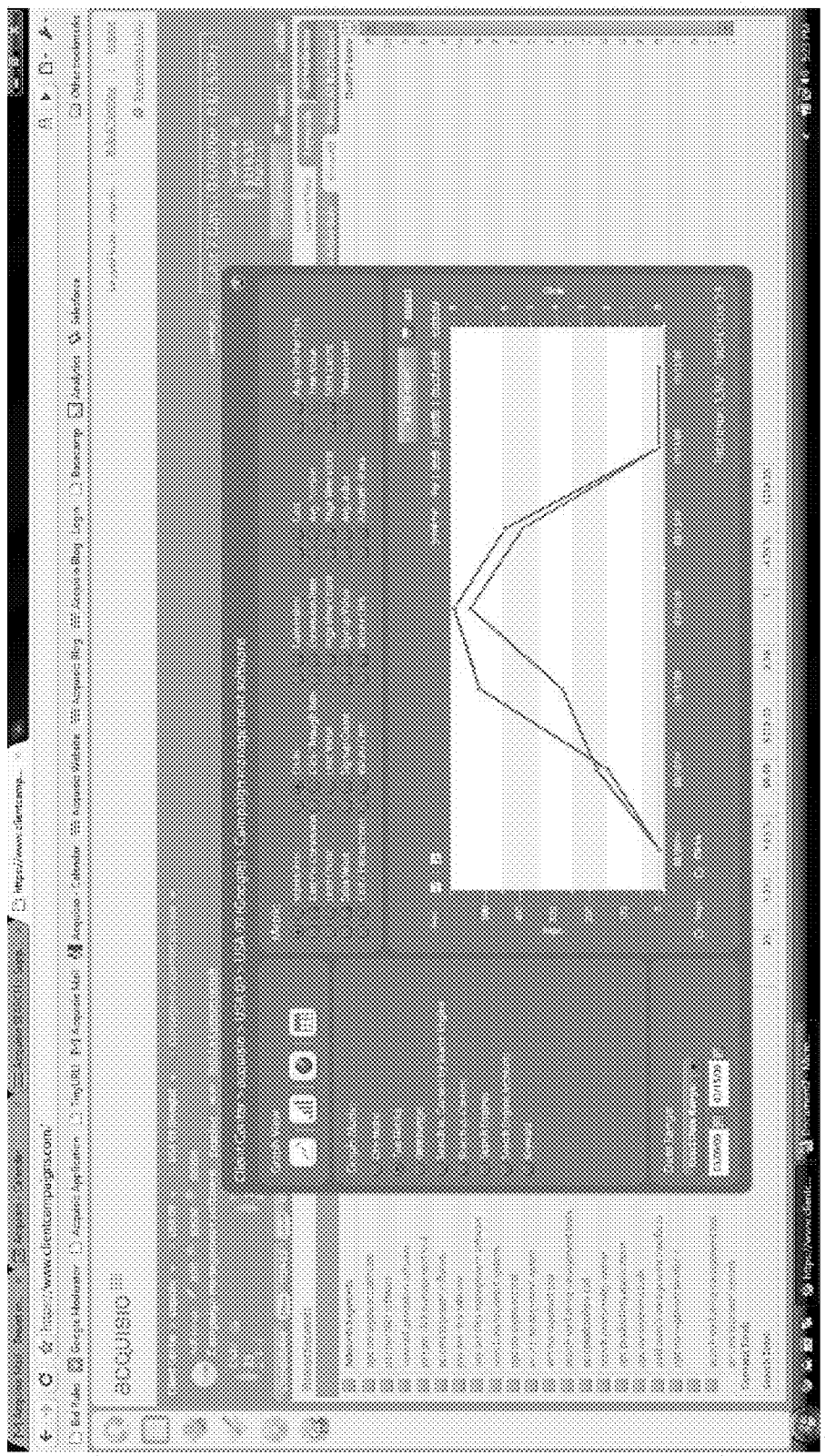

FIG. 4G shows another graph created by the option "Create a custom graph".

Figure 4H:
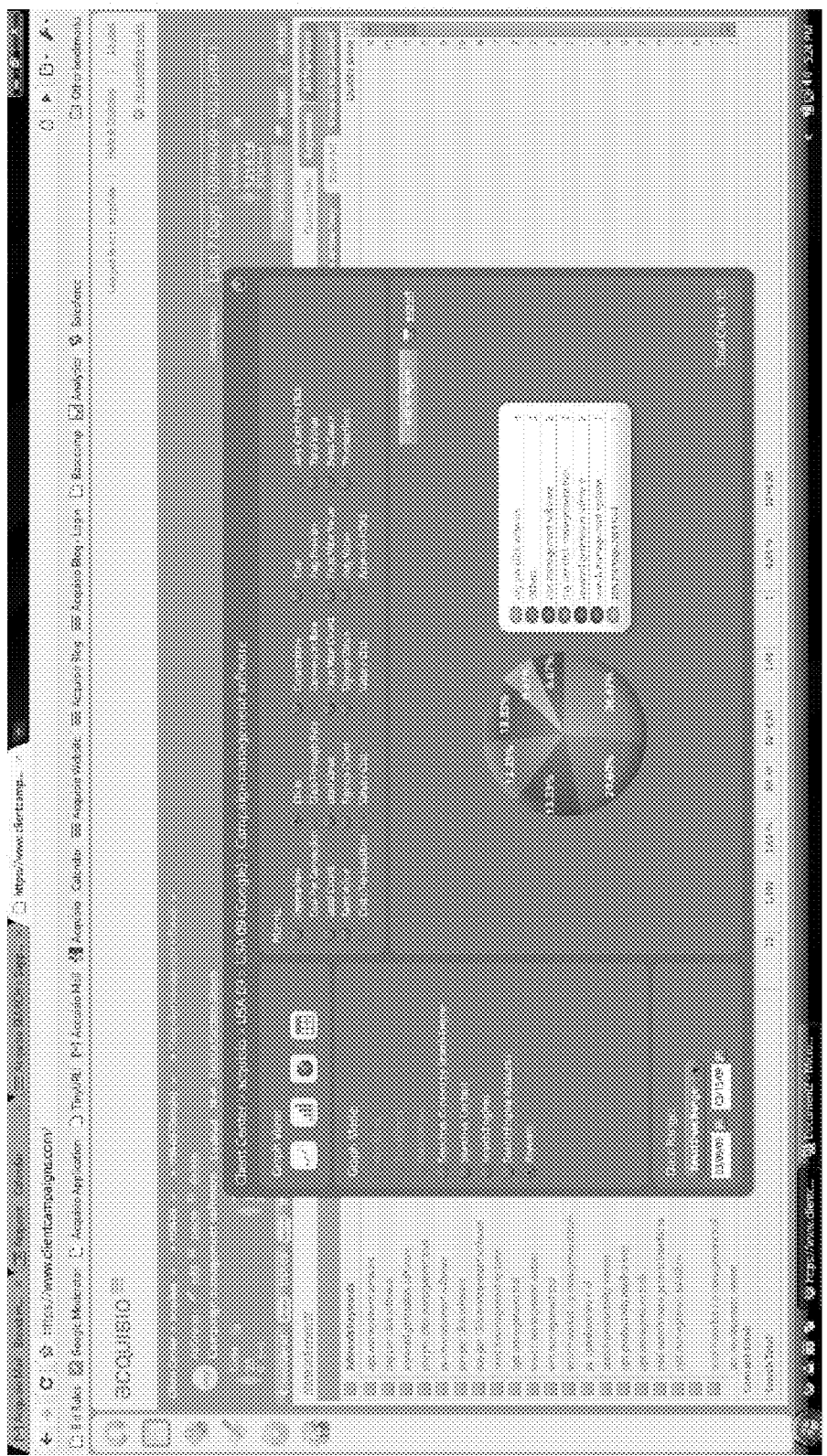

FIG. 4H shows another graph created by the option "Create a custom graph".

Figure 4I:
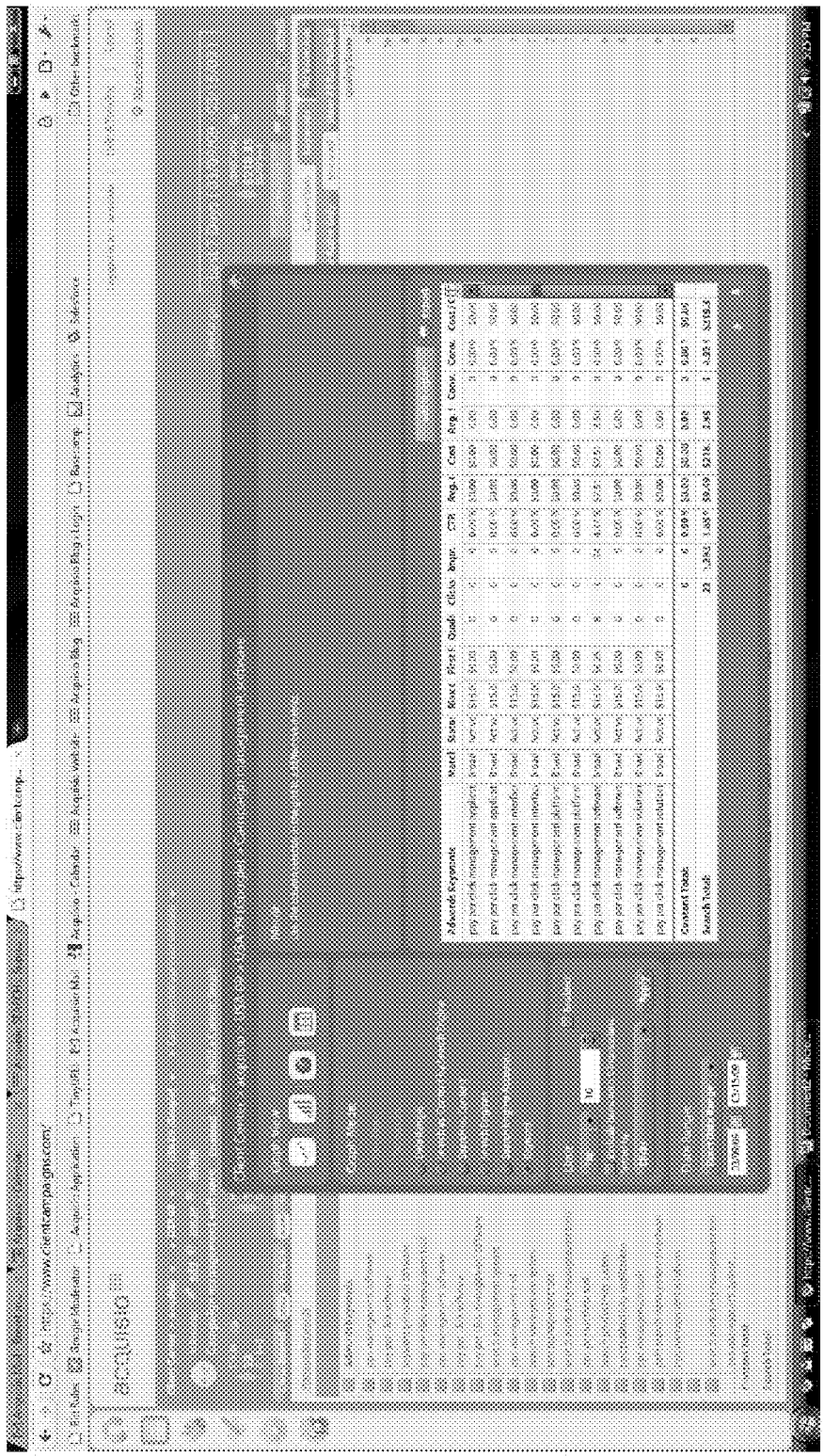

FIG. 4I shows the metric of a campaign.

Figure 4J:
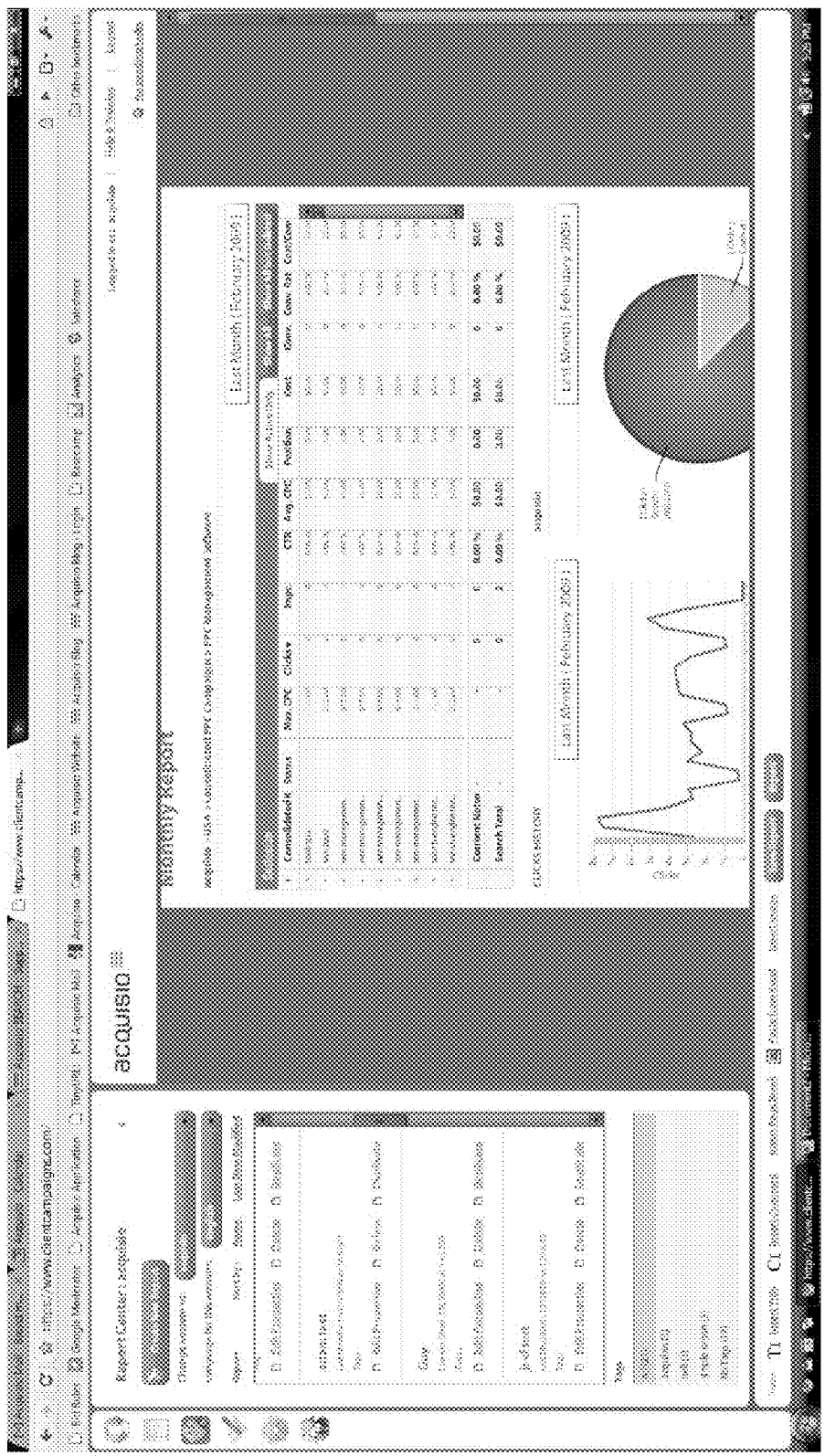

FIG. 4J shows the result of a table and a custom graph added to a client report.

Figure 4K:
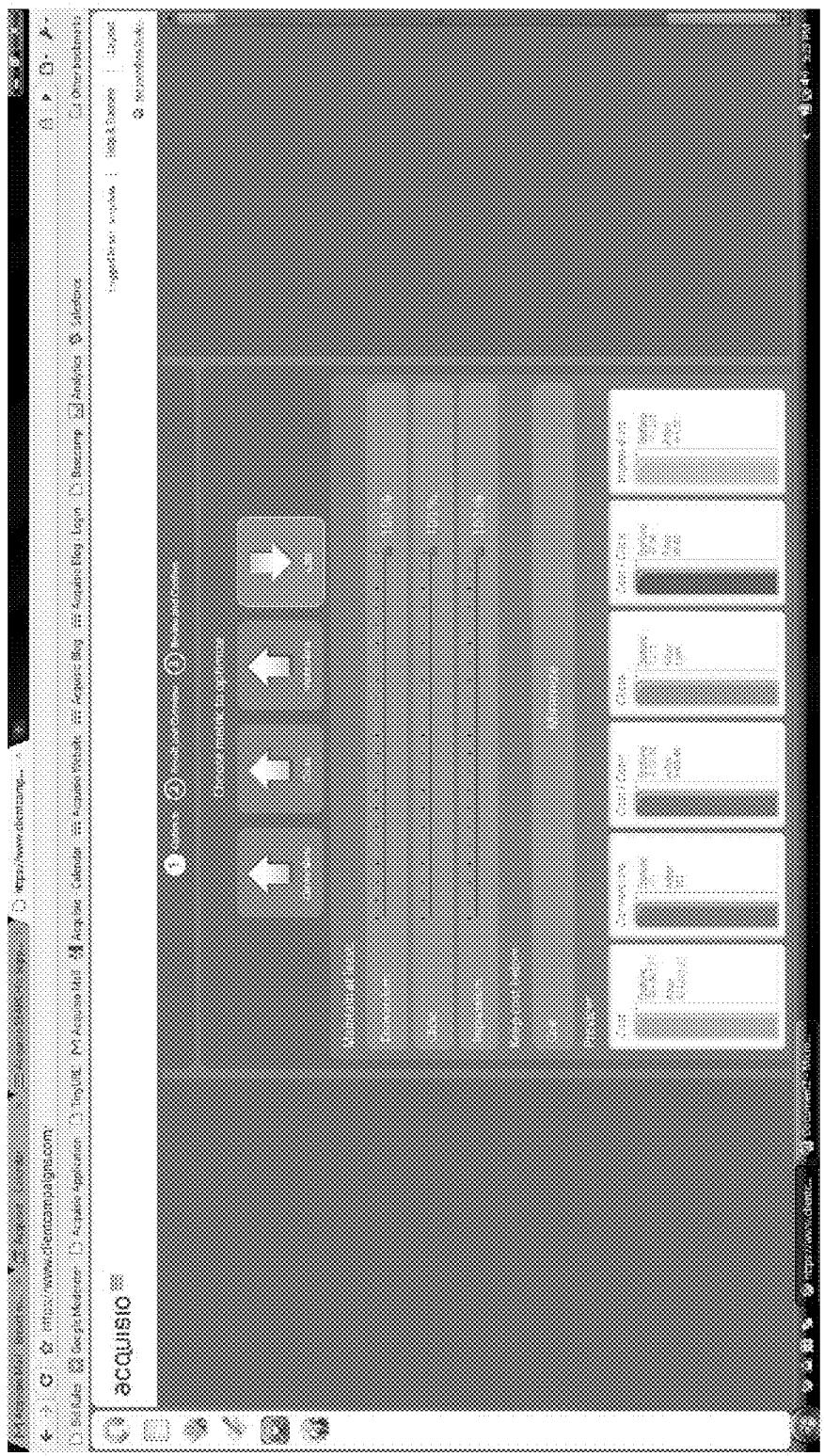

FIG. 4K shows a screenshot of the section "Campaign Optimization".

Figure 4L:
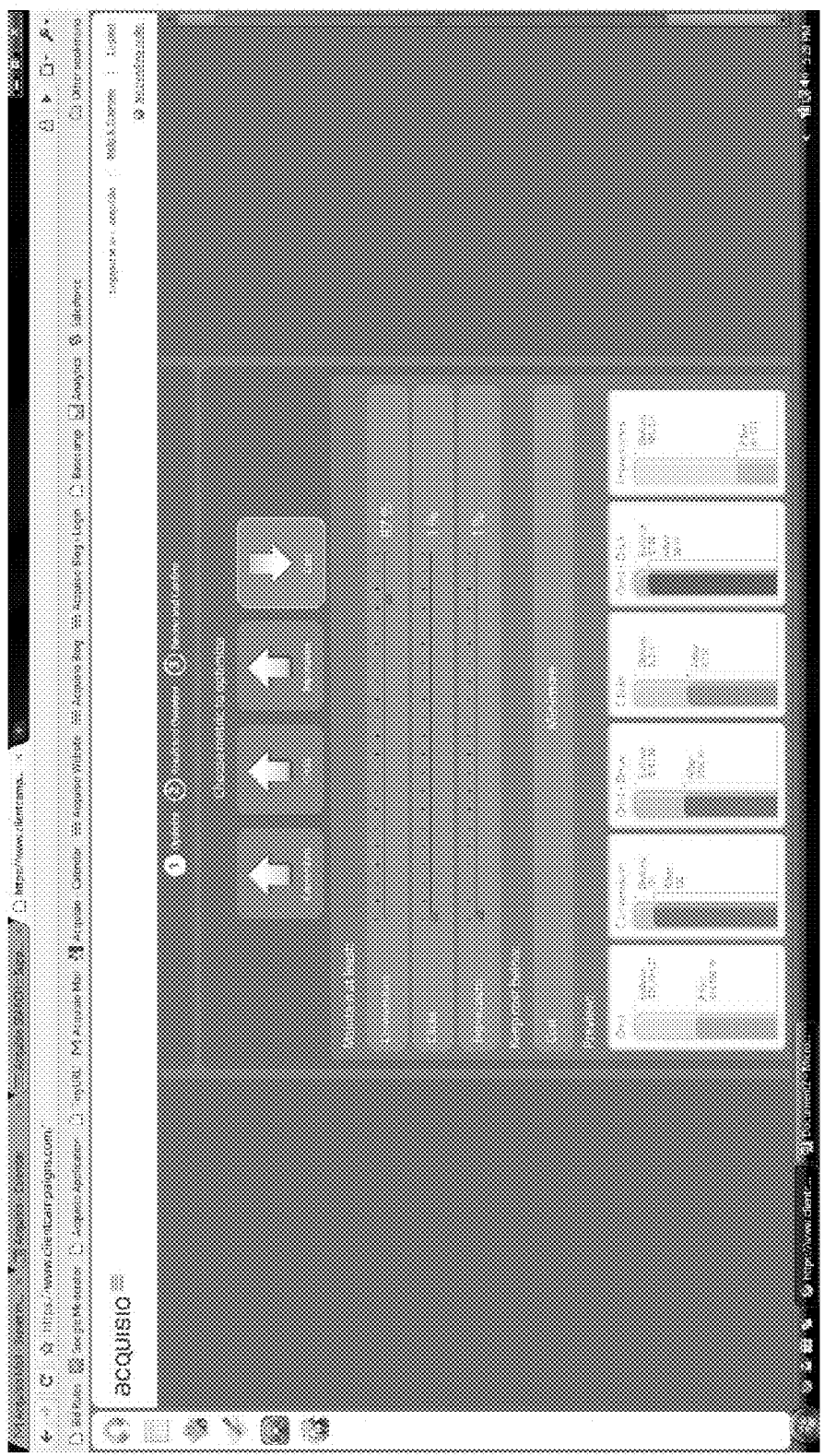

FIG. 4L shows a result after a user used sliders to determine constraints and optimize one metric (minimize cost for example).

Figure 4M:
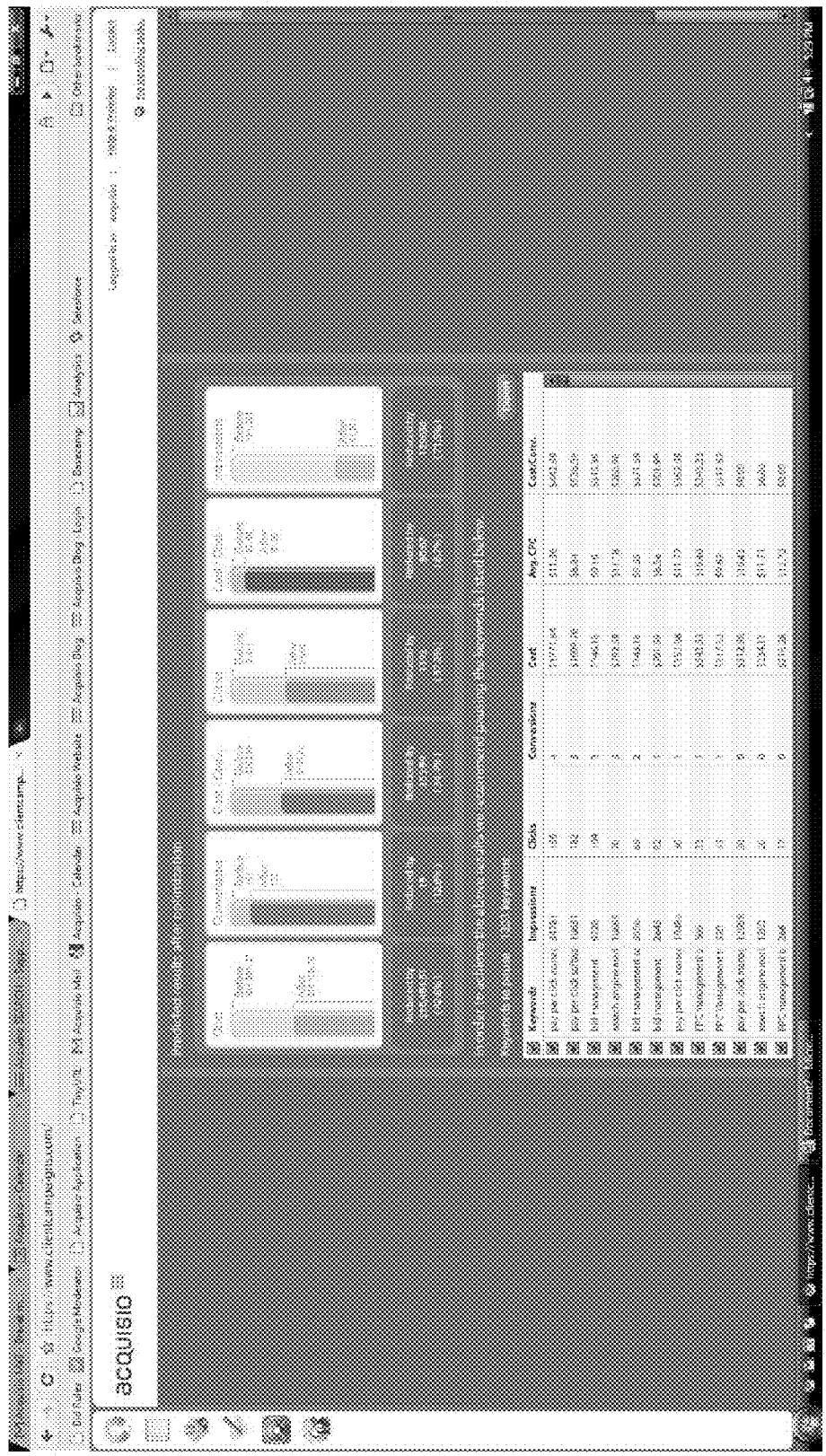

FIG. 4M shows a screenshot of a list of keywords that need to be paused.

Bid Rules Engine

Figure 5A:
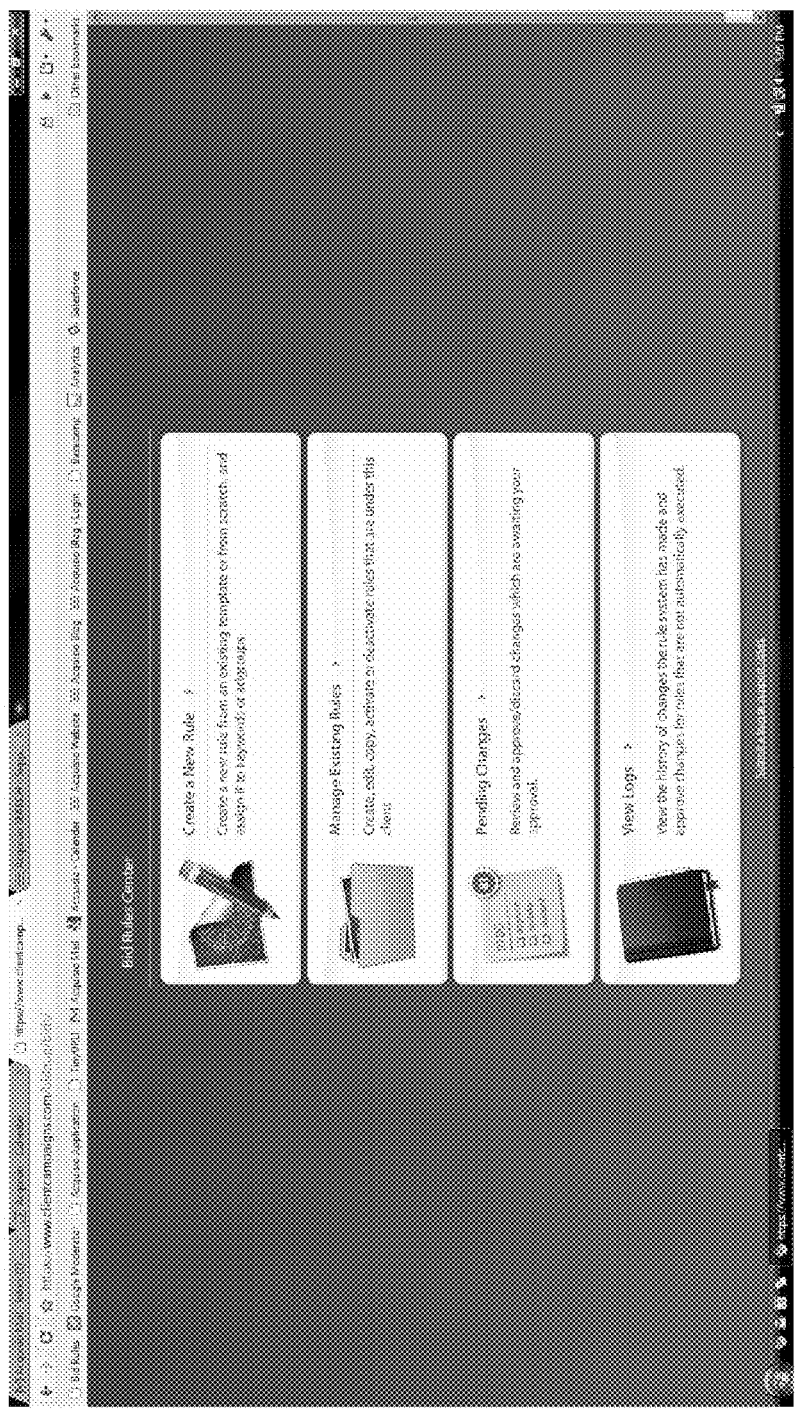

The section BID RULES ENGINE of the system allows agencies to manage the price they pay for clicks automatically according to sophisticated business rules they either create from scratch or from templates we supply. They can have the rules executed automatically, or be prepared and await approval. There is also a report to show the impact of changes on the performance of campaigns, similar to Google Finance, with a timeline and inflection points (markers) to show when a rule was executed. FIG. 5A shows the screenshot of the bid rules center.

Figure 5B:

FIG. 5B In the section "Create a new rule", the user decide if it is for keywords or adgroups, and if you want to use a template or design your own rule.

Figure 5C:
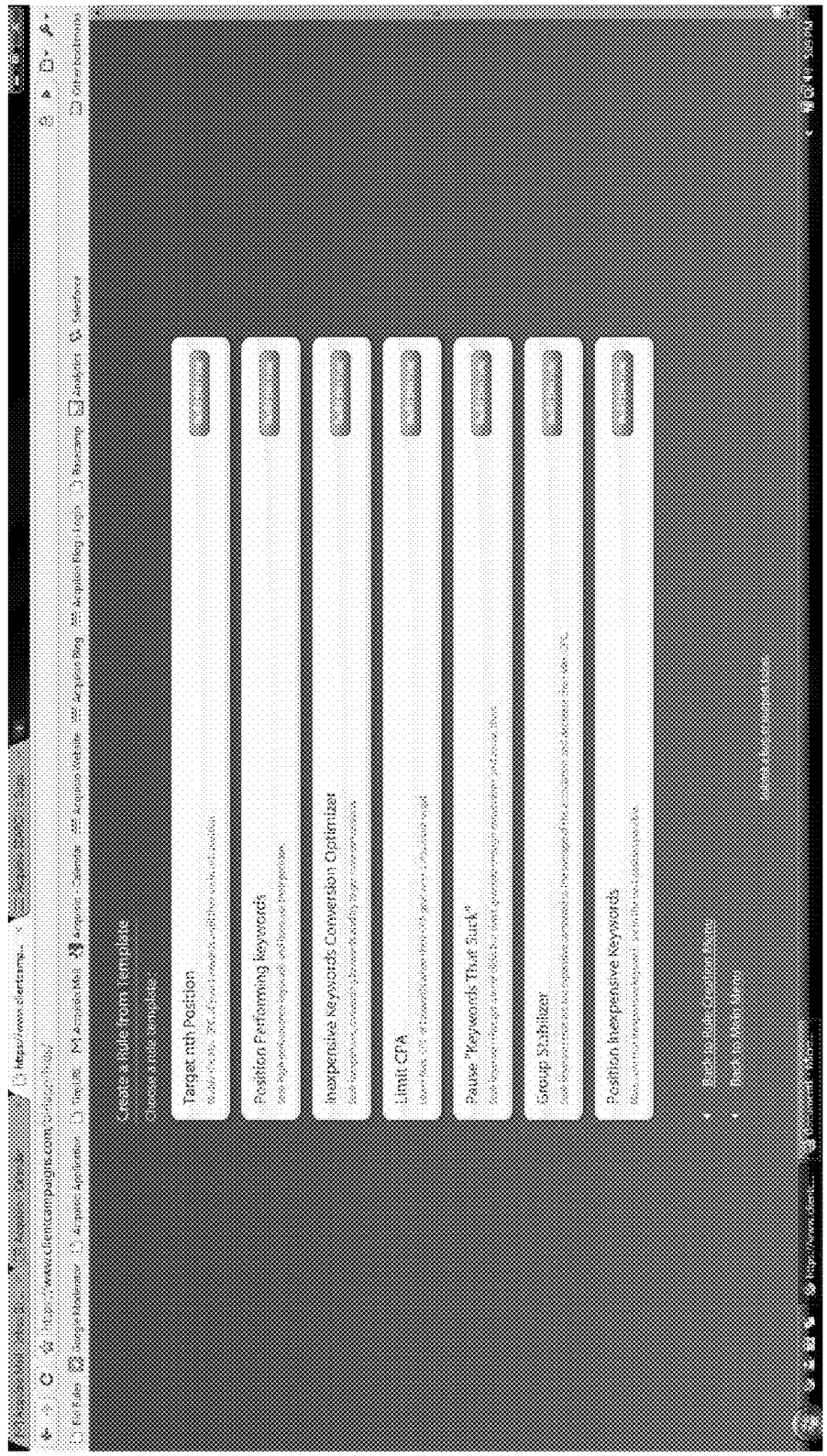
Figure 5D:
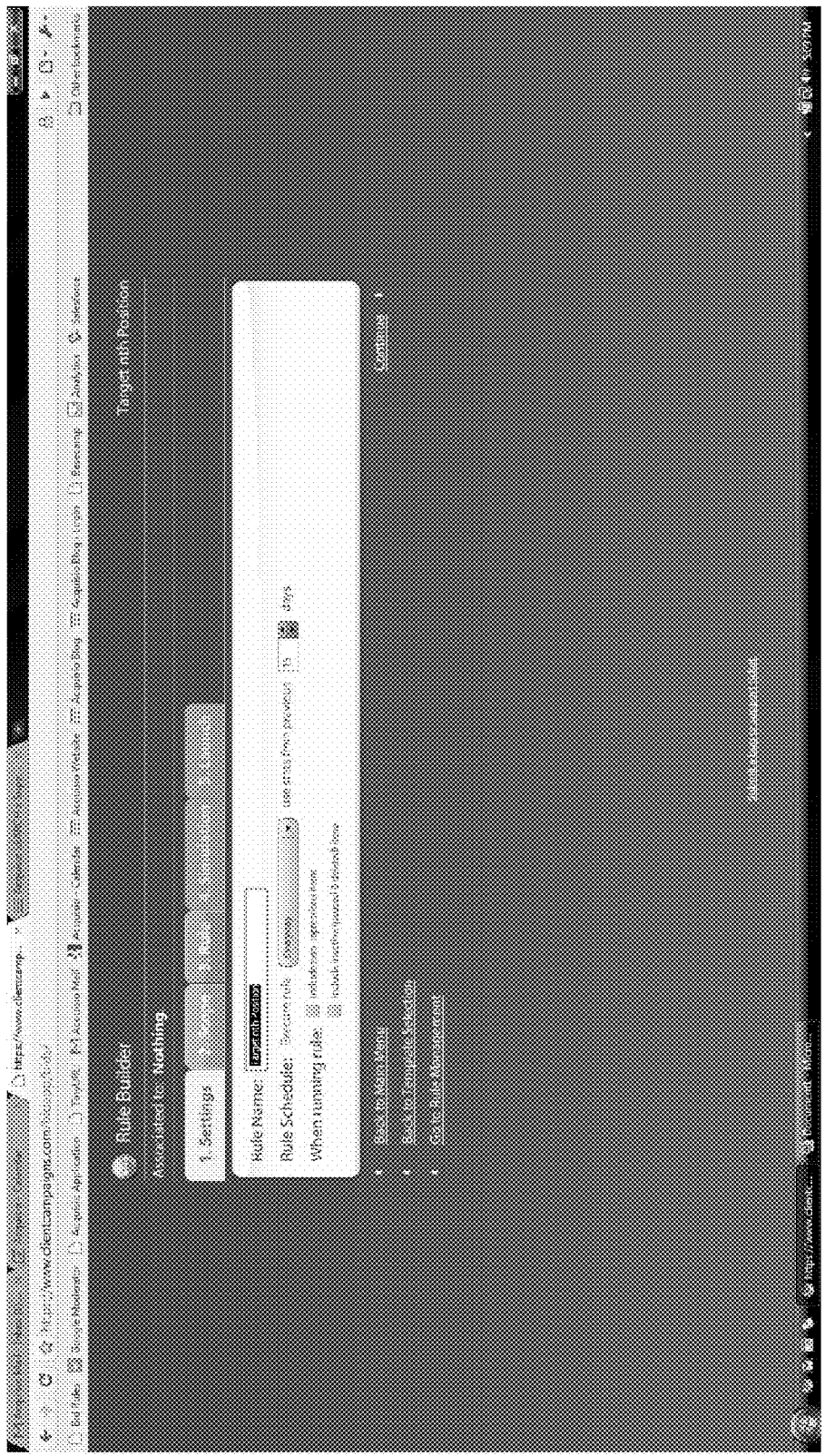
Figure 5E:
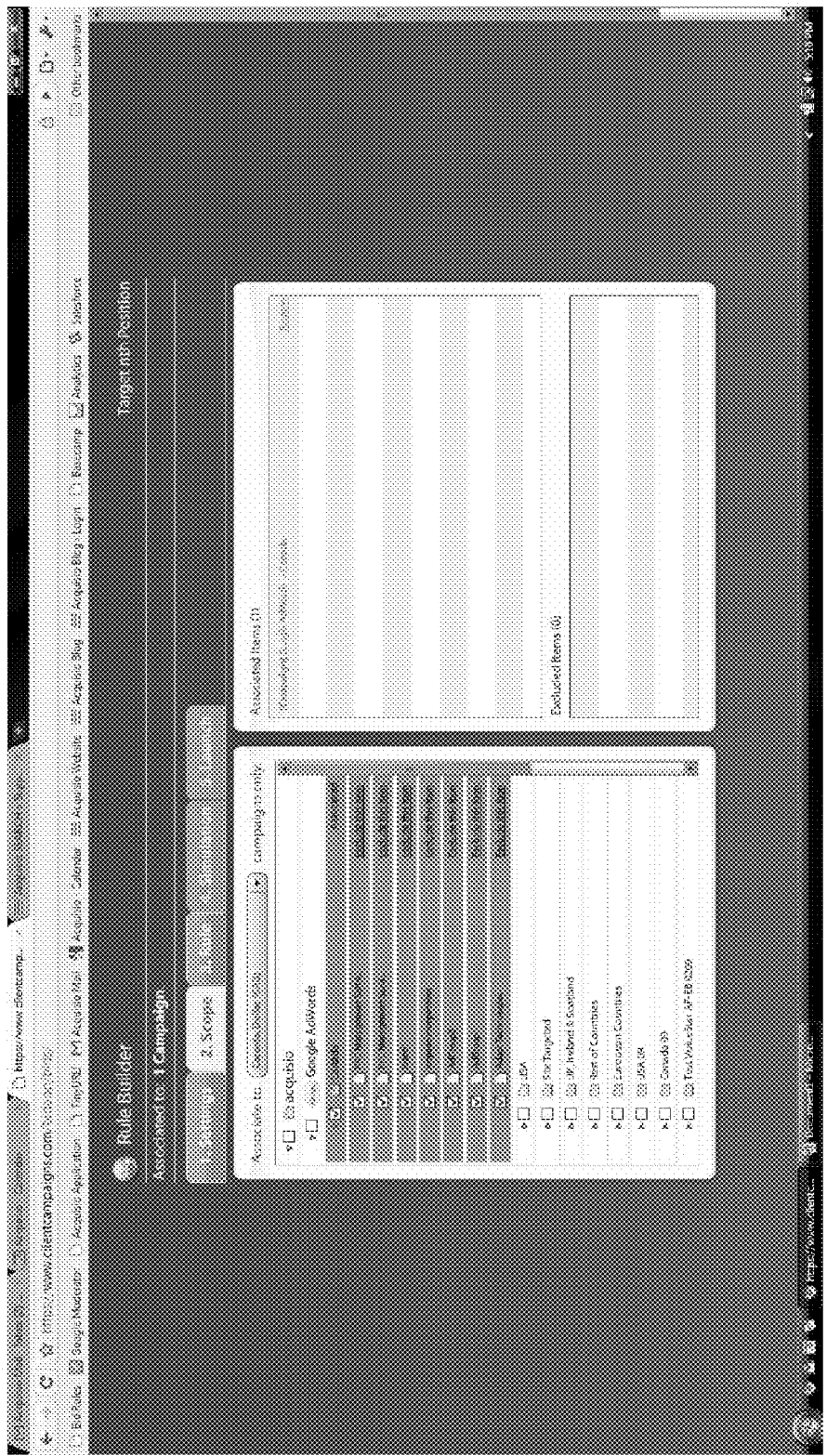
Figure 5F:
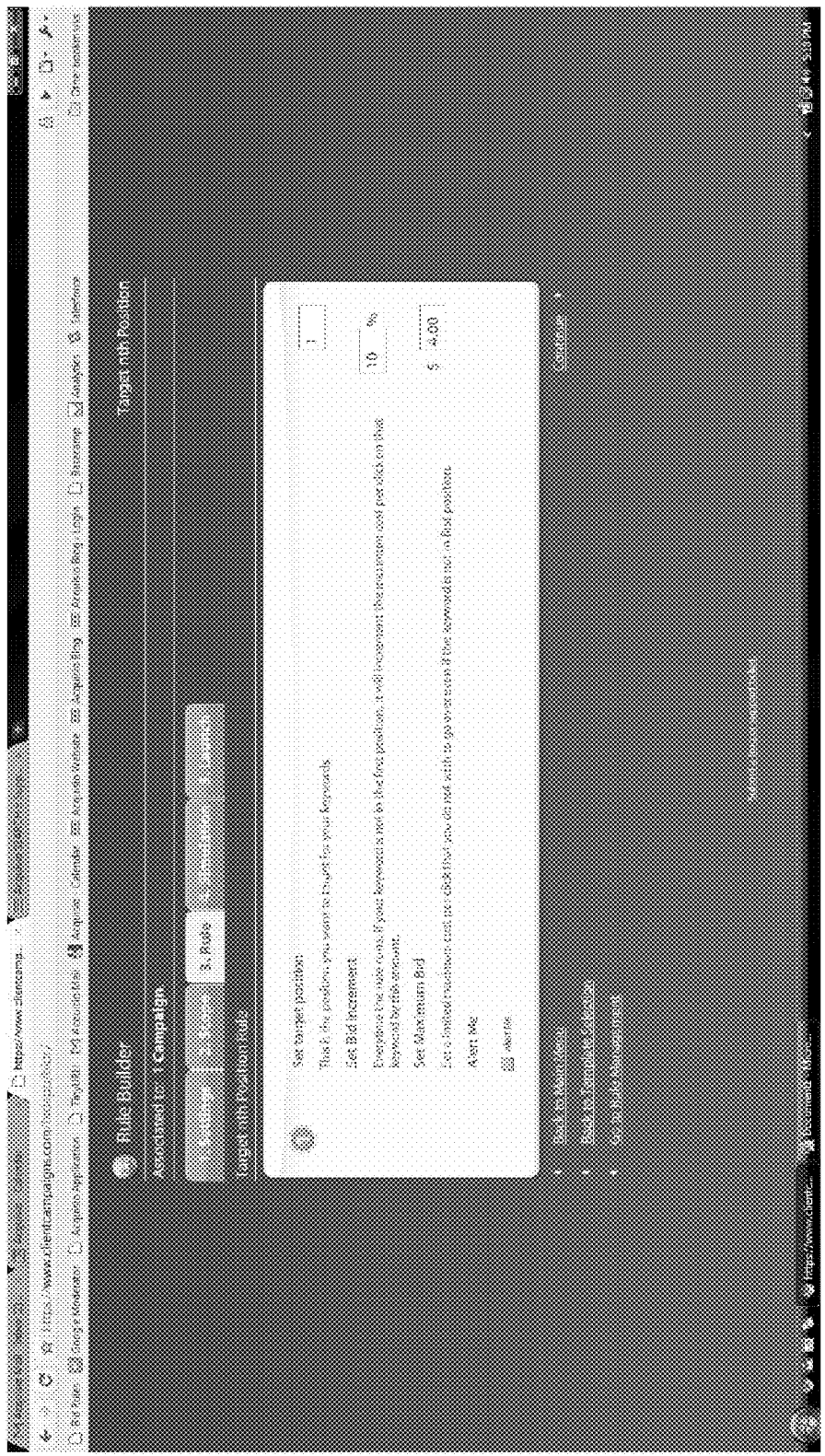
Figure 5G:
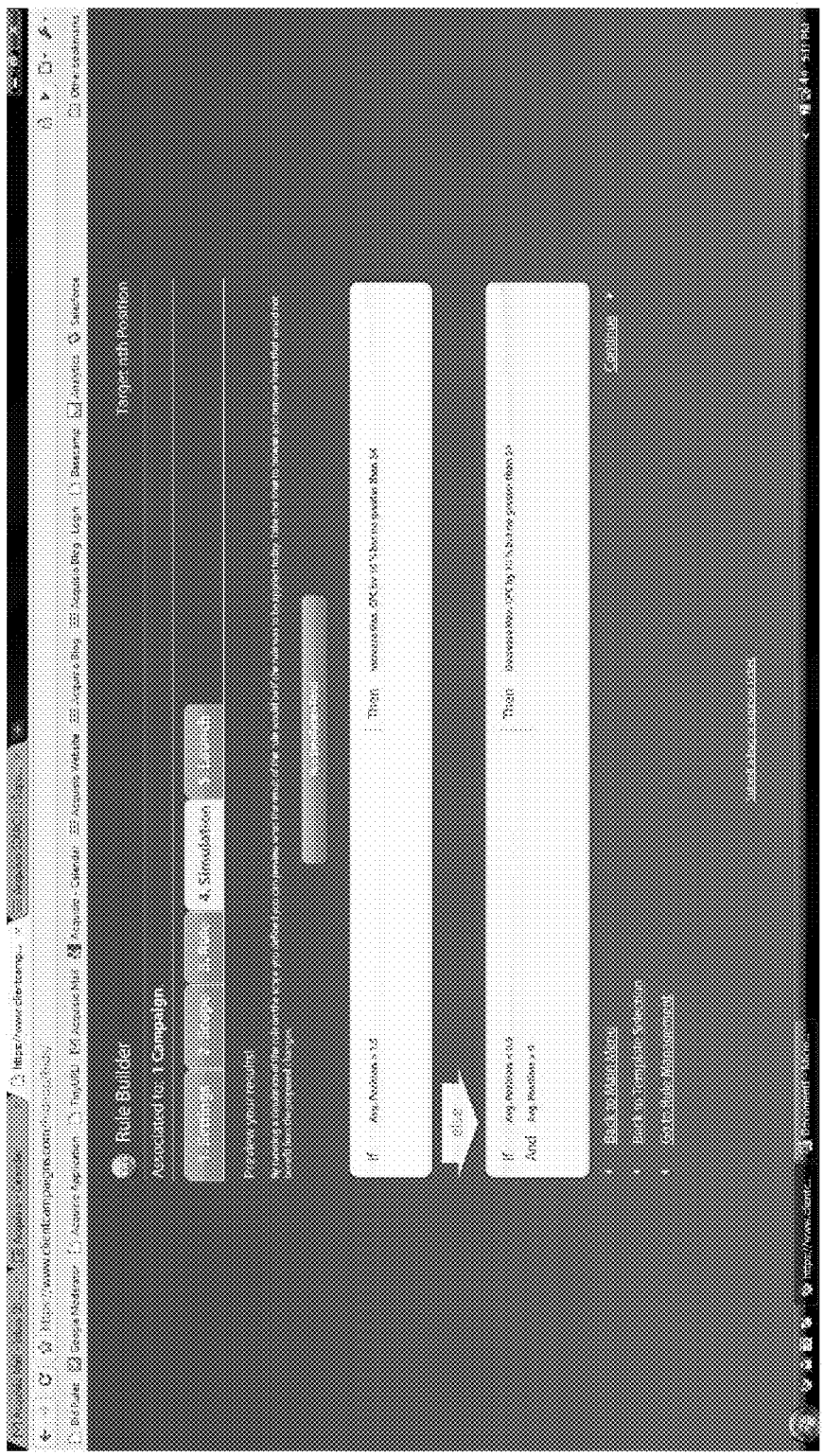
Figure 5H:
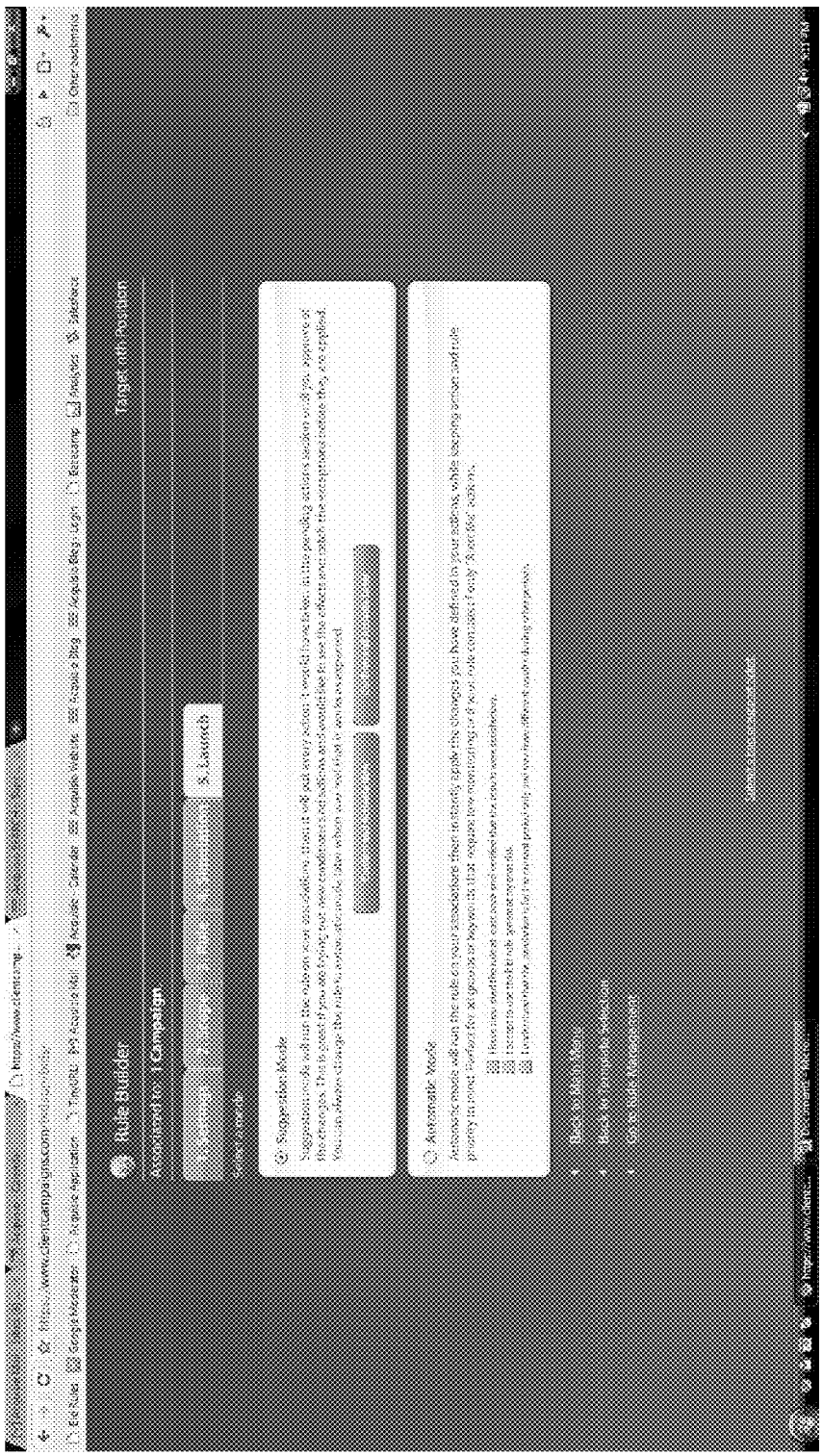
Figure 51:
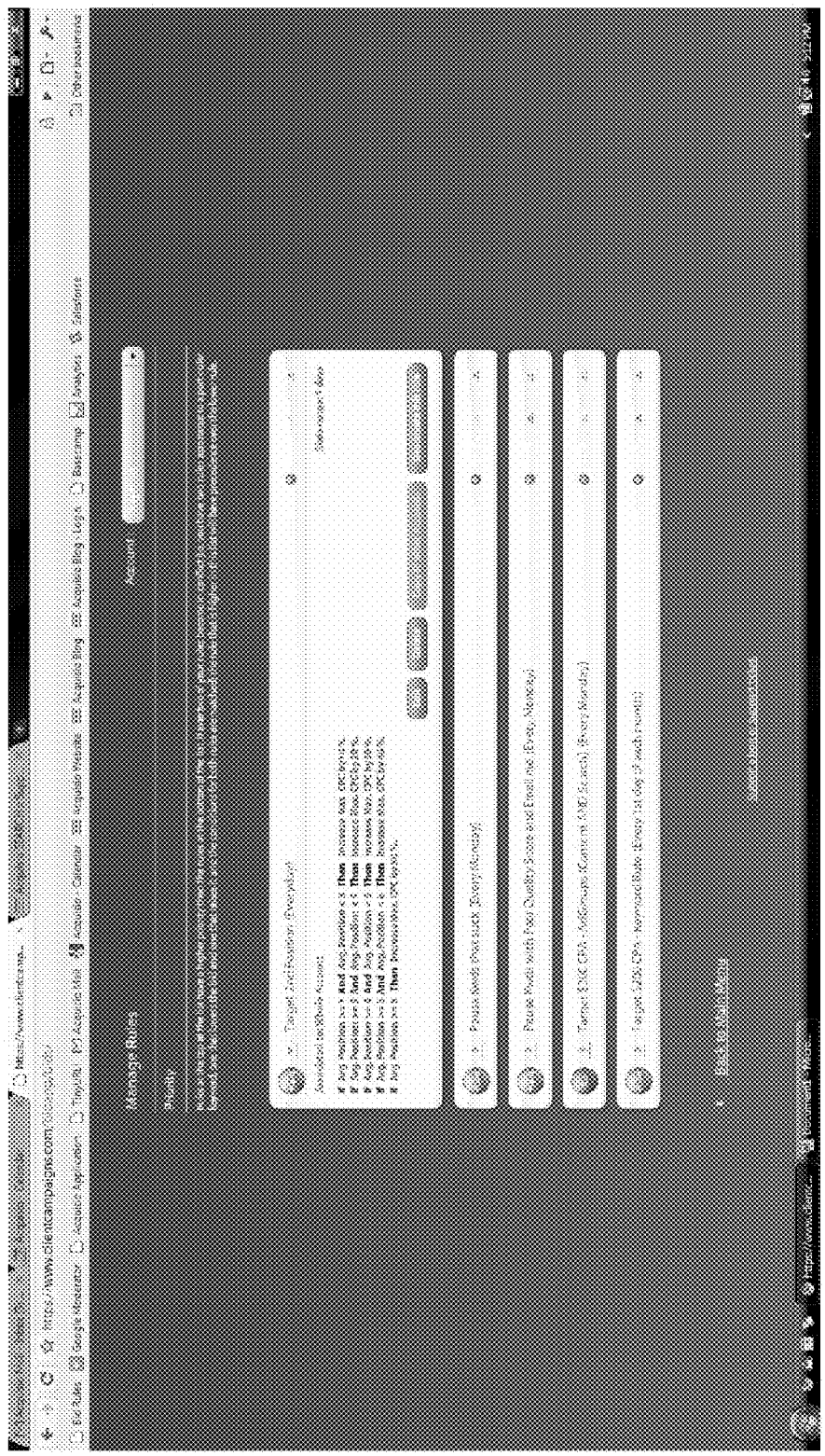
Figure 5J:
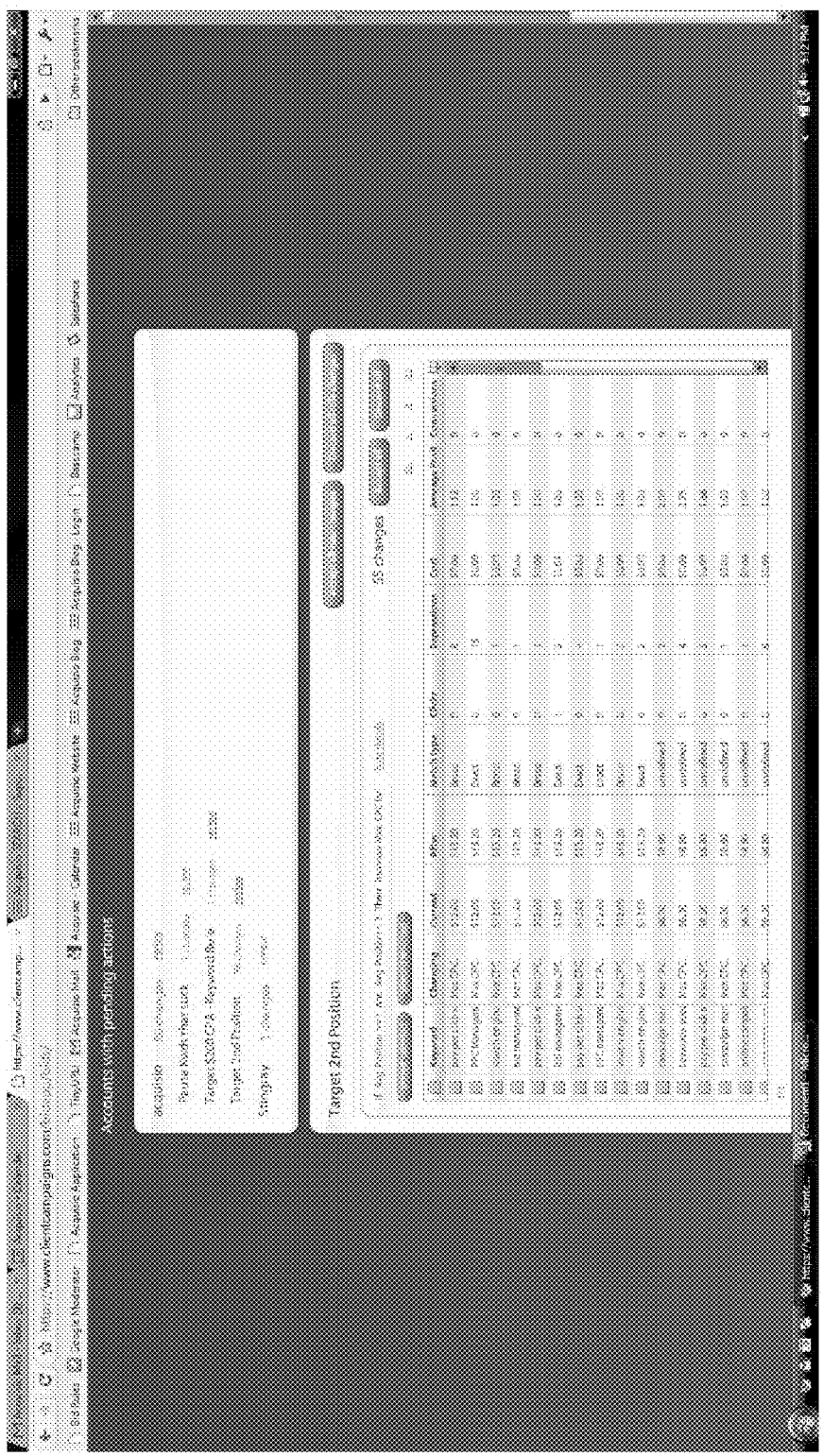
Figure 5K:
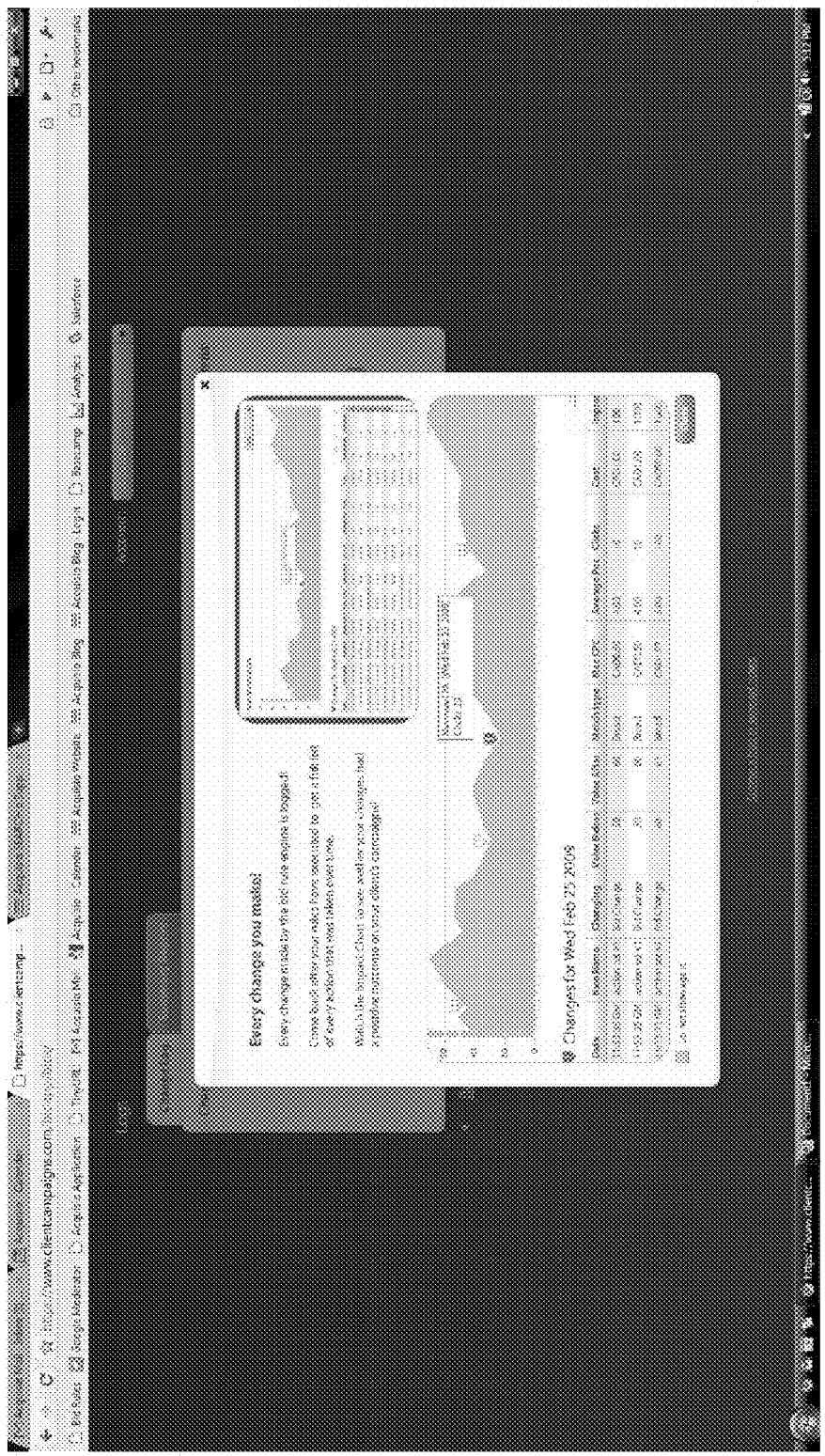
Figure 5L:
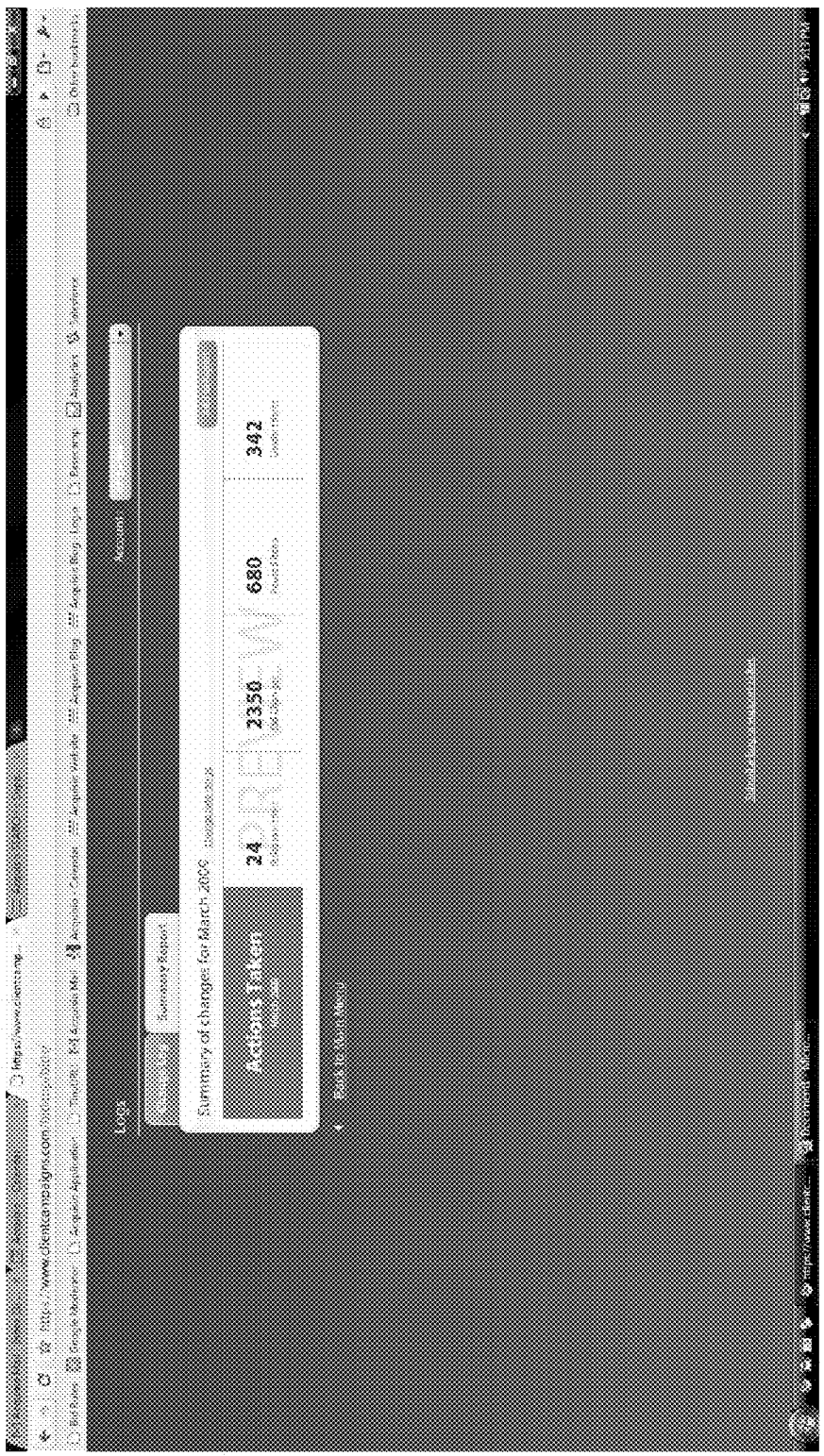

FIG. 5C shows the section "Select a template" (specific templates are subject to change).

FIGS. 5D to 5L show a plurality of screenshot of the "bid rules engine" module.

The bid management module let the user specify and activate rules that will perform some actions when some conditions are met. Those actions can be a change in a Max. CPC of a keyword or an ad group. It can also be a change of status of a keyword, ad group or a campaign, or a notification sent by email. The module will support two levels of rules: Agency rules and Account rules. Agency rules will be made available in all accounts while Account rules will be private. Only an agency manager will have the ability to create and edit Agency rules.

Figure 6A:
FIGS. 6A to 6O are diagrams and object models showing the steps processed by the bid management module.

FIG. 6A a campaign manager, or account manager, have the use cases indicated in FIG. 6A.

Figure 6B:
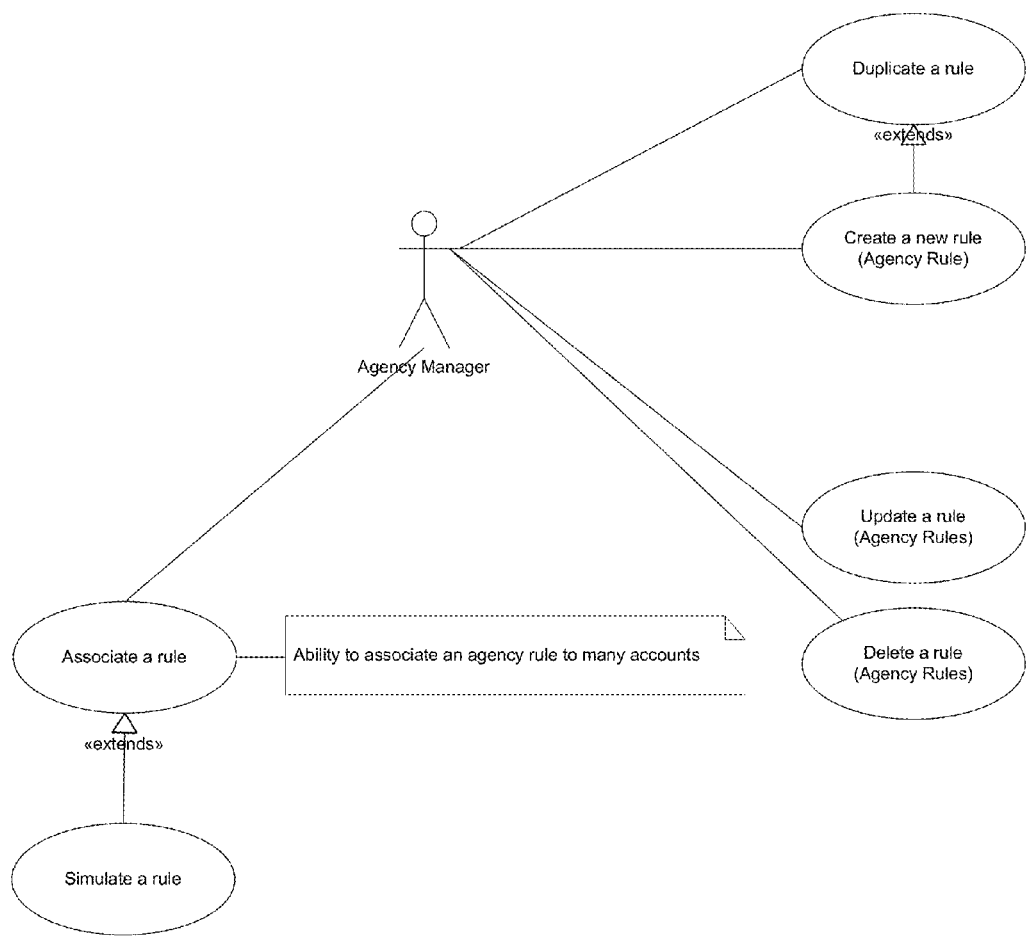

An agency manager will have the same use cases as the account manager plus the use cases shown in FIG. 6B.

Figure 6C:
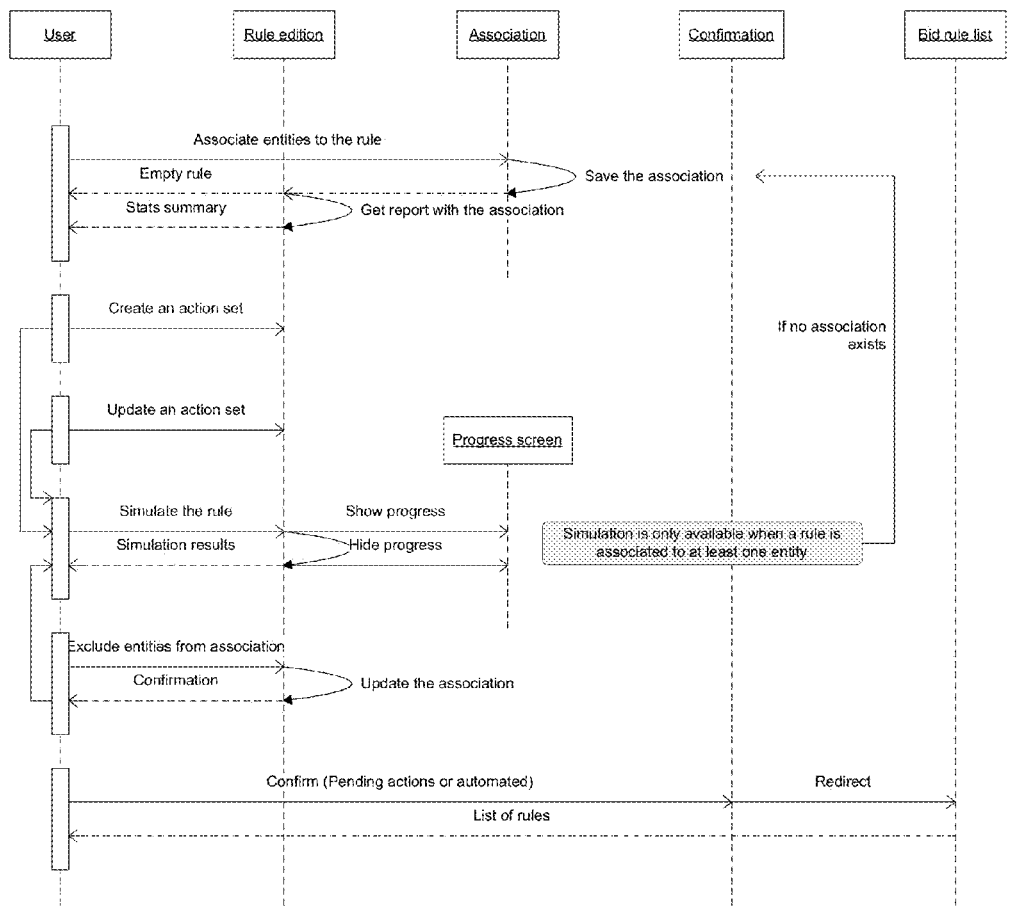
Figure 6D:
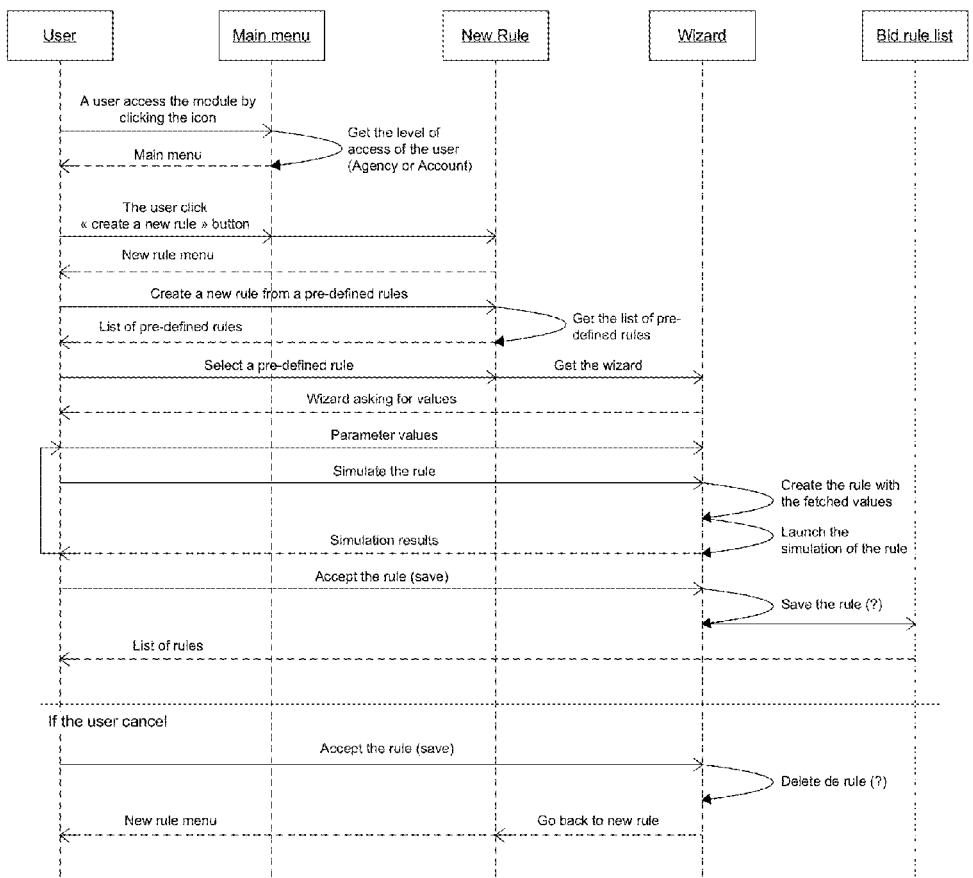
Figure 6E:
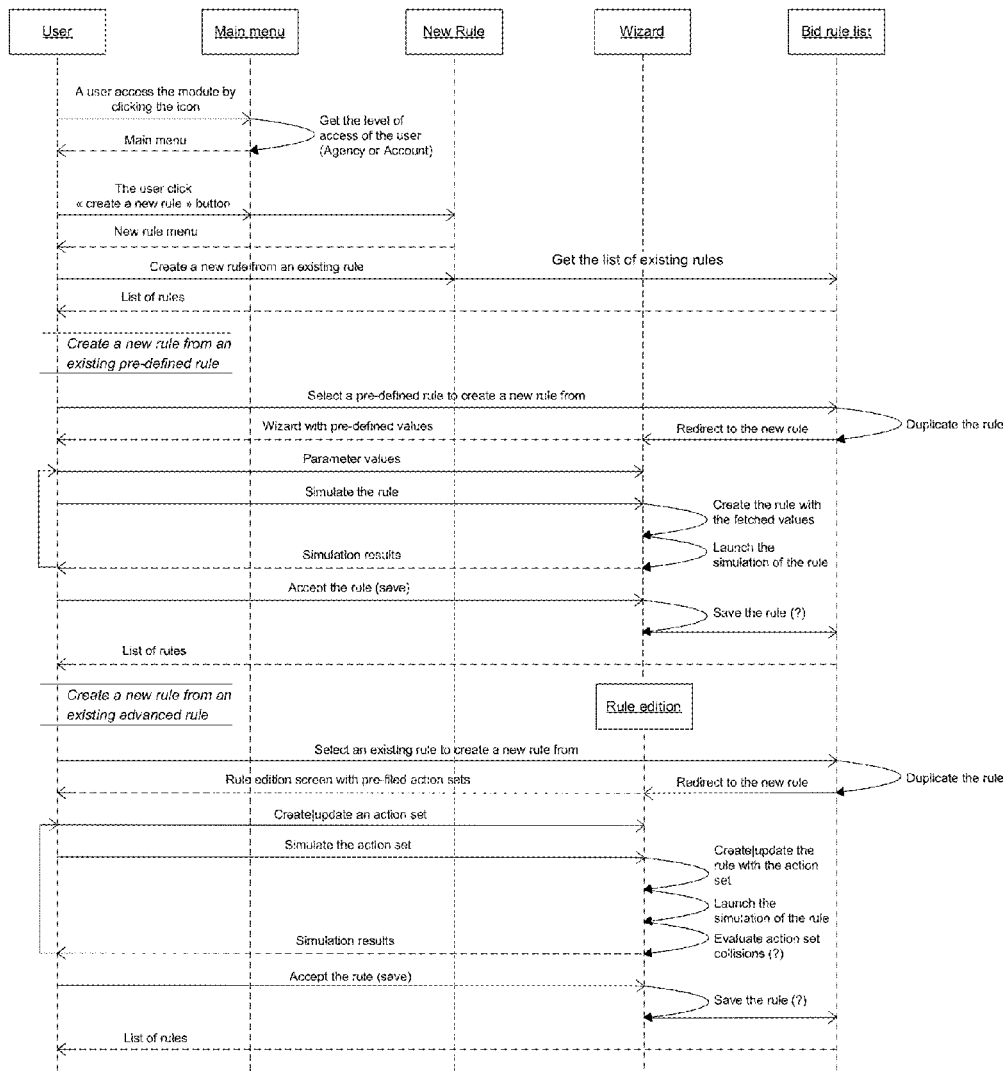
Figure 6:
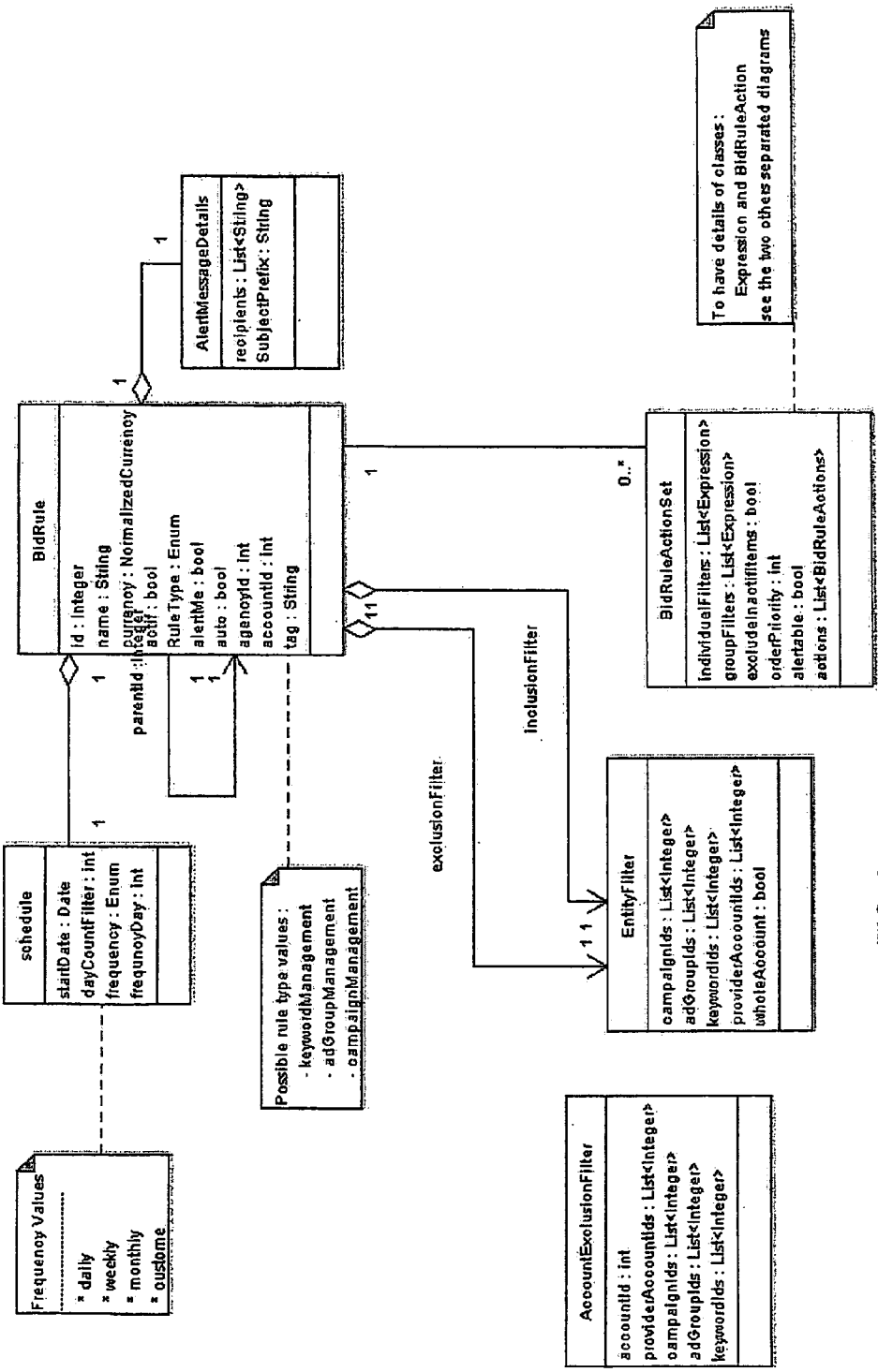

The sequence diagrams for bid management are illustrated in the figures. More particularly, the sequence to create a new rule from scratch (advanced) is shown in FIG. 6C. The sequence to create a new rule from a pre-defined rule is shown in FIG. 6D. The sequence to create a new rule from an existing rule is shown in FIG. 6E.

Figure 6G:
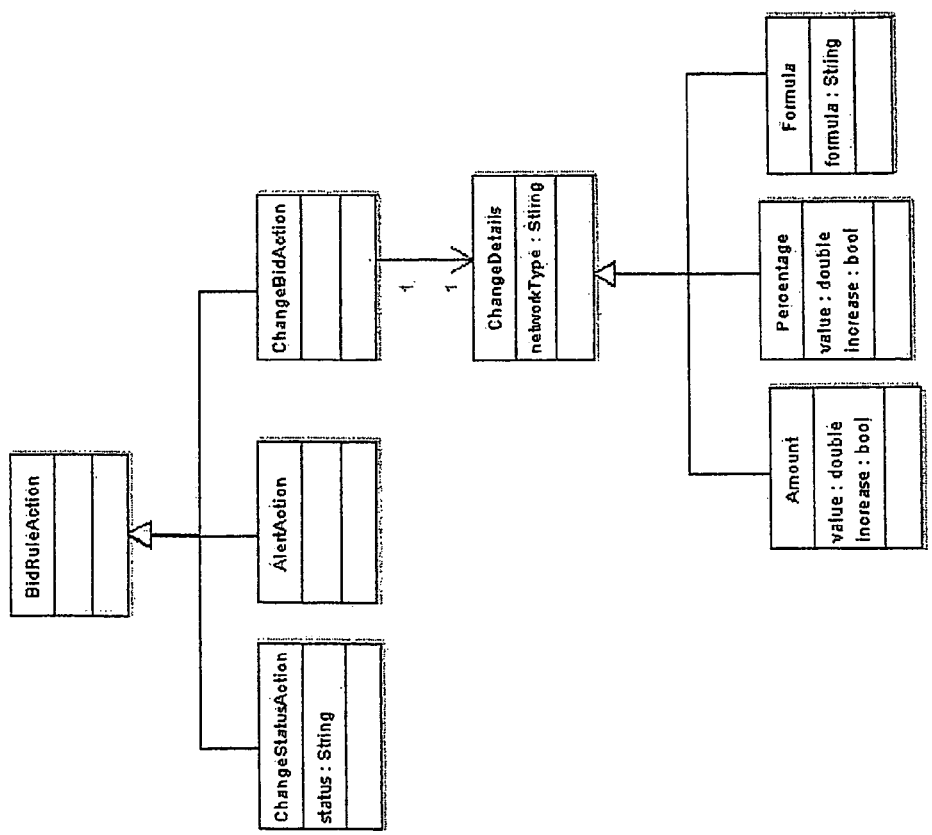
Figure 6:
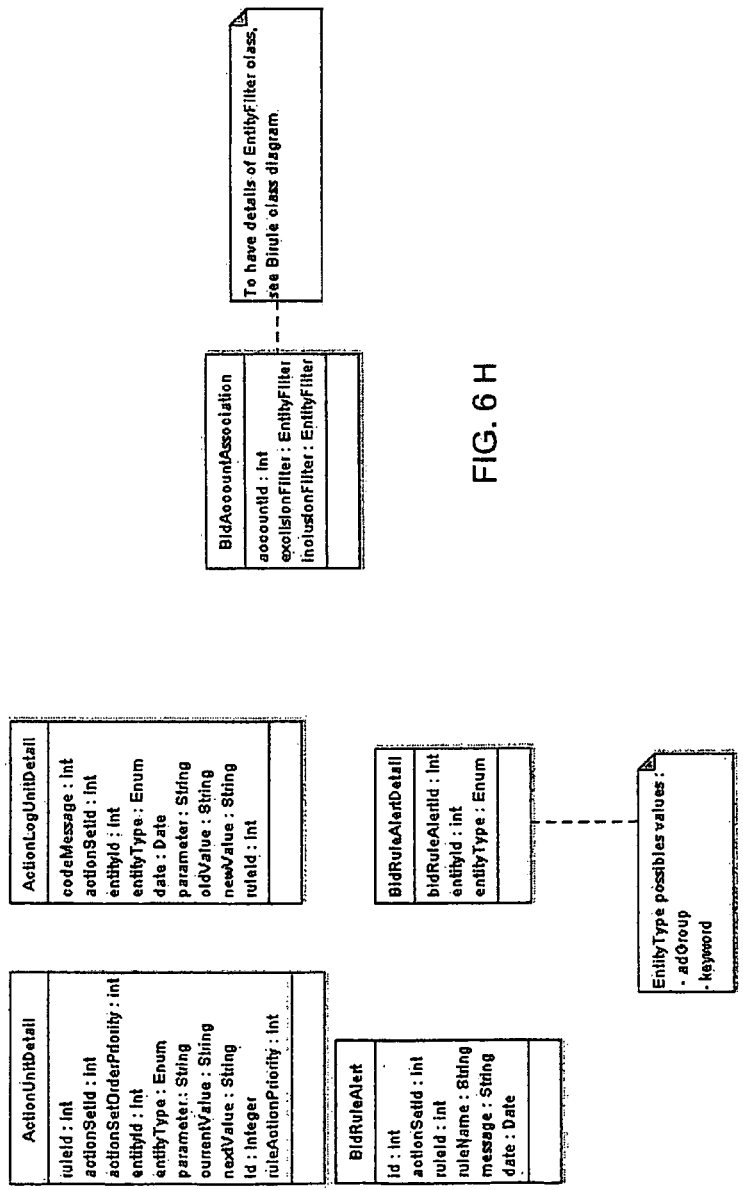

The main object model is shown in FIG. 6F. The object model for bid rule actions is shown in FIG. 6G. The object model for data format (agency rule, action and loggin) is shown in FIG. 6H.

FIGS. 6I, 6J and 6k show a list of calls that will be available in Web Services.

Figure 6L:
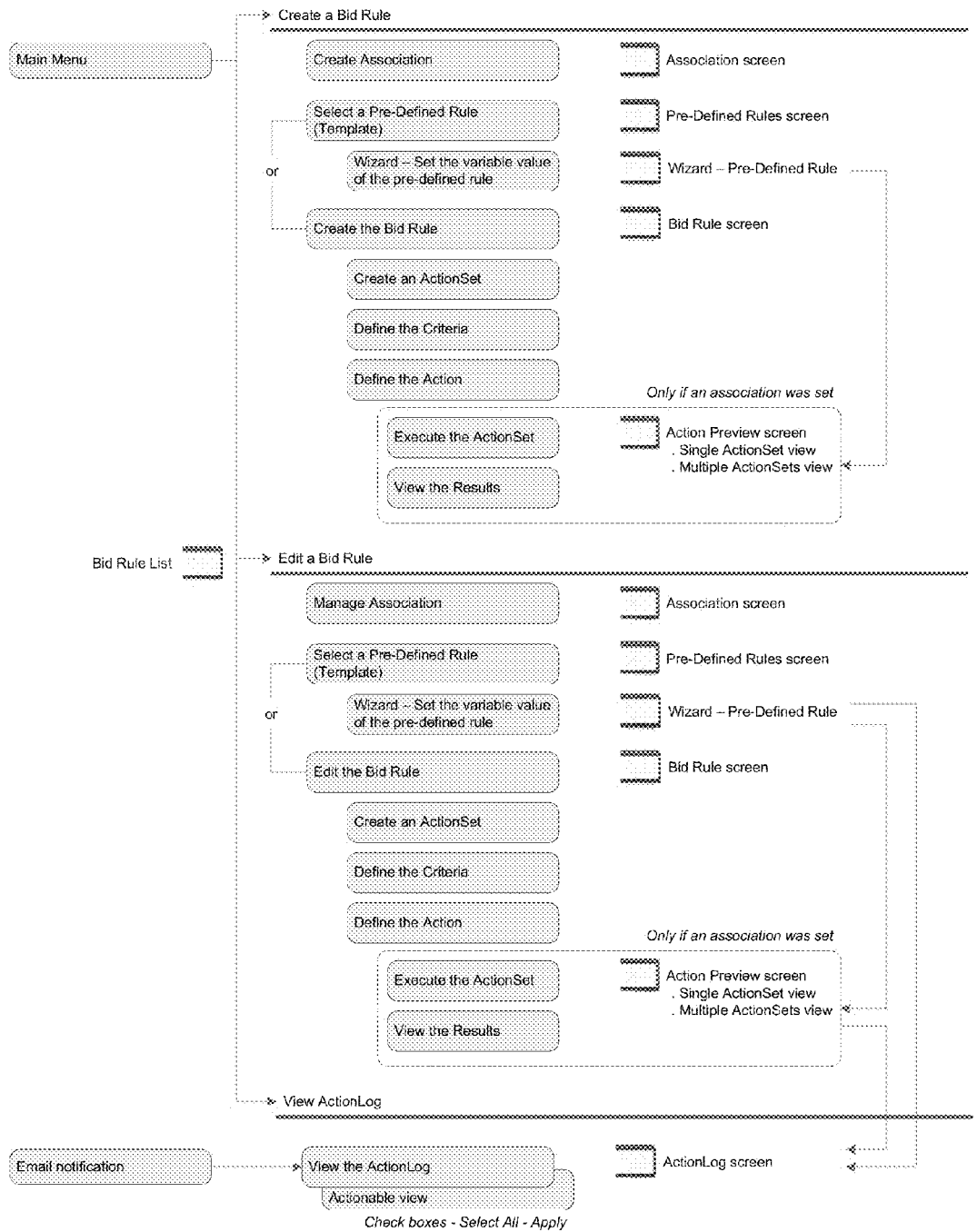

FIG. 6L shows an example of a user interface structure.

FIGS. 6M, 6D and 6O show a typical rule that would be supported. The rule targets a Cost per acquisition (Cost divided by conversion) of 10$.

The system allows the user to manage and report a plurality of providers (for example Google Adwords, Yahoo Search Marketing (Panama edition), and Microsoft AdCenter) and it offers the ability to customize how the user combine data from each, creating his own consolidated campaign containers which can include data from all chosen providers. This allows the user to present campaign data in the way that his client sees their own campaigns, independent of search provider. It also greatly simplifies the process of reporting, as the user no longer have to combine data from each search network manually.

Figure 7A:
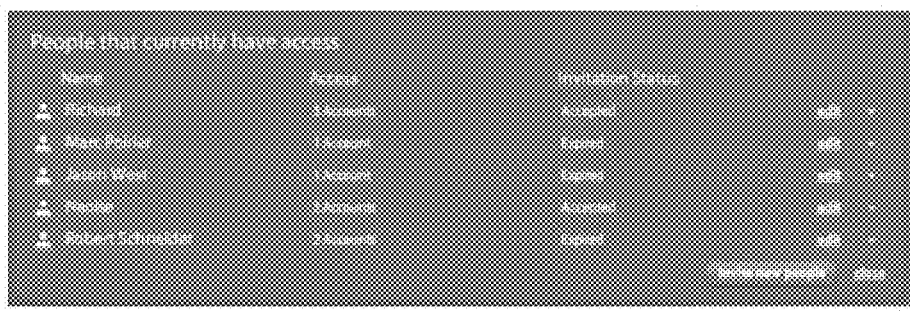
FIGS. 7A and 7B are screenshot of the user login interface and of the permission control window.
Figure 7B:
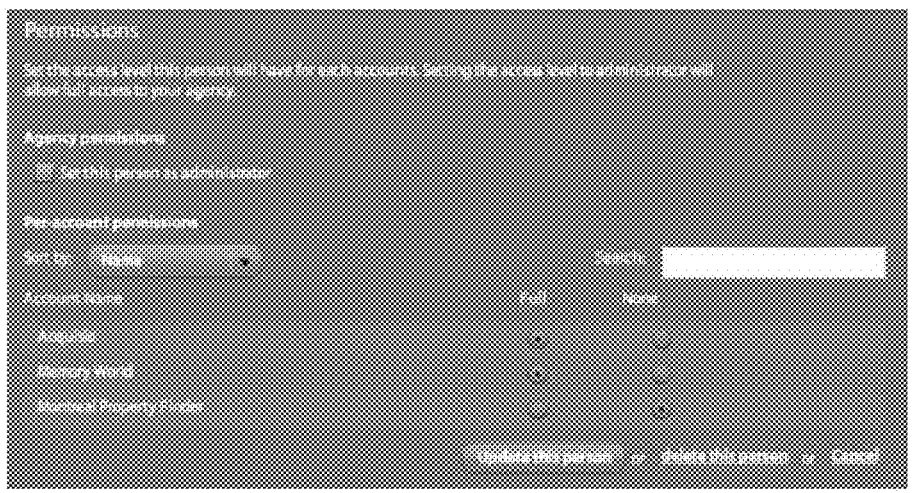
Figure 8A:
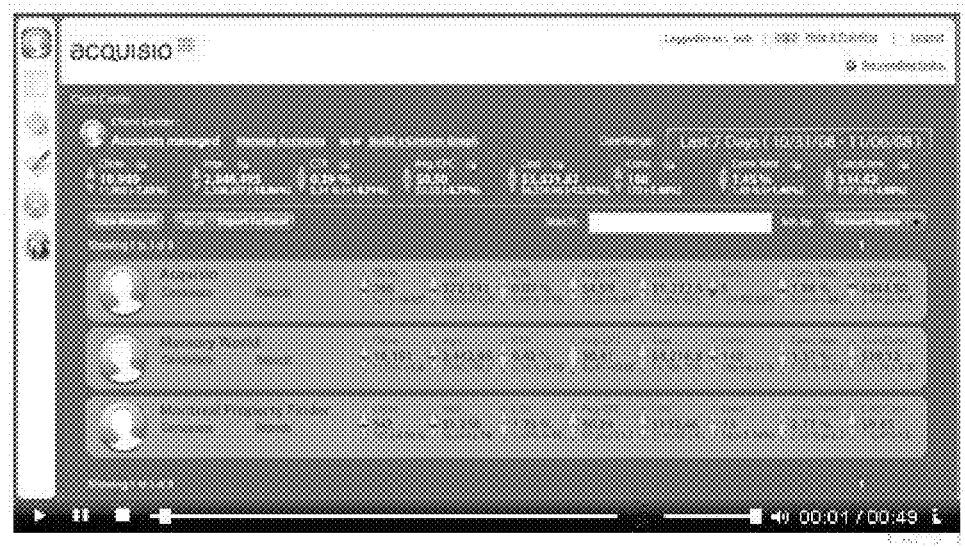
FIGS. 8A to 8H are screenshots of the trends monitor section of the system.
Figure 8B:
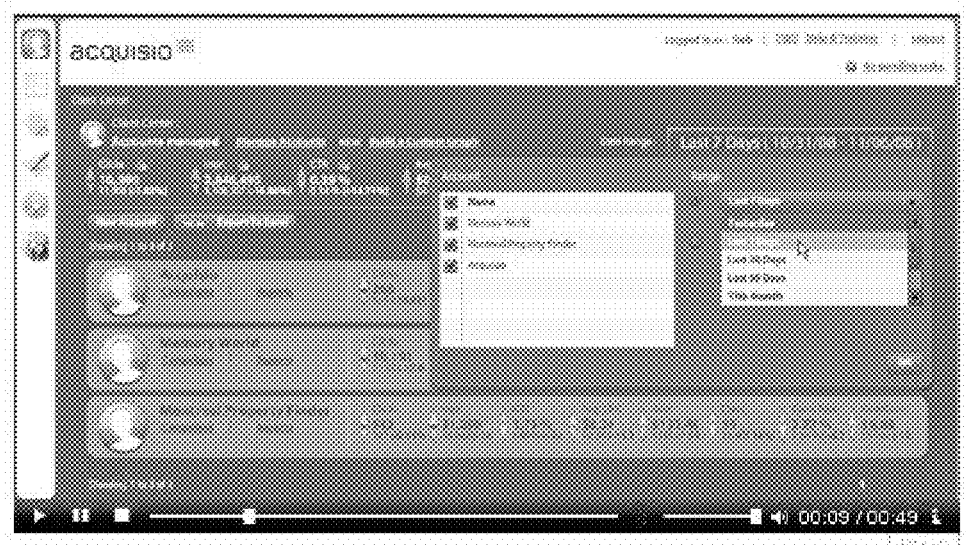
Figure 8C:
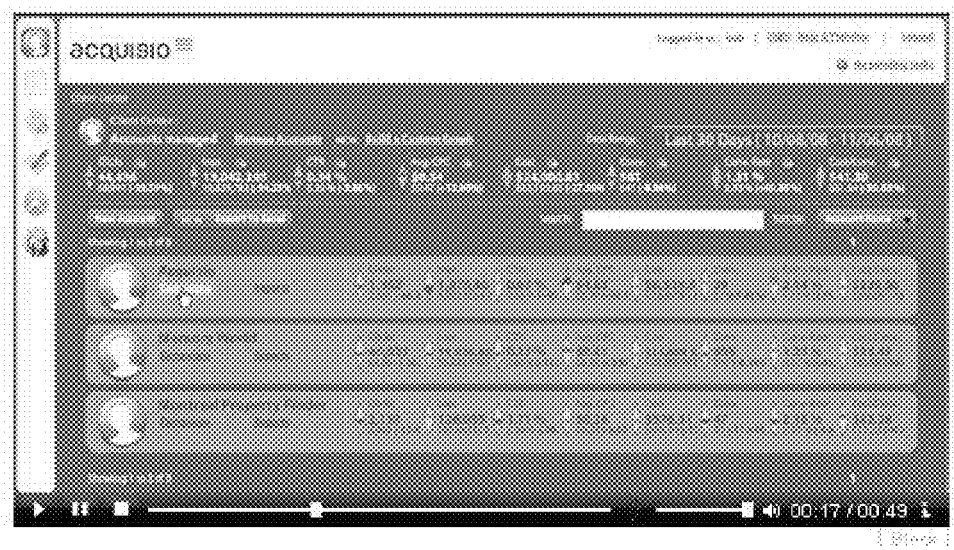
Figure 8D:
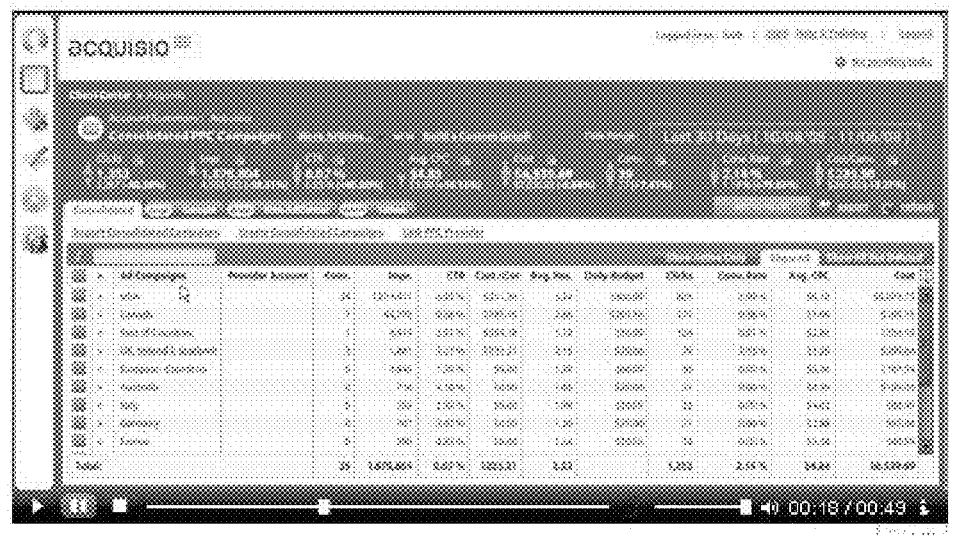
Figure 8E:
Figure 8F:
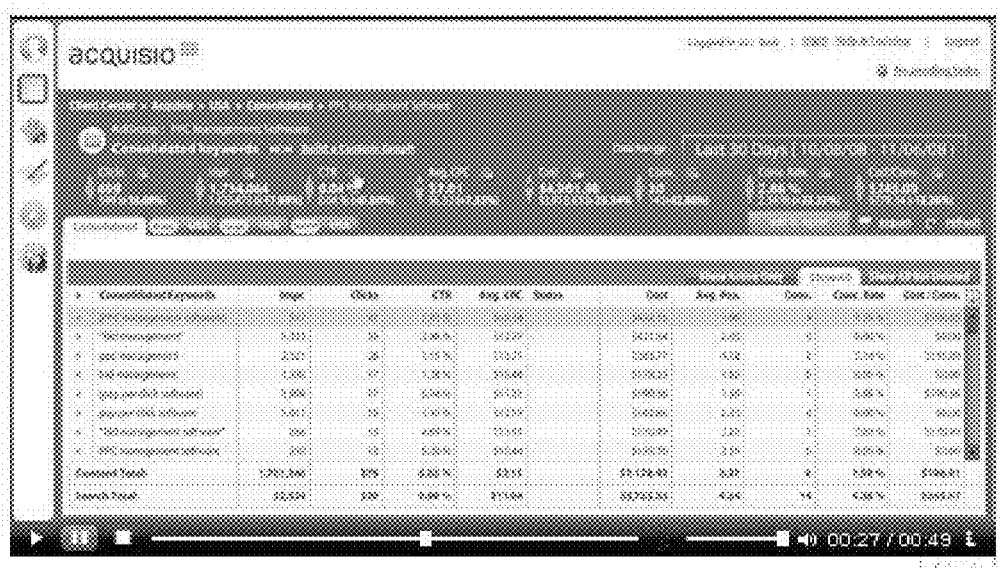
Figure 8G:
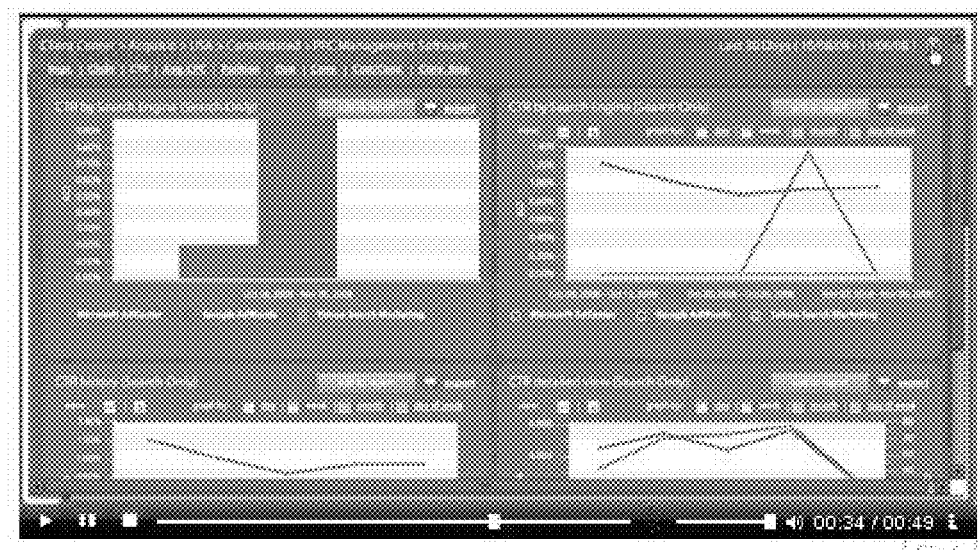
Figure 8H:
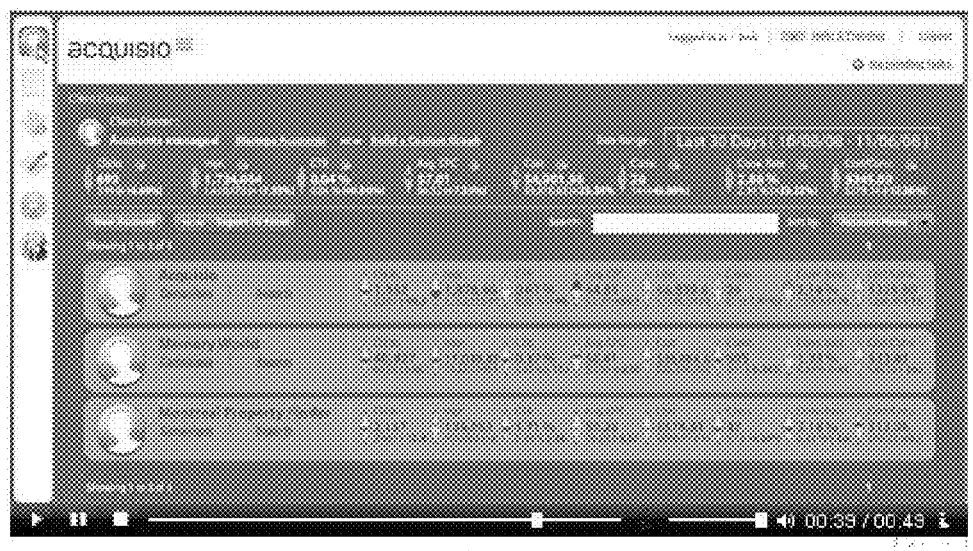

As shown in FIGS. 7A and 7B, the system makes it easy to provide each member of the marketing department with secure, customized access to the individual client accounts that they're responsible for. The account managers or clients can each be issued access to individual or sets of PPC accounts within the system.

Issuing and setting rights couldn't be easier, simply enter the administration panel, set the user's access and authority for each PPC account and send a custom email to the invitee. Upon receipt and activation the new user will have access to the accounts the administrator set during the invitation process.

Those with administrator privileges within the system can edit the access rights of any user at any point in time. Managers can easily and quickly edit access to distinct sets of client accounts for individual account managers. Running your PPC advertising agency has never been easier with the system's advanced management tools at disposal.

As shown in FIGS. 8A to 8H (Trends Monitor section of the system) the system PPC search engine marketing software features continuous trend monitoring for every level of your pay per click management. This innovative feature allows the user to view aggregate data across ad-groups, campaigns, accounts, PPC providers, and even your entire search engine marketing agency.

When the user first log into the system he is presented with a global, account level trends bar showing: Clicks, Impressions, Click-Through Rate, Average CPC, Spend, Conversions, Conversion Rate, and the overall Cost Per Conversion for your agency, an aggregate of all of your clients, across all of your PPC accounts, across Google, Yahoo and MSN.

By default it is presented a comparison between the most recent 30 days, and the preceding 30 days. The information compares the presented statistics with green arrows indicating positive progress on a metric and red arrows indicating negative progress.

Spotting small weakness in a PPC campaign before they become costly problems is part of the art of professional paid search management, a fact most search engine marketing tools fail to address. The system trends bar can help you see problems as they emerge, and even helps you pin-point the problem area by giving you the same metrics and trend indicators at the campaign level and the ad-group level. Drill down with the campaign browser to see the health of a campaign or ad-group at a glance, and always be confident your client's search marketing campaigns are moving in the right direction.

Figure 9:
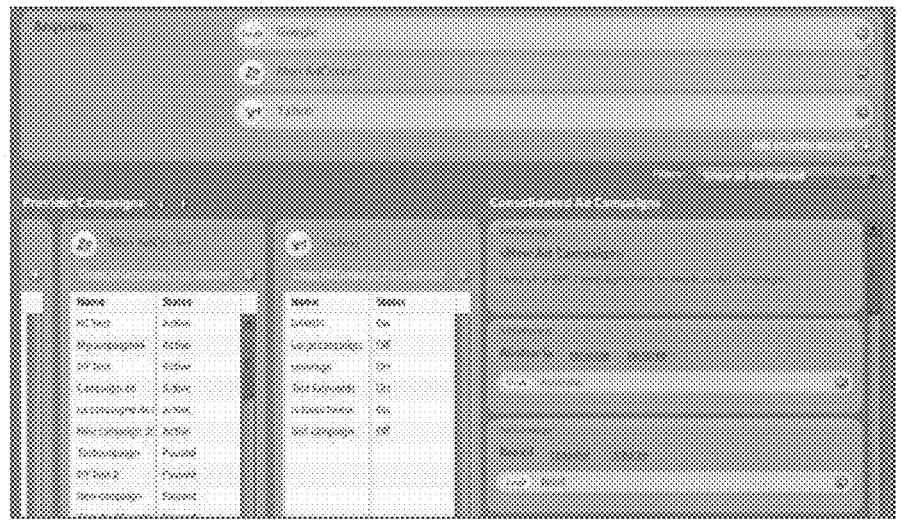
FIGS. 9 is a screenshot of the Bulk Import for Multiple Search Engine Marketing Platforms module of the system.
Figure 10A:
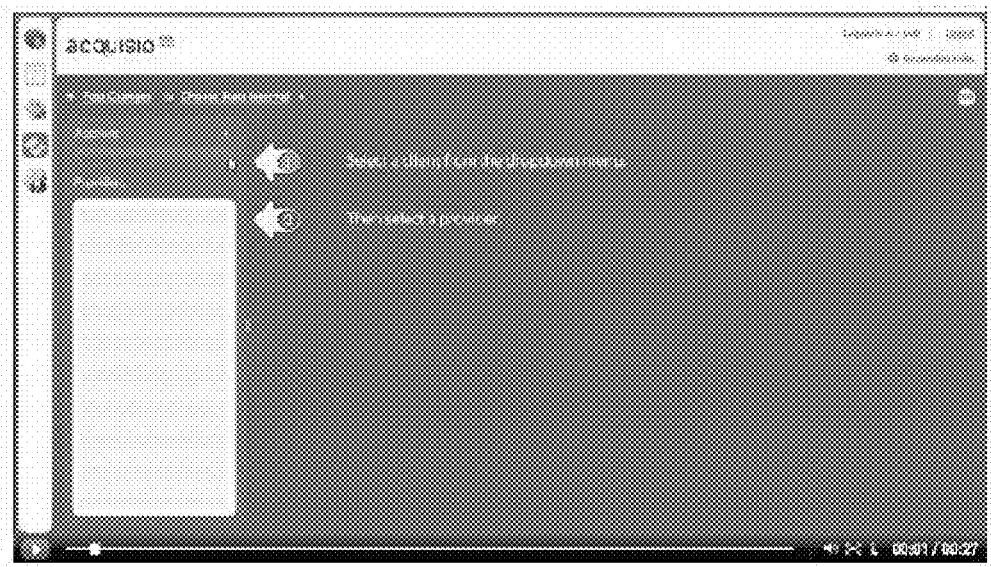
FIGS. 10A to 10E are screenshots of the Multi-Engine Editor module of the system.
Figure 10B:
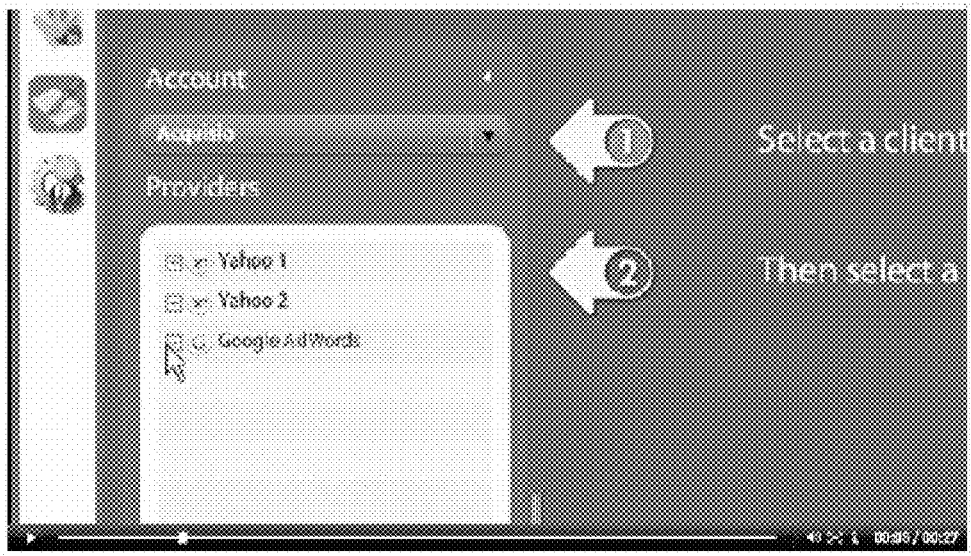
Figure 10C:
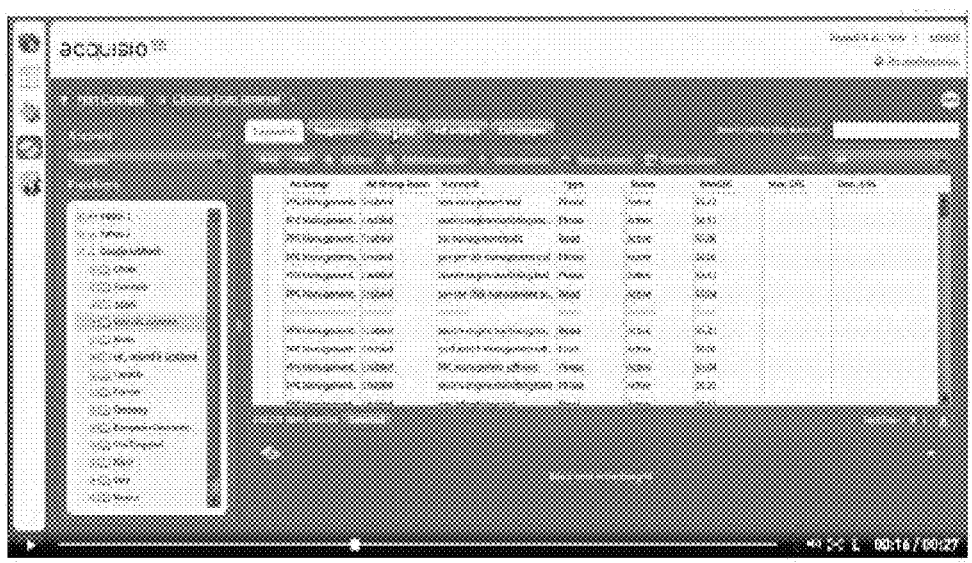
Figure 10D:
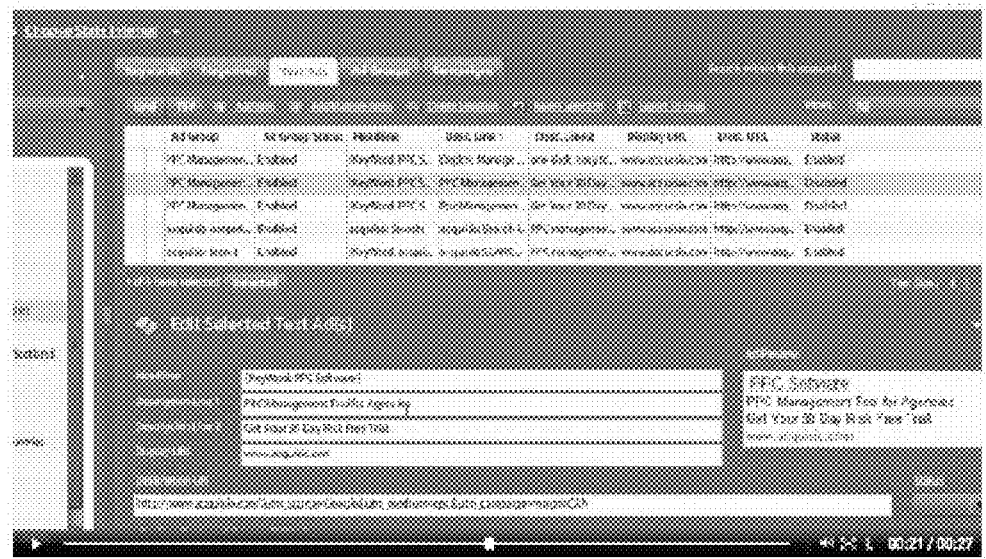
Figure 10E:
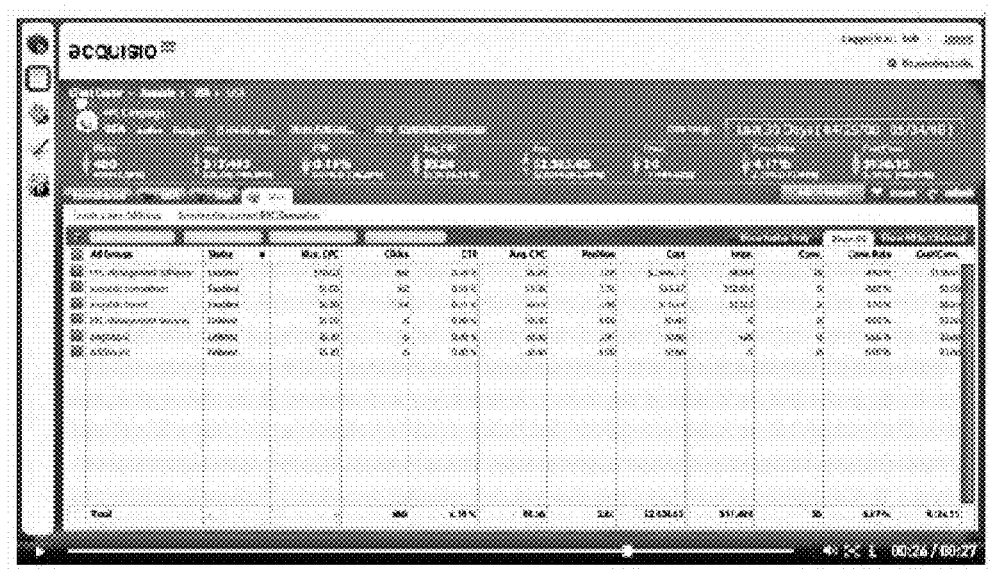

As shown in FIG. 9 (Bulk Import for Multiple Search Engine Marketing Platforms) the system's search engine marketing solution features quick and simple bulk import functionality. If you maintain a Google MCC account you can import all of your client accounts and campaigns into the system with a few simple clicks. Yahoo and MSN accounts are just as simple to import, and consolidating campaigns across accounts is intuitive and straightforward.

With the system's new multi-engine editor the process of copying one campaign or account from Google to Yahoo or MSN has never been easier. If you're tired of the long, slow process of launching each new PPC account out three times, take the new the system multi-engine editor for a spin today and experience the ease of an editor just like Google Adwords editor, but for all three major PPC providers.

The system is committed to helping each and every one of our clients through the process of importing and consolidating the campaigns in their client accounts. One of the most powerful features of the the system search engine marketing solution is the ability to virtually join together advertising campaigns across different PPC service providers. Your dedicated account manager at the system will assist you in this process, giving you the freedom to build reports across search provider, the way your clients see their campaigns.

FIGS. 10A to 10E (Multi-Engine Editor, A Multi-Engine PPC management tool just like Google Adwords Editor) The system EDITOR interface is styled after Google Adwords Editor, so that it is instantly familiar and easy to use for PPC managers the world over. One of a number of ways to view data in the system SEARCH, the editor area allows for quick and easy cross-provider campaign management. All of the functionality you've come to expect from the Adwords Editor is now also at your fingertips for Yahoo and Microsoft Adcenter.

It's no secret that PPC managers have been craving a tool to help with mass editing of bids, creatives, URLs and other campaign elements for years now. Ever since the release of Google's own tool, and understanding the potential of the management style, the desire has been to see a piece of software which spans multiple providers, more than just Google.

Designed with professional Pay-Per-Click marketing experts in mind, the system EDITOR allows you to filter, search and edit across multiple campaigns, and more importantly, across multiple providers. Do you need to update the ad-copy now that a promo is over? There is no quicker way than logging into the system, searching for a part of the ad-copy text, replacing the copy and posting changes.

In addition to daily management tasks, we wanted to create a tool that simplifies the work involved with launching campaigns and adgroups across multiple providers. We use the Google Adwords API, which has a strict terms and conditions when it comes to sharing Google data with other providers. So while we cannot make copying an ad-group or campaign from Google to Yahoo a drag and drop process, we can simplify things down to a few clicks, and a copy and paste.

If you're looking for that little something more that the Google Adwords Editor just doesn't seem to have, try the system EDITOR—Part of the suite of tools that comes with the worlds leading multi-platform, multi-account PPC management tool, the system SEARCH.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method for managing the buying of online advertisement and optimizing at least one buying metric of at least one advertising campaign on at least one advertising provider comprising the steps to:
   a) buy at least one advertisement from at least one advertising provider and associate the at least one bought advertisement with the at least one advertising campaign;
   b) retrieve data and the at least one bought advertisement relating to at least one advertising campaign from at least one advertising provider;
   c) select at least one advertising campaign from the at least one retrieved advertising campaign;
   d) search and apply at least one filter on the at least one selected advertising campaign;
   e) display the at least one filtered selected advertising campaign information data to a user.

2. A method for managing the buying of online advertisement and optimizing at least one metric of at least one advertising campaign on at least one advertising provider as described in claim 1 wherein the at least one advertising campaign is linked with an advertising provider account.

3. A method for managing the buying of online advertisement and optimizing at least one metric of at least one advertising campaign on at least one advertising provider as described in claim 1 wherein the method further comprises steps to:
   a) execute at least one operation on the at least one selected advertising campaign;
   b) validate the at least one operation on the at least one selected advertising campaign;
   c) create a bid management rule to apply to at least one selected advertising campaign;
   d) manage at least one existing bid management rule.

4. A method for managing the buying of online advertisement and optimizing at least one metric of at least one advertising campaign on at least one advertising provider as described in claim 3 wherein the creation of a bid management rule comprises the steps to create a rule from an existing rule template.

5. A method for managing the buying of online advertisement and optimizing at least one metric of at least one advertising campaign on at least one advertising provider as described in claim 3 wherein the creation of a bid management rule is executed through a rule builder comprising the steps to:
   a) set the rule parameters;

b) define the at least one advertising campaign to which the rule shall be applied;
c) preview the results of the rule application to the at least one defined advertising campaign;
d) activate the created rule.

6. A method for managing the buying of advertisement and optimizing at least one metric of at least one advertising campaign on at least one advertising provider as described in claim 5 wherein the rule parameters comprises a target position, a bid increment, a maximum bid and an alert flag.

7. A method for managing the buying of online advertisement and optimizing at least one metric of at least one advertising campaign on at least one advertising provider as described in claim 3 wherein the management of a bid management rule comprises at least on of the steps to:
edit at least one bid management rule;
delete at least one bid management rule;
copy at least one bid management rule to at least one other advertising provider; and
deactivate at least one bid management rule.

8. A method for managing the buying of online advertisement and optimizing at least one metric of at least one advertising campaign on at least one advertising provider as described in claim 3 wherein the method further comprises at least one of the steps to:
display pending bid changes to at least one bid management rule; and
log at least one change to the bid management rules.

9. A method for managing the buying of online advertisement and optimizing at least one metric of at least one advertising campaign on at least one advertising provider as described in claim 3 wherein the at least one operation comprises at least one of the following operations:
creating a new advertising campaign within one or more advertising provider;
updating an existing advertising campaign within one or more advertising provider;
copying at least one existing advertising campaign to at least one other advertising provider;
deleting at least one existing advertising campaign; and
creating a new advertisement within one or more advertising campaign.

10. A method for managing the buying of online advertisement and optimizing at least one metric of at least one advertising campaign on at least one advertising provider as described in claim 9 wherein the at least one operation further comprises at least one of the following operations:
creating a new advertisement within one or more advertising campaign;
updating at least one existing advertisement within one or more advertising campaign;
copying at least one existing advertisement within one or more advertising campaign to at least one other advertising provider; and
deleting at least one existing advertisement within at least one advertising campaign.

11. A method for managing the buying of online advertisement and optimizing at least one metric of at least one advertising campaign on at least one advertising provider as described in claim 9 wherein the at least one operation further comprises at least one of the following operations:
optimizing the buying of advertisement for at least one advertising campaign;
generating at least one consolidated report for at least one advertising campaign managed by one or more advertising provider;
building at least one of a custom graph, a custom table and a custom chart based on data from at least one advertising campaign; and
creating a new consolidated advertising campaign that spread across more than one advertising campaign provider.

12. A method for managing the buying of online advertisement and optimizing at least one metric of at least one advertising campaign on at least one advertising provider as described in claim 11 wherein the generation of at least one consolidated optimization of the buying of advertisement for at least one advertising campaign allows at least one of the followings:
to maximize at least one advertising campaign metric;
to minimize at least one advertising campaign metric;
to simulate the predicted effects of a change to an advertising campaign metric;
to choose the maintenance level of at least one advertising campaign metric; and
to analyze historical account data to determine the performance of at least one selected advertisement.

13. A system for managing the buying of online advertisement and optimizing at least one metric of at least one advertising campaign on at least one advertising provider comprising:
a) a server configured:
i) to manage at least one campaign entity;
ii) to communicate with at least one advertising provider application programming interface;
b) at least one client device comprising:
i) a campaign elements loader configured to load at least one campaign element into a client device memory;
ii) a module configured to search and apply at least one filter to a selection of advertising campaigns;
iii) at least one validator configured to validate at least one operation executed on a selection of advertising campaigns;
iv) an in-memory storage manager configured to manage the campaign elements loaded into the client device memory;
v) at least one entity creation and edition module configured to execute at least one operation on at least one campaign element;
wherein the at least one advertising campaign comprises at least one advertisement bought from at least one provider.

14. A system for managing the buying of online advertisement and optimizing at least one metric of at least one advertising campaign on at least one advertising provider as described in claim 13 wherein the at least one operation executed on the at least one campaign element comprises at least one of the following operations:
creating a new advertising campaign element within one or more advertising campaign provider;
updating an existing advertising campaign element within one or more advertising campaign provider;
copying at least one existing advertising campaign element to at least one other advertising campaign provider;
deleting at least one existing advertising campaign element; and
creating a new advertisement within one or more advertising campaign element.

15. A system for managing the buying of online advertisement and optimizing at least one metric of at least one advertising campaign on at least one advertising provider as described in claim 14 wherein the at least one operation executed on the at least one campaign element further comprises at least one of the following operations:

creating a new advertisement within one or more advertising campaign element;

setting the maximum price to be paid for each advertisement to be bought by a user;

updating at least one existing advertisement within one or more advertising campaign element;

copying at least one existing advertisement within one or more advertising campaign element to at least one other advertising campaign provider; and deleting at least one existing advertisement within at least one advertisement campaign.

16. A system for managing the buying of online advertisement and optimizing at least one metric of at least one advertising campaign on at least one advertising provider as described in claim 15 wherein the at least one operation executed on the at least one campaign element further comprises at least one of the following operations:

optimizing at least one advertising campaign element;

generating at least one consolidated report for at least one advertising campaign element;

building at least one of a custom graph, a custom table and a custom chart based on data from at least one advertising campaign managed by one or more advertising provider; and creating a new consolidated advertising campaign element that spreads across more than one advertising campaign provider.

* * * * *